United States Patent
Lui et al.

(10) Patent No.: US 8,079,037 B2
(45) Date of Patent: Dec. 13, 2011

(54) GENERIC, MULTI-INSTANCE METHOD AND GUI DETECTION SYSTEM FOR TRACKING AND MONITORING COMPUTER APPLICATIONS

(75) Inventors: Philip Lui, New York, NY (US); Zbigniew Kopytnik, East Stroudsburg, PA (US); David Rayna, Malverne, NY (US)

(73) Assignee: Knoa Software, Inc., New York, NY (US)

( * ) Notice: Subject to any disclaimer, the term of this patent is extended or adjusted under 35 U.S.C. 154(b) by 942 days.

(21) Appl. No.: 11/248,981

(22) Filed: Oct. 11, 2005

(65) Prior Publication Data

US 2007/0083813 A1 Apr. 12, 2007

(51) Int. Cl.
G06F 3/00 (2006.01)
G06F 9/44 (2006.01)
G06F 9/46 (2006.01)
G06F 13/00 (2006.01)

(52) U.S. Cl. ...................................................... 719/310
(58) Field of Classification Search .................. 709/224; 715/709; 719/310
See application file for complete search history.

(56) References Cited

U.S. PATENT DOCUMENTS

| | | | |
|---|---|---|---|
| 5,257,381 A | 10/1993 | Cook | |
| 5,566,339 A | 10/1996 | Perholtz et al. | |
| 5,581,684 A * | 12/1996 | Dudzik et al. | 715/708 |
| 5,671,351 A | 9/1997 | Wild et al. | |
| 5,867,659 A * | 2/1999 | Otteson | 709/224 |
| 5,923,881 A * | 7/1999 | Fujii et al. | 717/125 |
| 5,964,839 A * | 10/1999 | Johnson et al. | 709/224 |
| 5,991,705 A | 11/1999 | Klein et al. | |
| 6,078,956 A | 6/2000 | Bryant et al. | |
| 6,099,317 A | 8/2000 | Bullwinkel et al. | |
| 6,108,700 A | 8/2000 | Maccabee et al. | |
| 6,189,047 B1 | 2/2001 | Ball | |
| 6,202,036 B1 | 3/2001 | Klein et al. | |
| 6,219,826 B1 | 4/2001 | De Pauw et al. | |

(Continued)

FOREIGN PATENT DOCUMENTS

WO  WO 2005/008531 A2  1/2005

OTHER PUBLICATIONS

Kazi et al., "JaViz: A client/server Java profiling tool," IBM Systems Journal, vol. 39, No. 1, Jan. 1, 2000, pp. 96-117.

(Continued)

*Primary Examiner* — Andy Ho
*Assistant Examiner* — Timothy A Mudrick
(74) *Attorney, Agent, or Firm* — Foley & Lardner LLP

(57) ABSTRACT

Presented is a system and method for monitoring events derived from a computer target application presentation layer including the steps of providing, independent of recompiling the target application's source code, a script running at a level within the target application. The script scans run-time instantiations of objects of the target application, and allocates structures in real-time to the object instantiations. These allocated structures are adapted to create a reflection of the target application structure, which is used along with detected object instantiations that match a predetermined object structure to capture a portion of an environmental spectrum of the detected object. Further, the system can process state machine events occurring on at least one of a server machine and a client/localized machine, correlate the state machine events with the environmental spectrum, and deduce a user experience based on the correlated state machine events.

25 Claims, 30 Drawing Sheets

U.S. PATENT DOCUMENTS

| | | | |
|---|---|---|---|
| 6,282,701 B1 | 8/2001 | Wygodny et al. | |
| 6,338,159 B1* | 1/2002 | Alexander et al. | 717/128 |
| 6,714,976 B1 | 3/2004 | Wilson et al. | |
| 6,748,555 B1* | 6/2004 | Teegan et al. | 714/38 |
| 6,769,117 B2* | 7/2004 | Moore | 717/130 |
| 6,857,120 B1* | 2/2005 | Arnold et al. | 717/157 |
| 2004/0083453 A1 | 4/2004 | Knight et al. | |
| 2004/0199663 A1* | 10/2004 | Horvitz et al. | 709/238 |
| 2005/0027860 A1 | 2/2005 | Benson et al. | |
| 2005/0071813 A1* | 3/2005 | Reimer et al. | 717/125 |
| 2005/0132336 A1* | 6/2005 | Gotwals et al. | 717/127 |
| 2005/0144150 A1 | 6/2005 | Ramamurthy et al. | |
| 2005/0147946 A1 | 7/2005 | Ramamurthy et al. | |
| 2005/0283765 A1* | 12/2005 | Warren et al. | 717/131 |
| 2006/0184410 A1 | 8/2006 | Ramamurthy et al. | |

OTHER PUBLICATIONS

Supplementary European search report and search opinion mailed Jun. 8, 2010 in corresponding European Application No. 06825877.1.

* cited by examiner

Fig. 1 Client and Server Hardware

Example GUI Web Application Type

Monitor Targets in the Client or Server (in non GUI)

gMg System Component Overview

Fig. 5 Event and Property Flow Overview
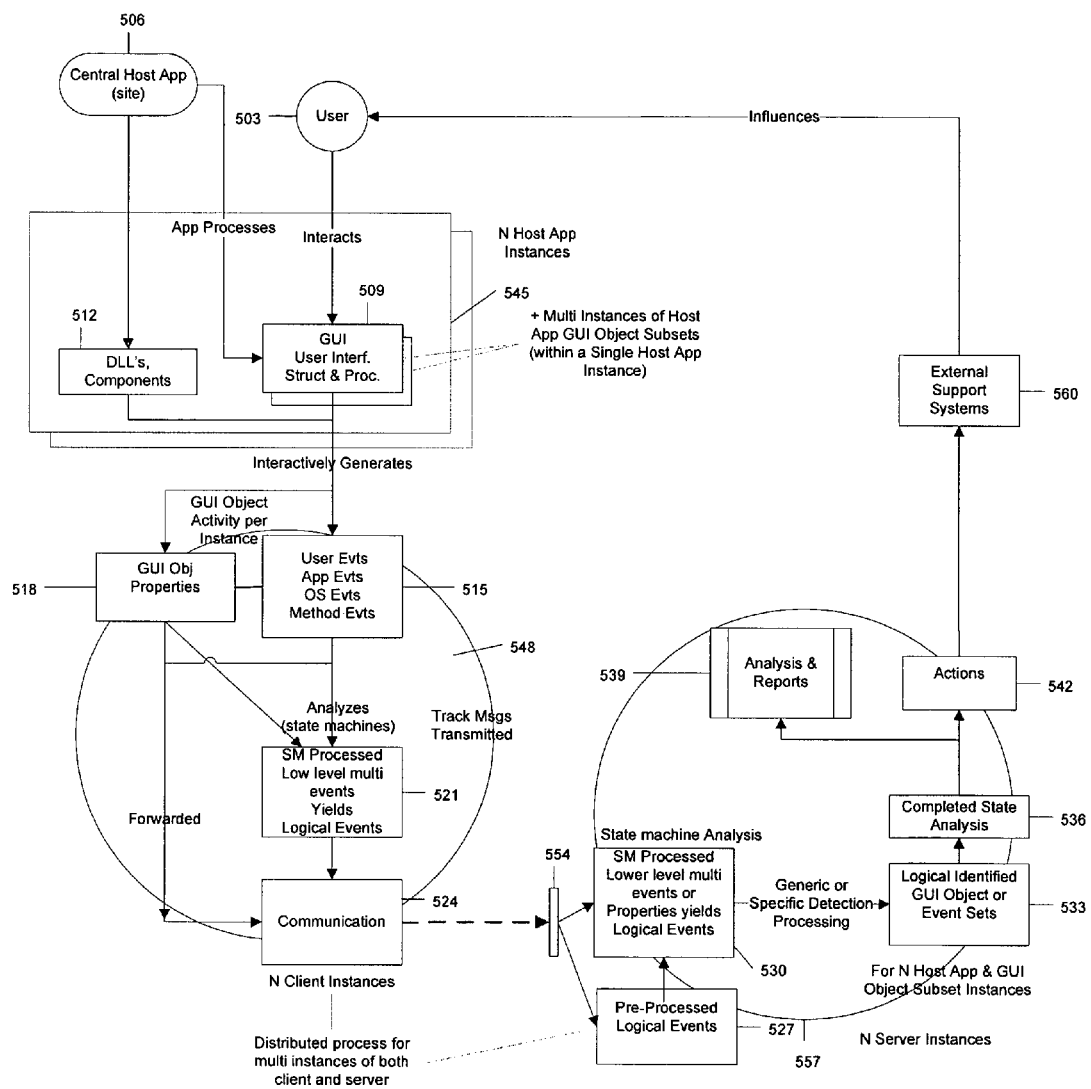

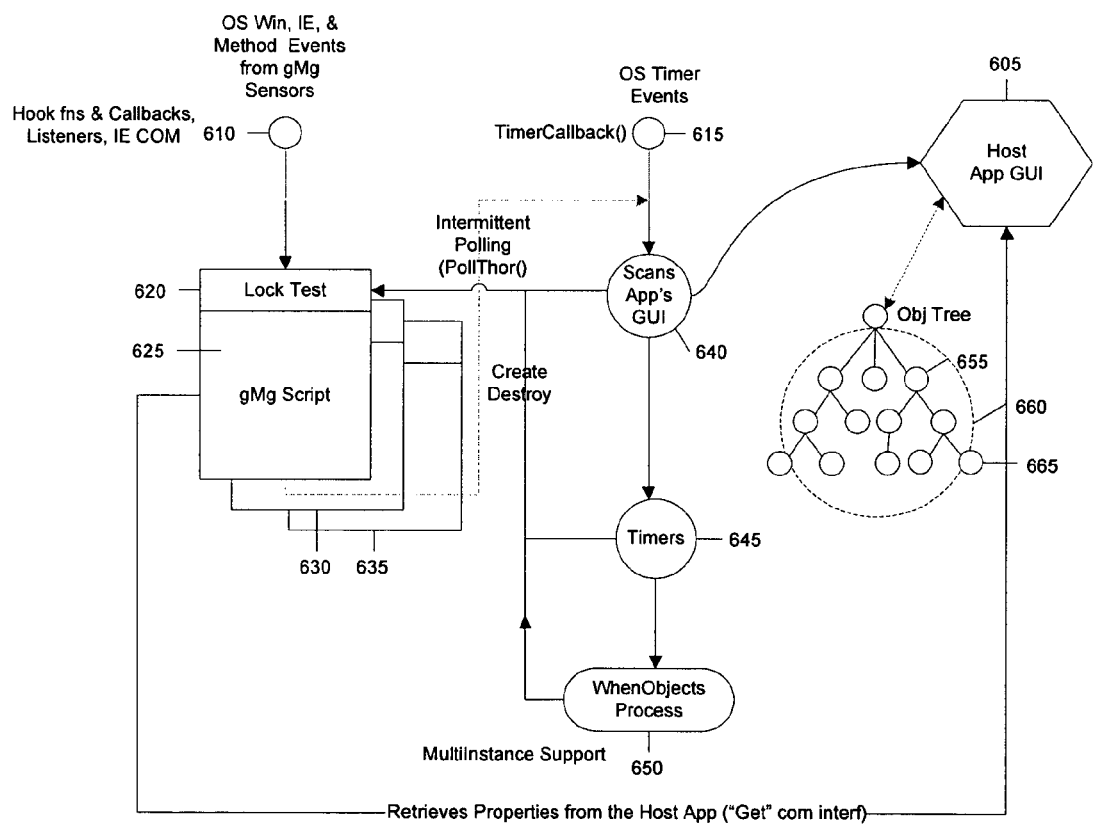
Fig. 6 Main Event Sources

Fig. 7 Updating of the GUI Object Tree
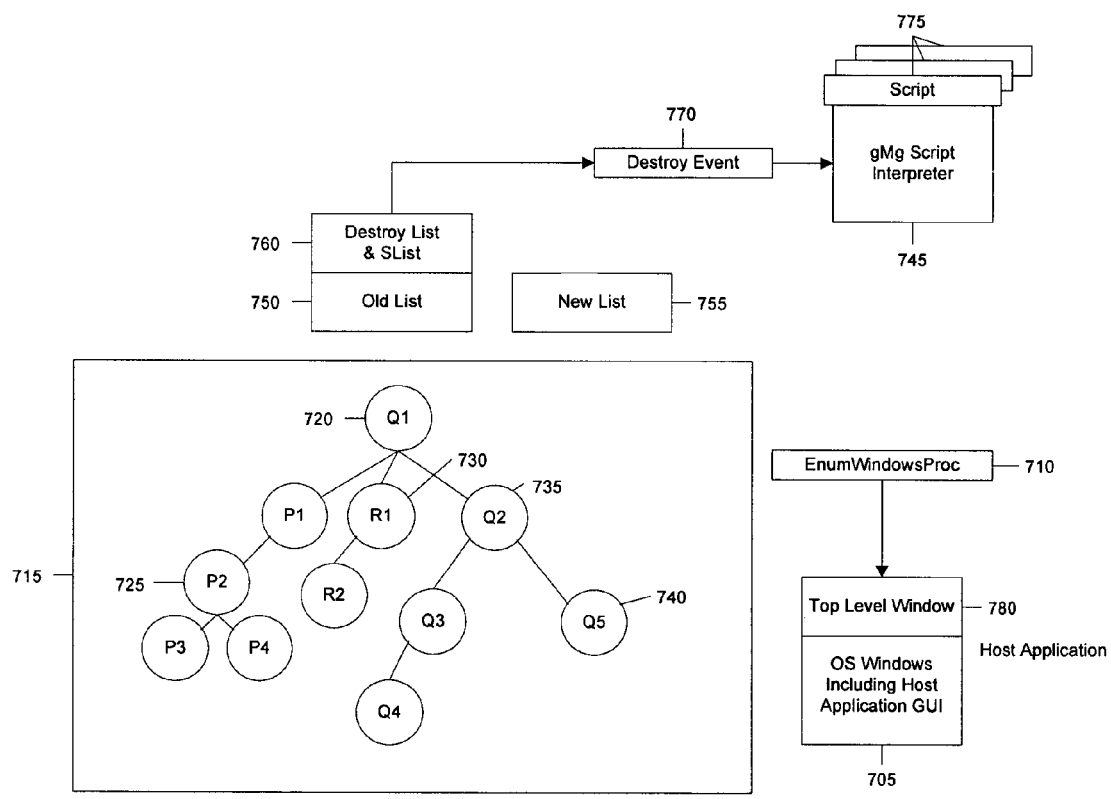

Fig. 8 Object Tree gMg Events
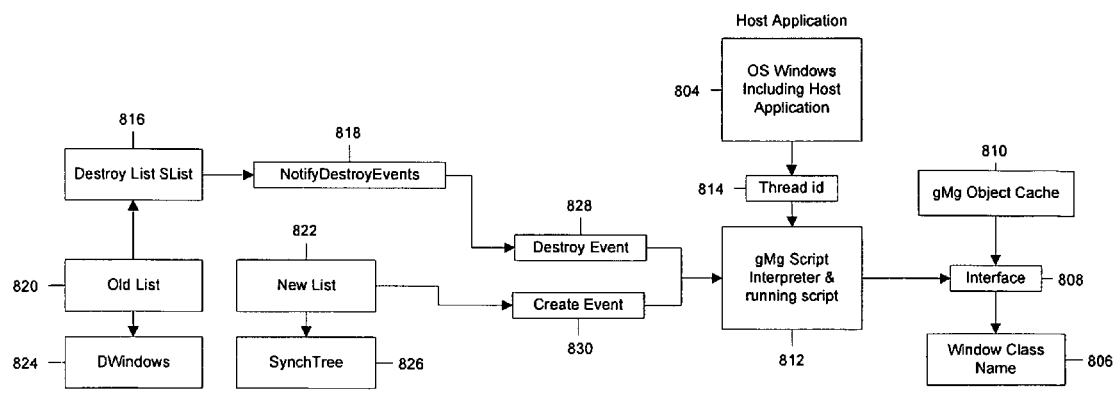
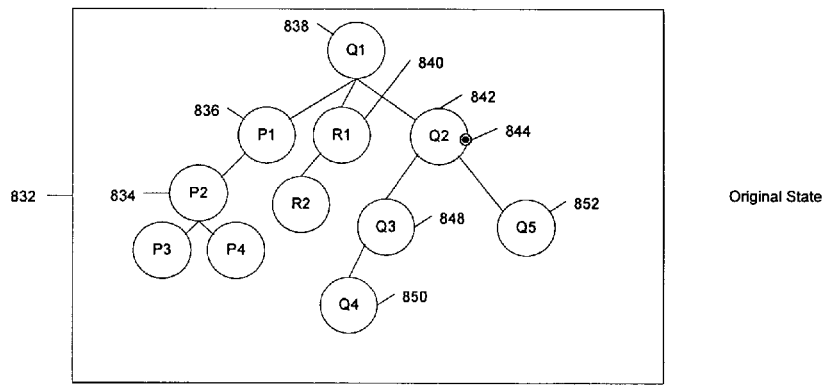
Original State
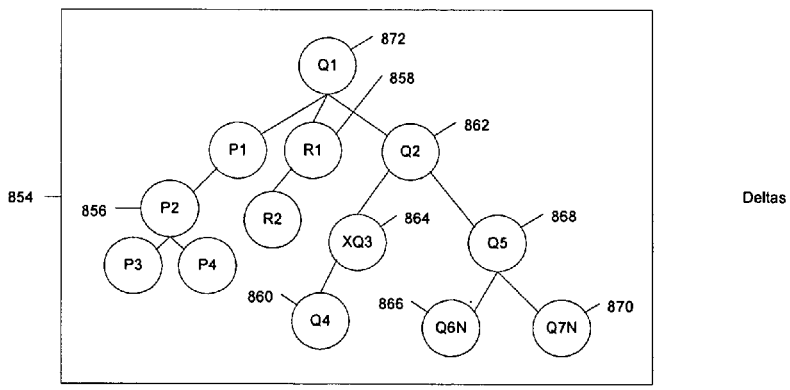
Deltas

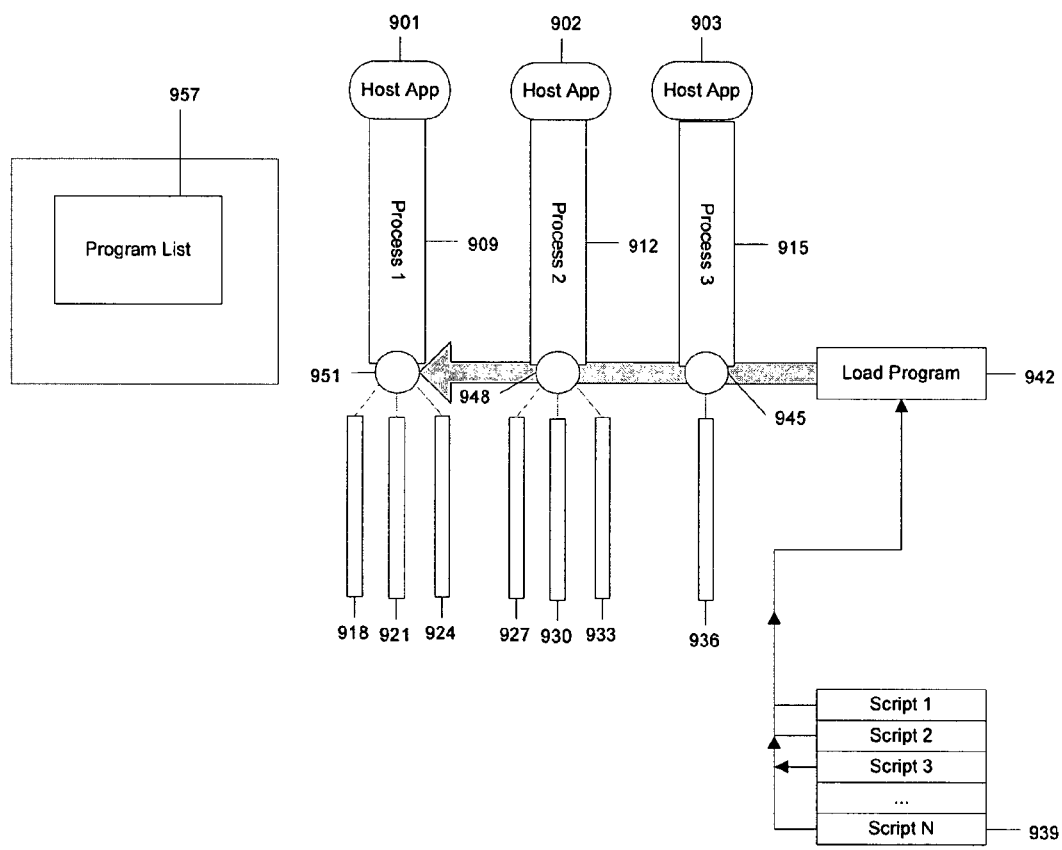
Fig. 9 Load Program

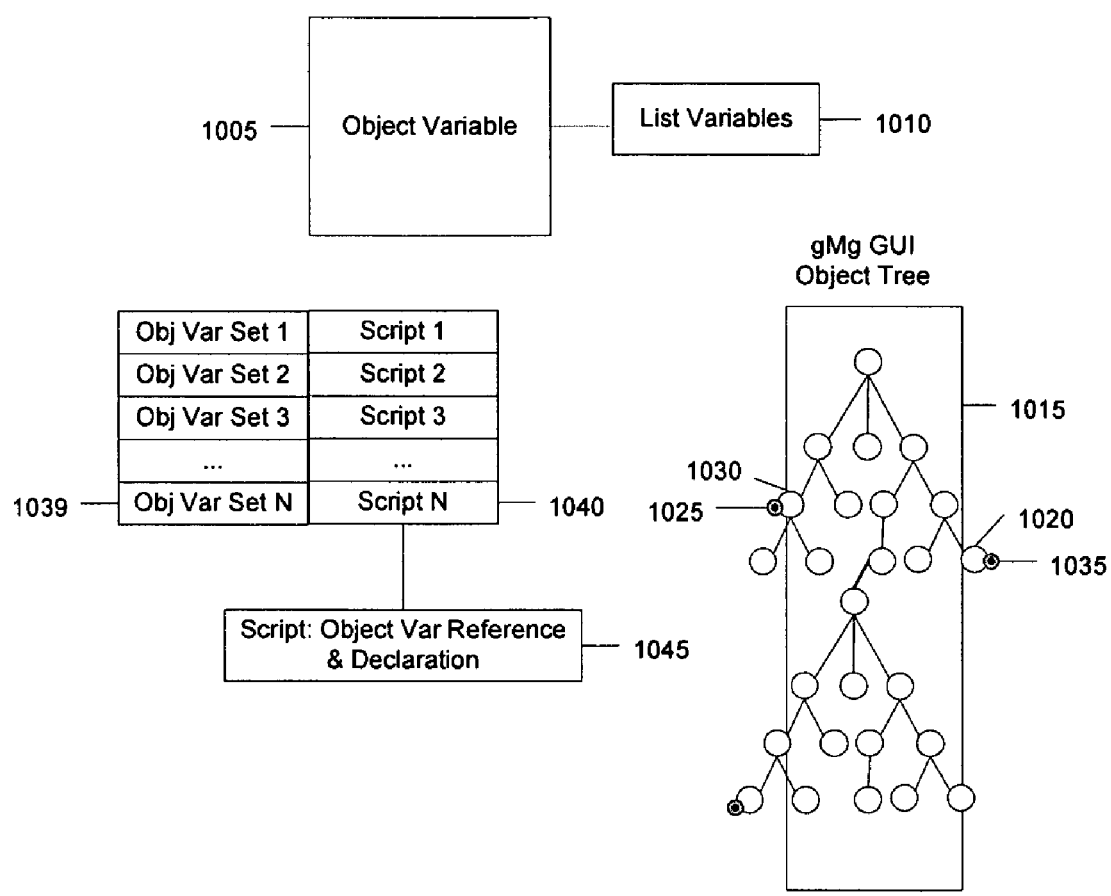
Fig. 10 Object Variables

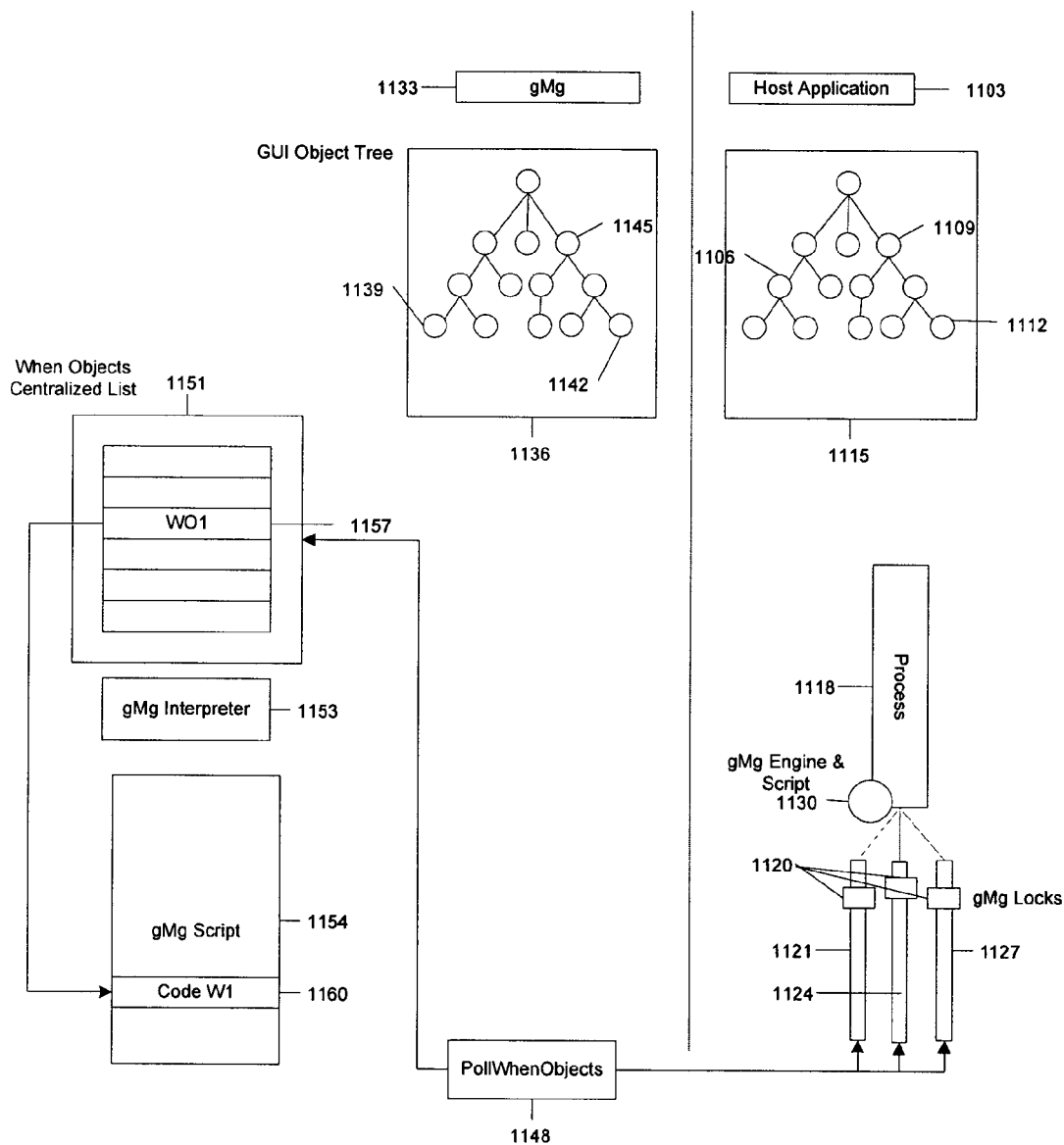
Fig. 11 WhenObjects

Fig. 12 Process Window Context
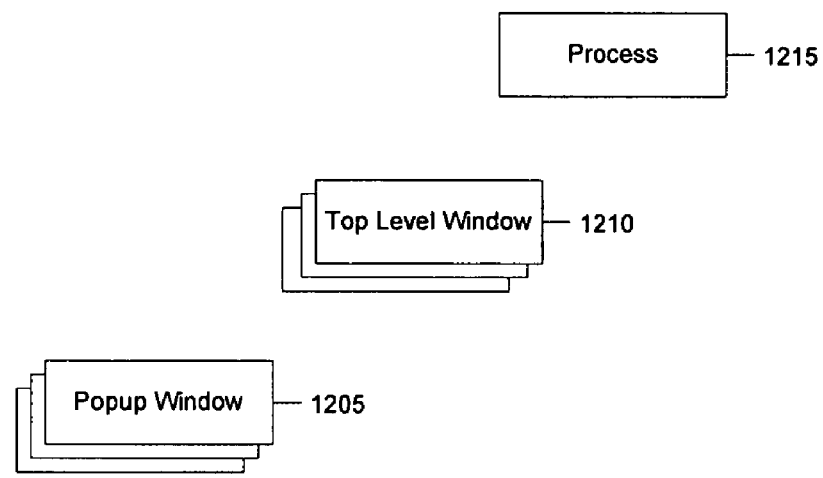

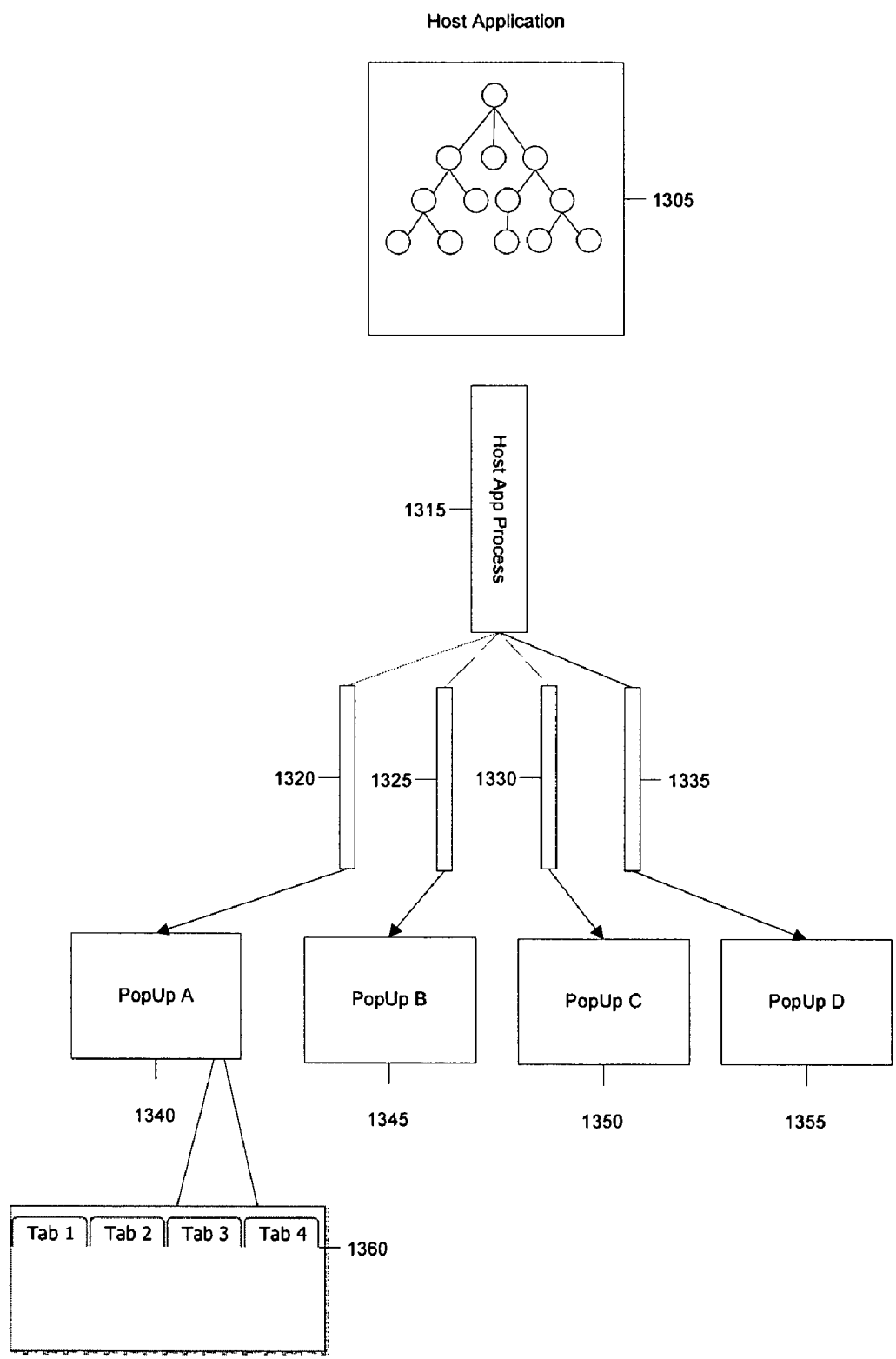
Fig. 13 Context and Multiple PopUp Windows

Fig. 14 Hooks
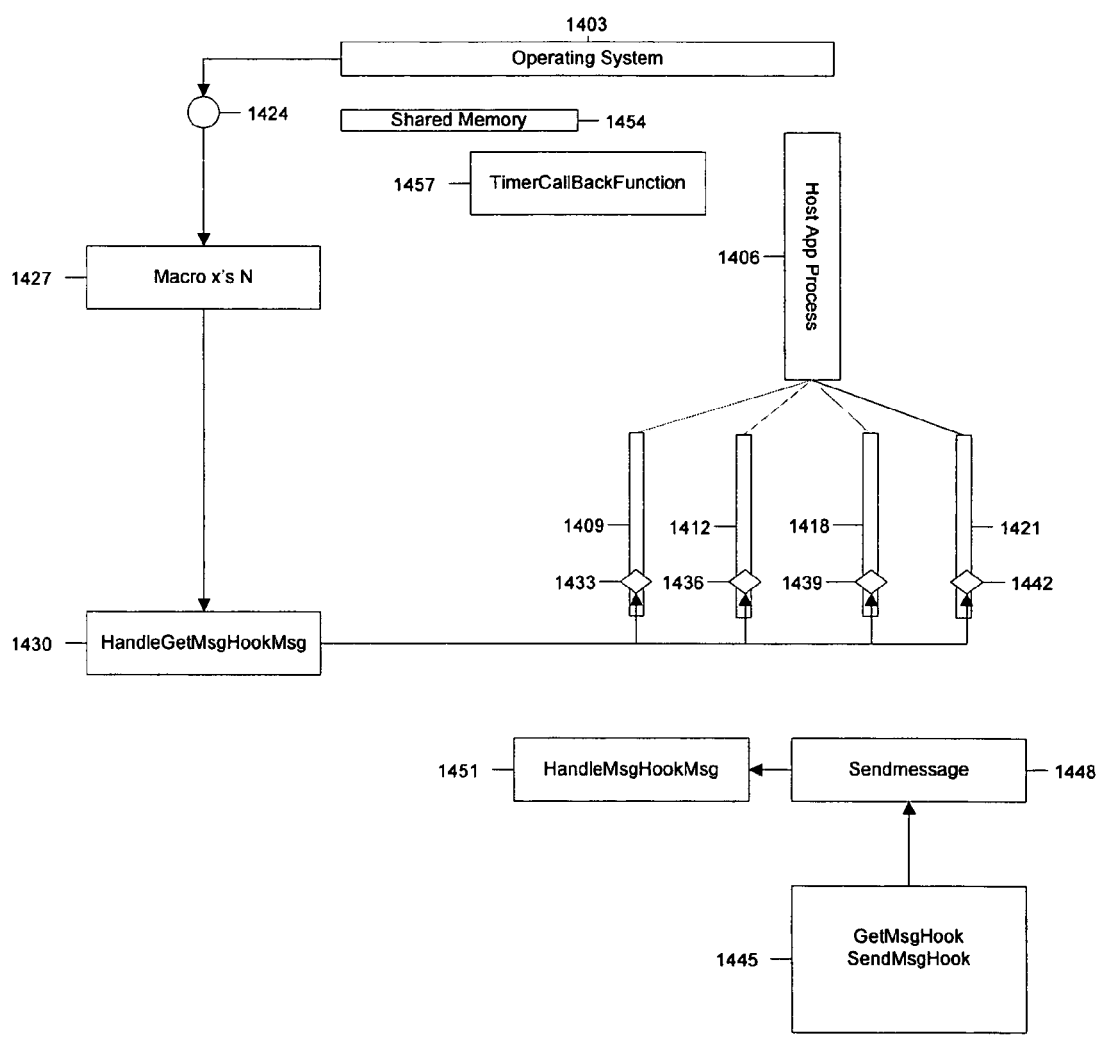

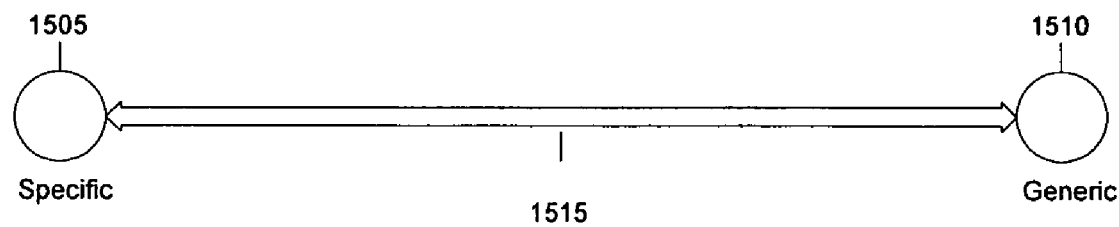
Fig. 15 Specific to Generic Spectrum

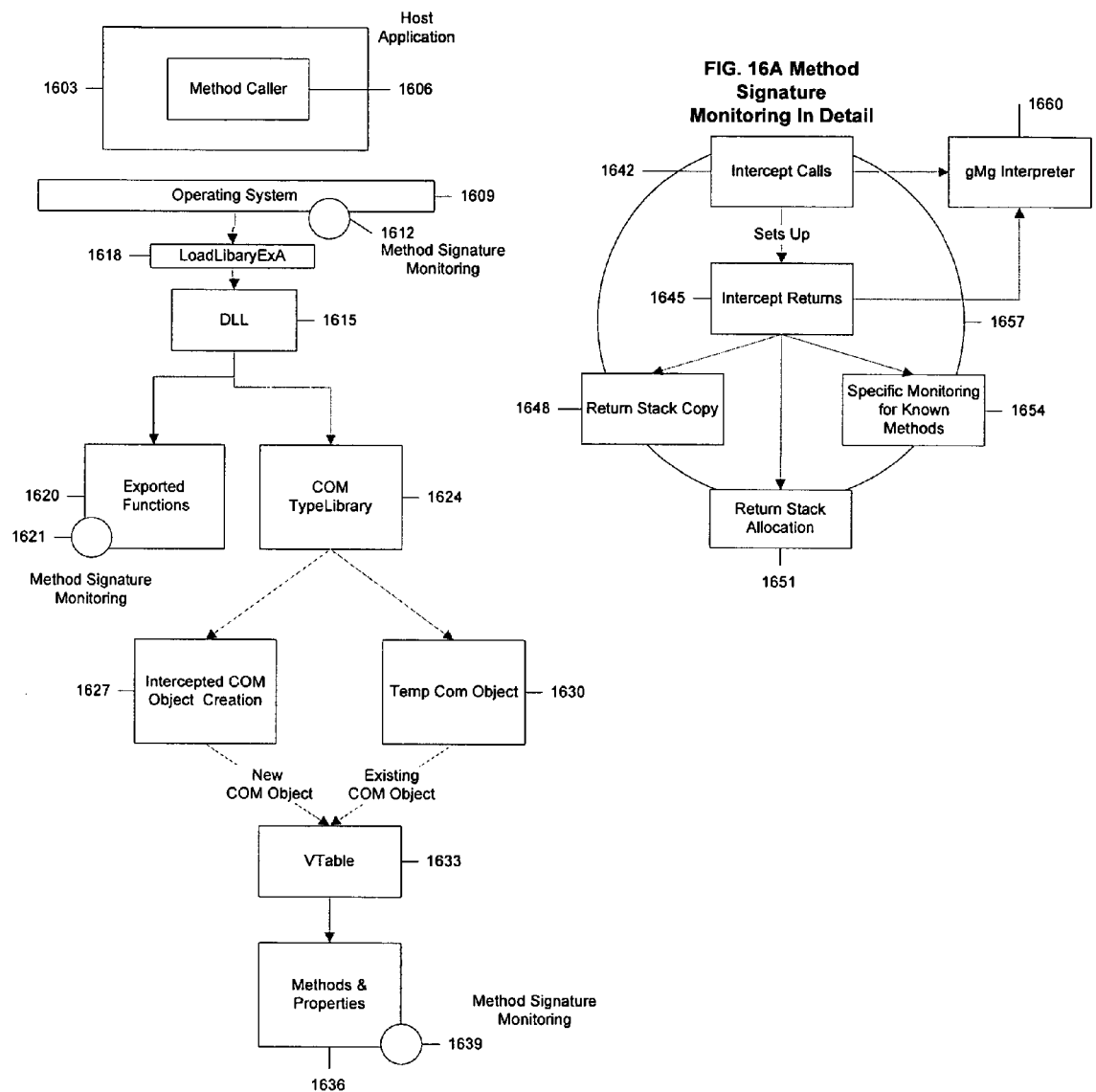
Fig. 16 Method Monitoring Overview

Fig. 17 Module Tree
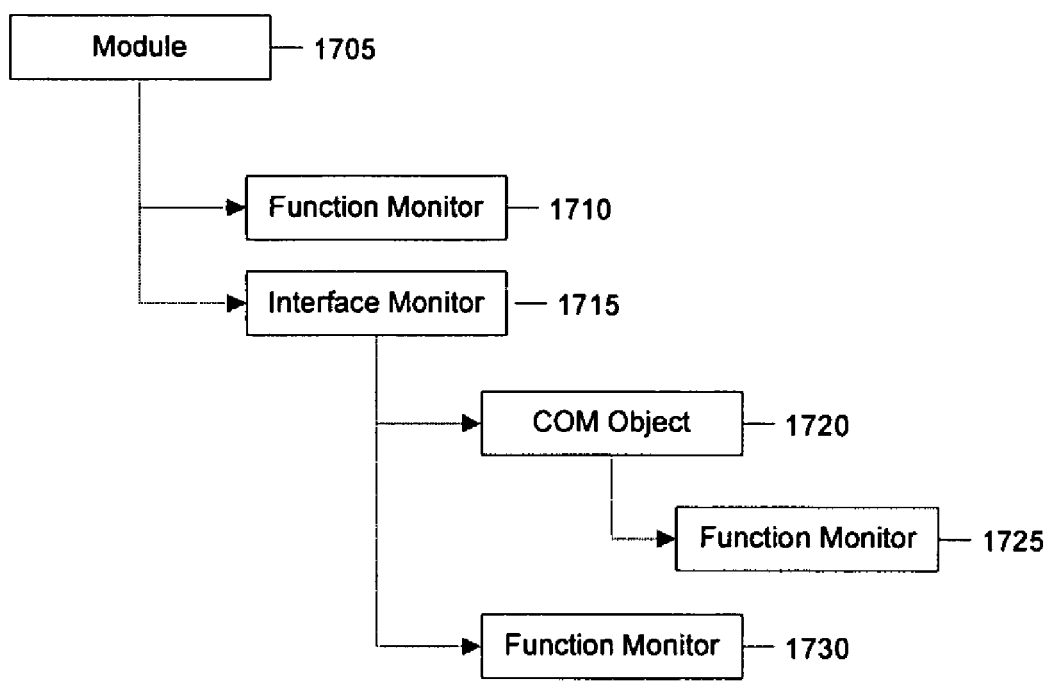

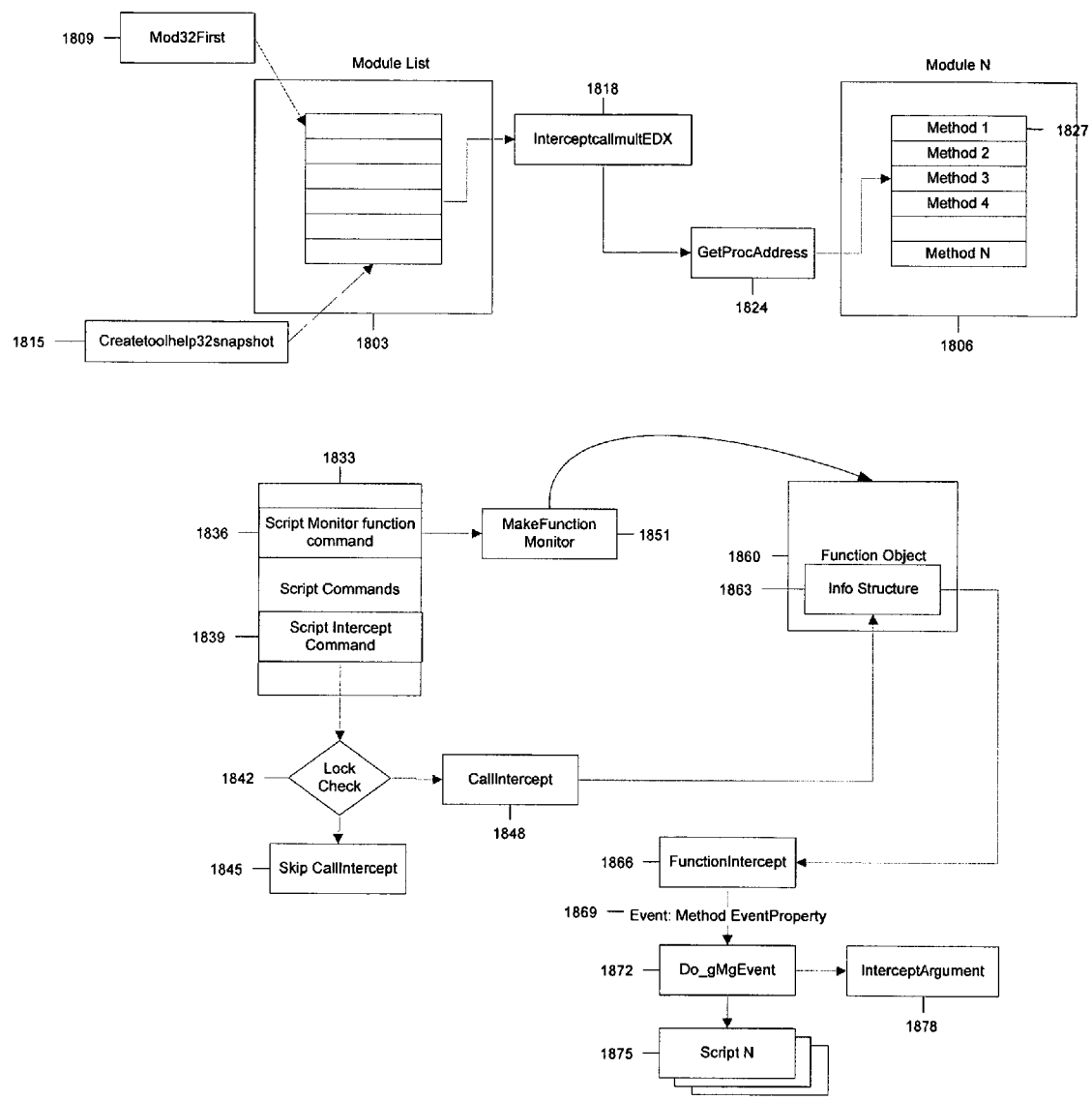
Fig. 18 Creation of a Method Monitor

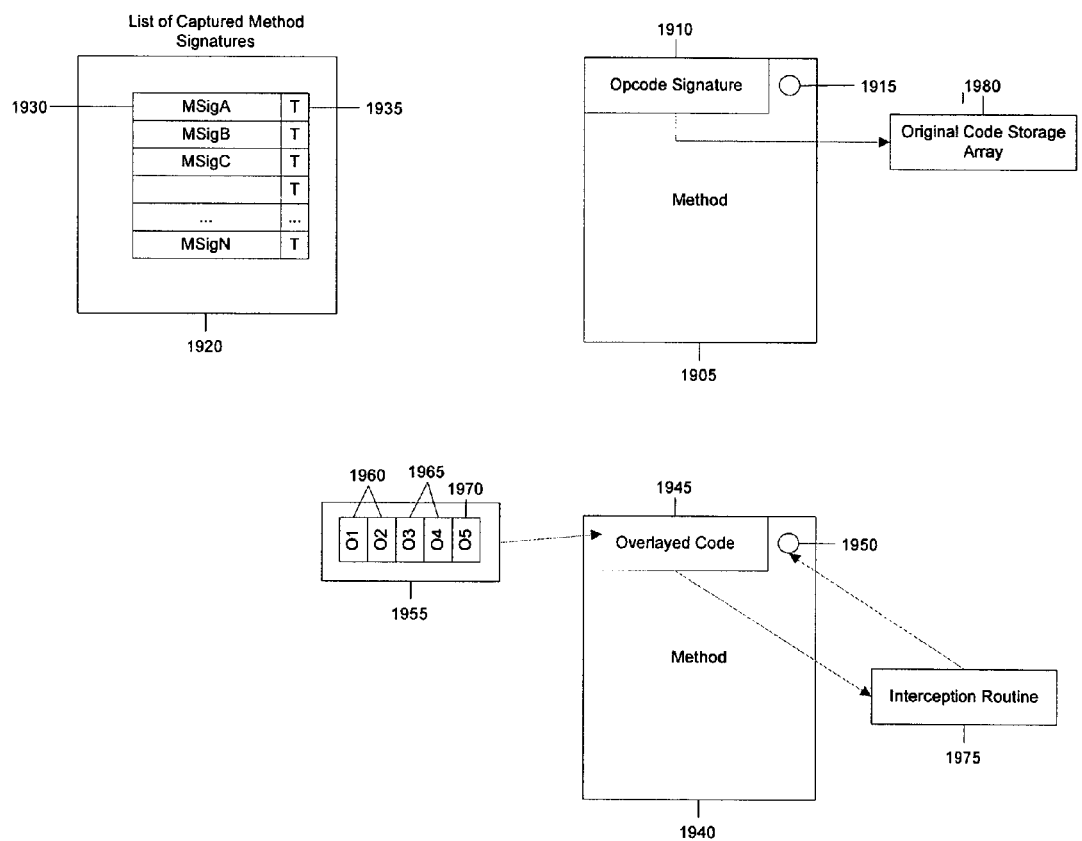
Fig. 19 Method Signature and Method Code Overlay

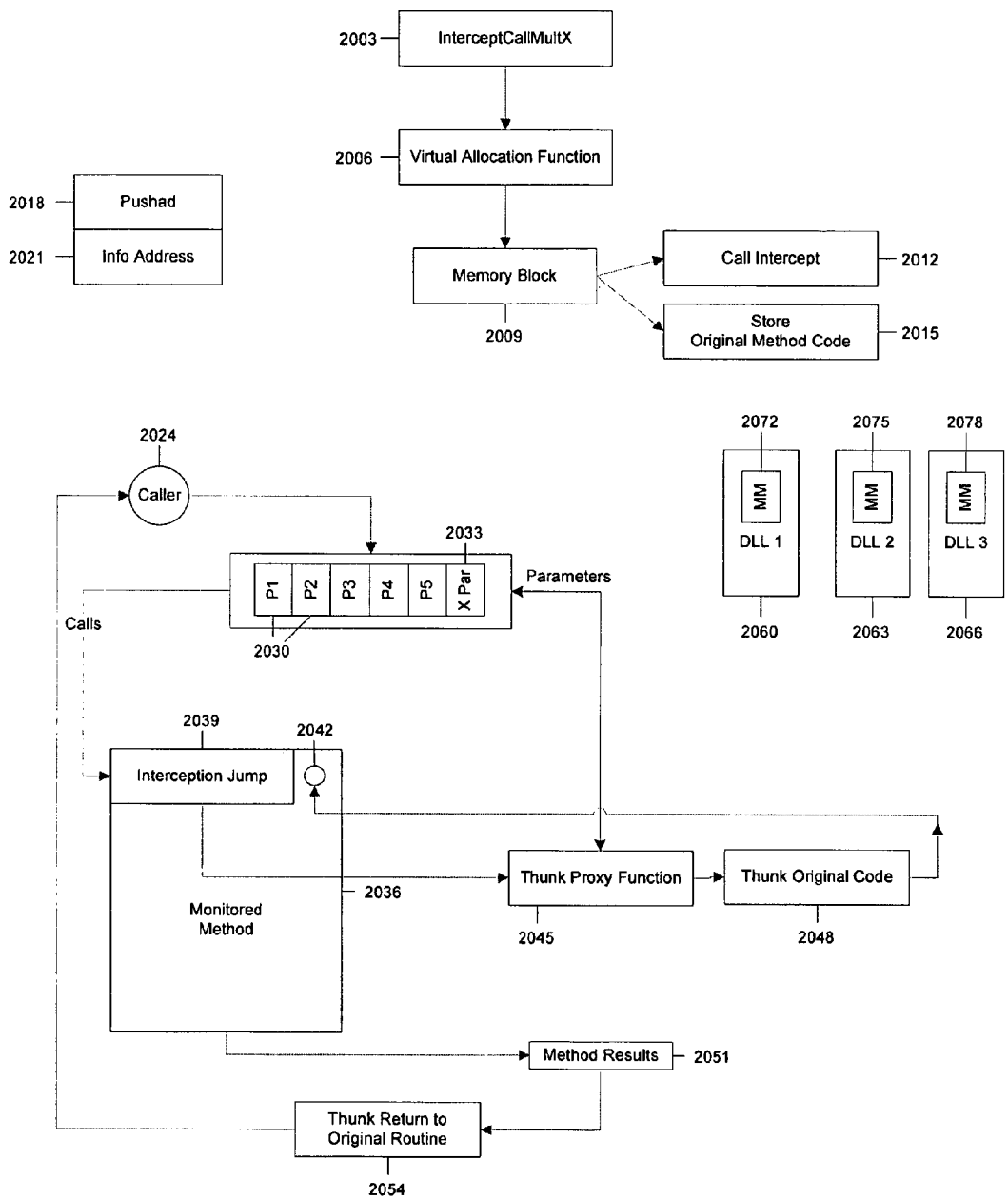
Fig. 20 Thunk Allocations for Method Monitoring

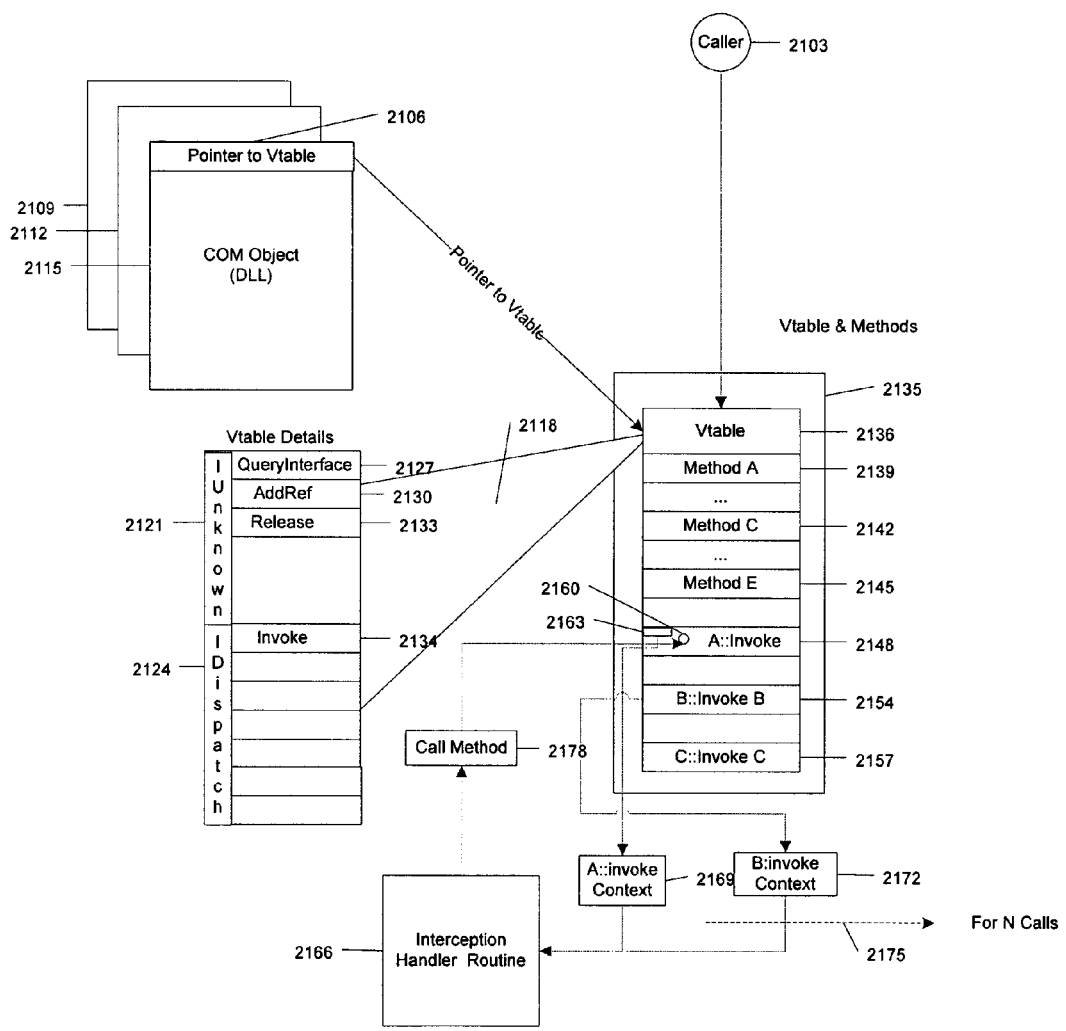
Fig. 21 Monitoring A Virtual Function Method

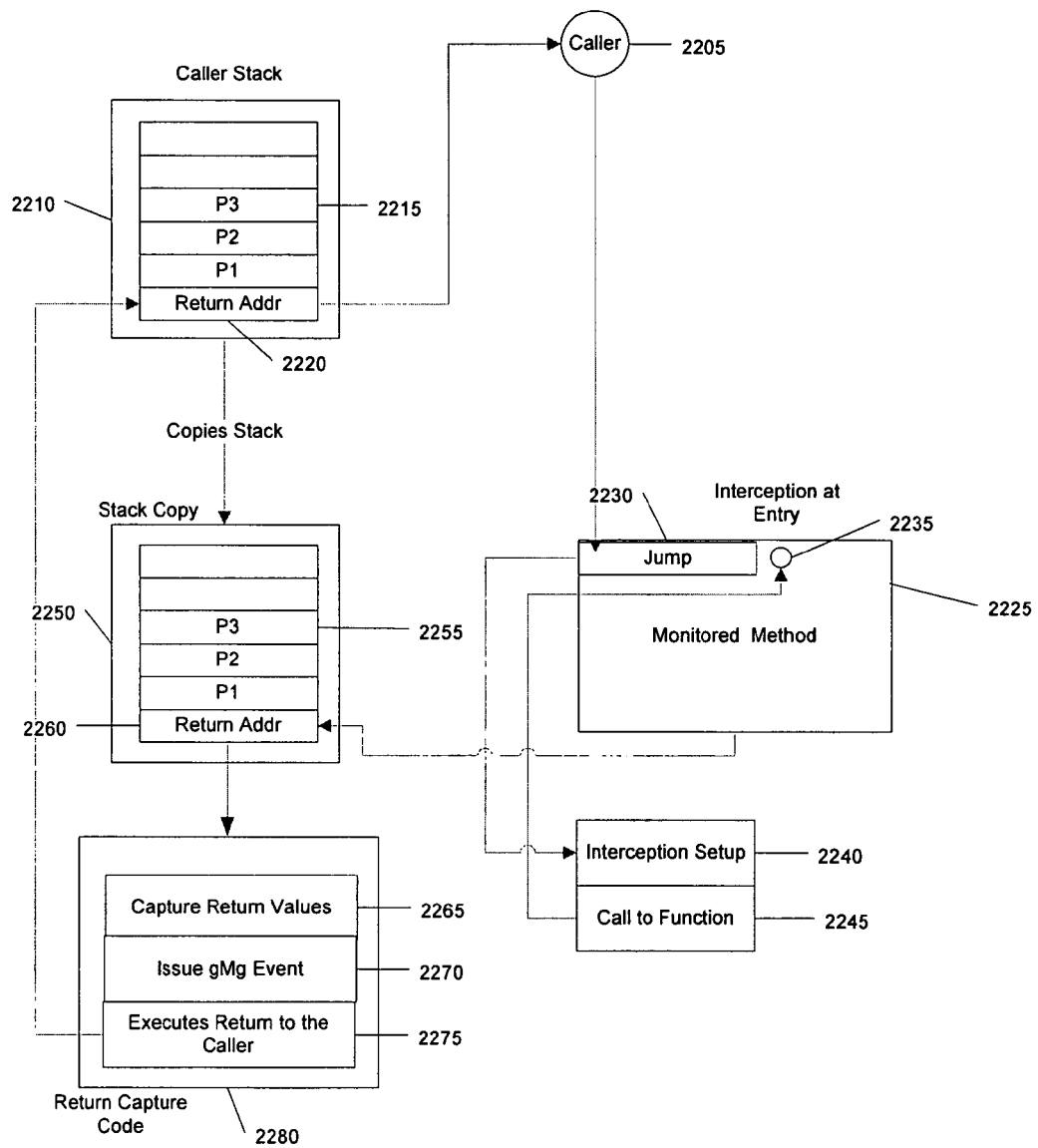
Fig. 22 Monitoring A Method Return - Stack Copy

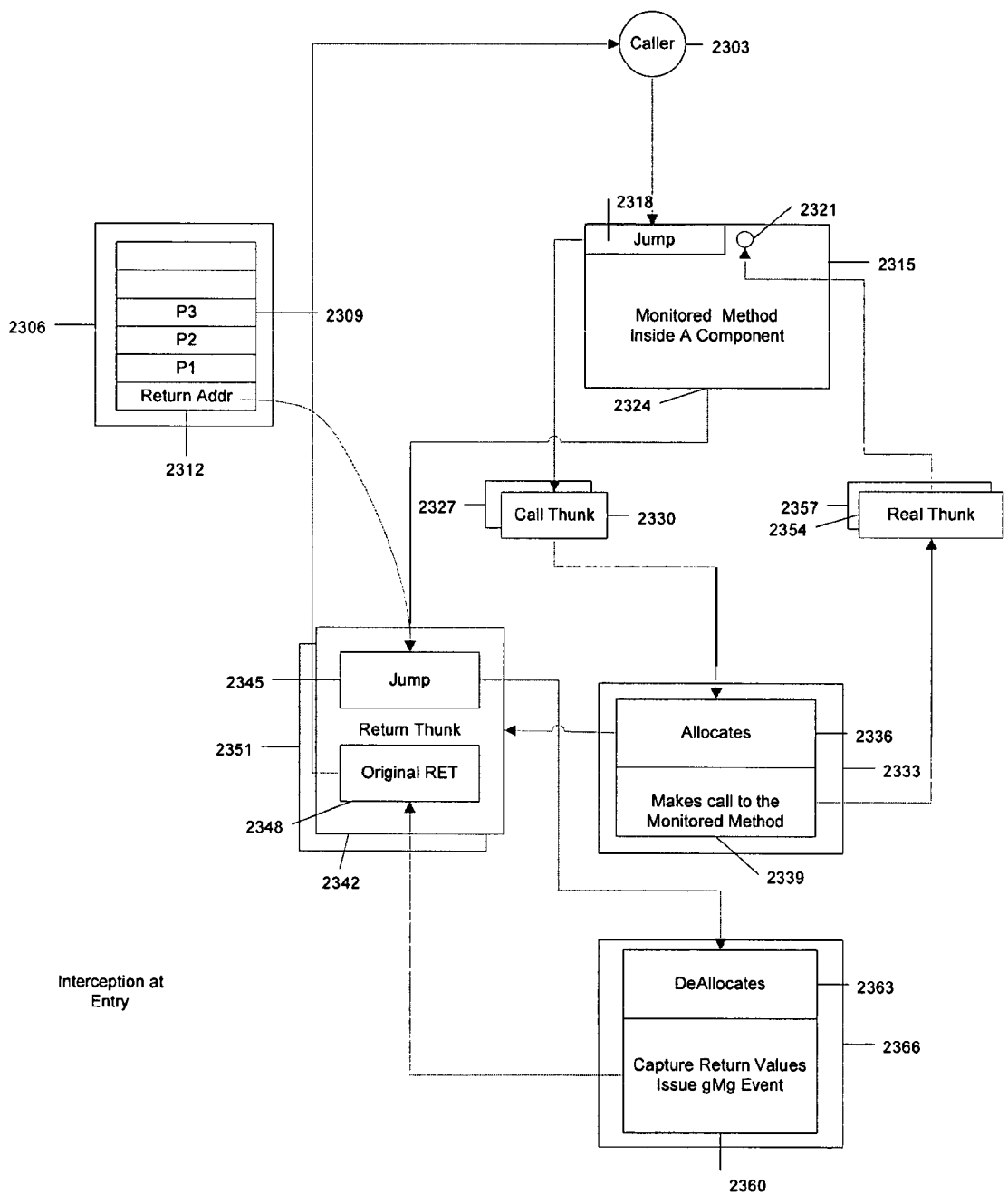
Fig. 23 Monitoring Method Return – Stack Allocation

Fig. 24 State Machine Hierarchy
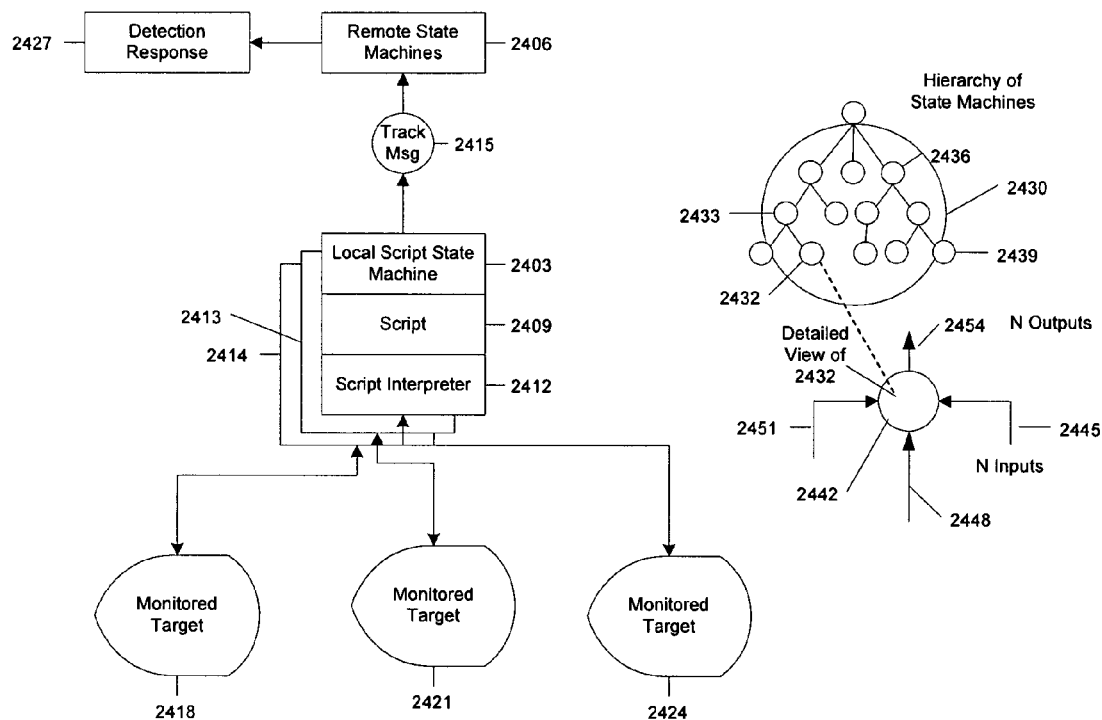

Fig. 25 Static and Instance Evaluation for Transitions
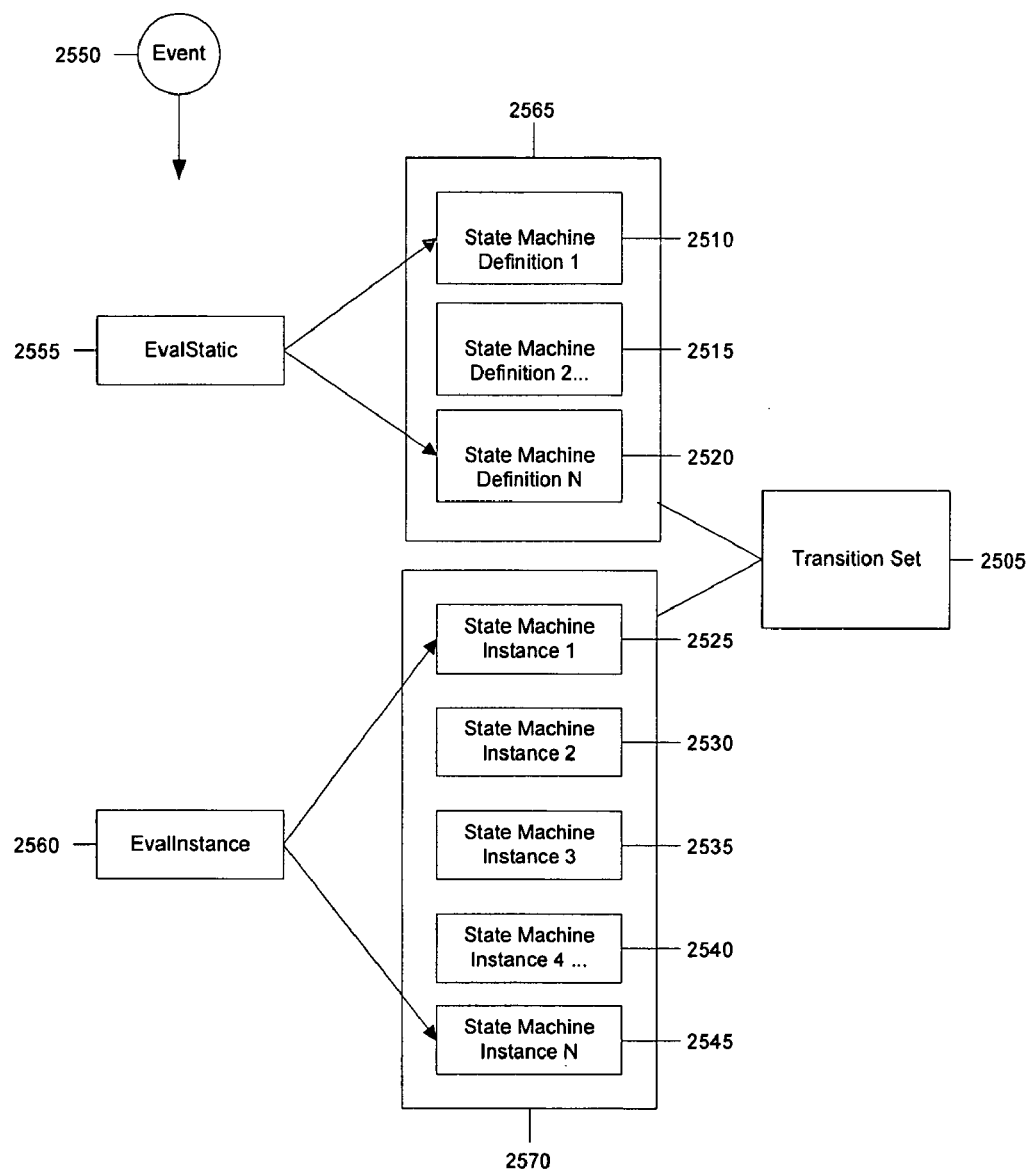

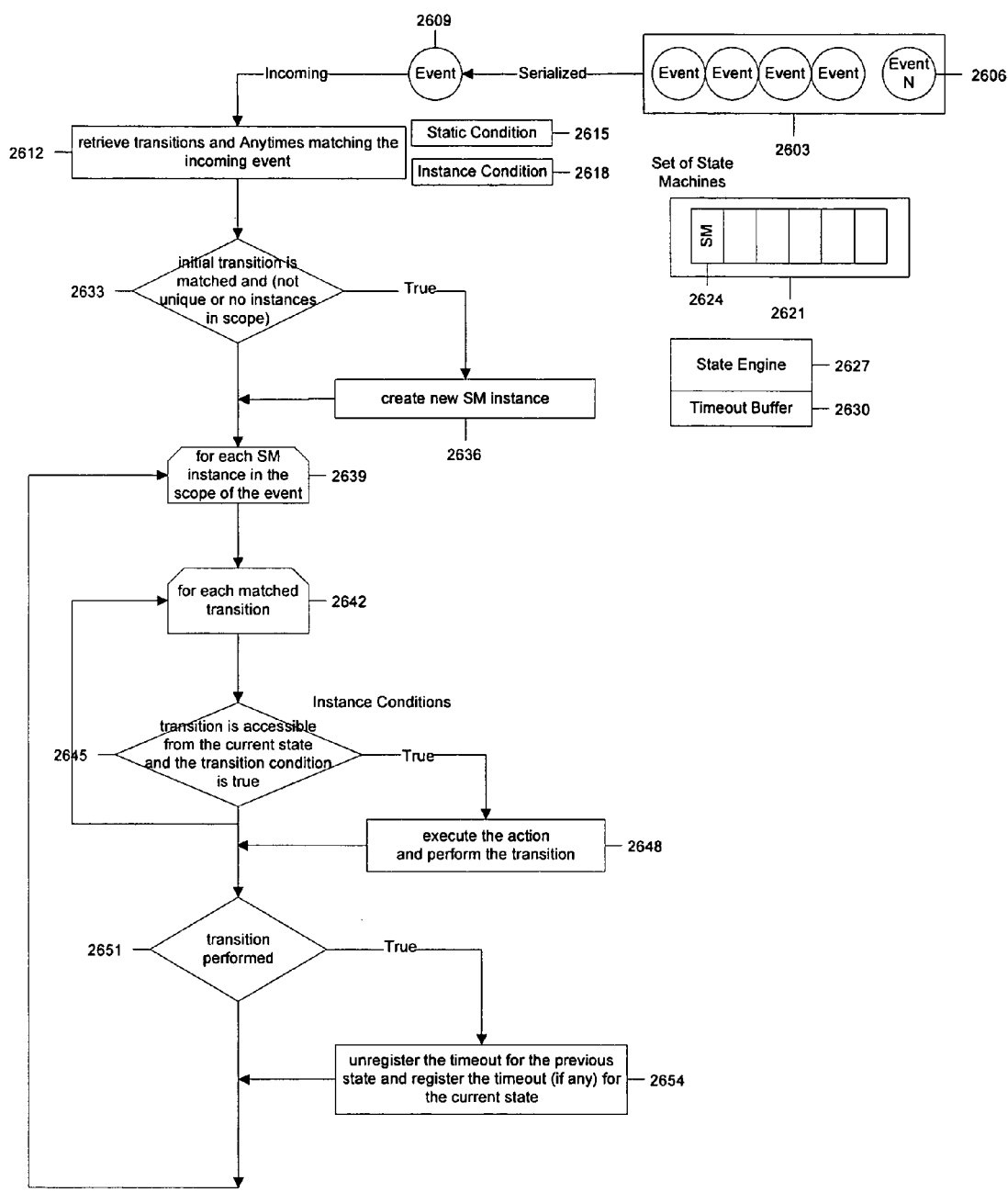
Fig. 26 State Machine Event Processing

GENERIC, MULTI-INSTANCE METHOD AND GUI DETECTION SYSTEM FOR TRACKING AND MONITORING COMPUTER APPLICATIONS

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

This invention relates to systems and methods for monitoring a user's interaction with a computer application, and more particularly to monitoring and analyzing the user/application interaction during a session along with the application's performance and behavior as it affects the User.

BACKGROUND OF THE INVENTION

In today's companies, enterprise applications provide functionality for executing business processes and in a complex global economy, applications consequently have become extremely complex to meet business requirements. The effort to acquire skills to master applications, coupled with changing applications built upon ever growing infrastructure, systematic measurement is a challenge for both user performance on an application and measurement of the application's performance for the user.

In general, User monitoring products can be divided into several categories: Performance Monitoring Capture, HTTP monitoring, HTTP Capture, Host Application Run Time Source Code Insertions, and Host Application Development Source Code Insertions or Compilation. The following products are representative of their respective categories.

There are products that monitor and capture performance on the end user's computer. Including a product sold by Reflectent Software, Westford, Mass. under the name EdgeSight views quantifies the performance and availability of applications and IT services from the end-user perspective allowing insight into how specific applications are performing and being utilized, both in real-time and historically. When crashes, errors, and hangs occur information and forensic data required is immediately available to pinpoint the root cause of the issue. It does not generate monitoring data from the GUI presentation layer of a Host Application and does not monitor any activity in between transactions. It cannot detect subsets of GUI objects in generic, categorized sets. It cannot support multi instances of Host Applications at the GUI level. It has no ability to perform Method Monitoring of function calls. It does not support distributed local and remote state machines for efficient and rapid processing.

Conventional products are available to monitor HTTP traffic on a client computer. For example, End User Monitoring, available from Mercury Corporation, Mountain View, Calif. proactively monitors web site and application availability in real time, from the end-user perspective. It proactively emulates end-user business processes against applications. It does not generate monitoring data from the GUI presentation layer of a Host Application and does not monitor any activity in between transactions. It cannot detect subsets of GUI objects in generic, categorized sets and furthermore, offers no ability to do Method Monitoring. It cannot support multi instances of Host Applications at the GUI level. It does not support distributed local and remote state machines for efficient and rapid processing.

A product sold by Candle Corp. (IBM/Tivoli) under the trademark ETEWatch measures transaction-level end-to-end response time the wait time a user experiences as an application loads its screens or performs an action. It does not generate monitoring data from the GUI presentation layer of a Host Application and does not monitor any activity in between transactions. It cannot detect subsets of GUI objects in generic, categorized sets. It cannot support multi instances of Host Applications at the GUI level. It has no ability to perform Method Monitoring of function calls. It does not support distributed local and remote state machines for efficient and rapid processing.

A product sold by Compuware, Detroit, Mich., under the trademark Vantage 9.7 correlates application performance data and events to factors important to the business, such as applications, transactions, roles and locations. Additional views integrate end-user response time metrics with extended troubleshooting capabilities. This allows IT organizations to resolve performance problems and manage their applications and infrastructure proactively. It does not generate monitoring data from the GUI presentation layer of a Host Application and does not monitor any activity in between transactions. It cannot detect subsets of GUI objects in generic, categorized sets. It cannot support multi instances of Host Applications at the GUI level. It has no ability to perform Method Monitoring of function calls. It does not support distributed local and remote state machines for efficient and rapid processing.

There are products that capture HTTP traffic on a server. A product sold by TeaLeaf Technology, Inc. of San Francisco, Calif. under the name RealiTea passively captures what every customer does and sees in real time, enabling immediate detection, analysis, and response to issues. It validates each customer's unique actions against expected outcomes across a multi-step business process. It does not generate monitoring data from the GUI presentation layer of a Host Application and does not monitor any activity in between transactions. It cannot detect subsets of GUI objects in generic, categorized sets and furthermore, offers no ability to do Method Monitoring. It cannot support multi instances of Host Applications at the GUI level. It cannot be implemented transparently and requires changes to application source code or requires some output from the compilation process. It does not support distributed local and remote state machines for efficient and rapid processing.

There are products that do code insertions into the Host Application at run time. A product sold by Veritas under the trademark $i^3$ proactively monitoring, analyzing, and tuning SAP, Siebel, etc. applications. It provides a complete view of application performance by capturing, measuring, and correlating performance metrics from each supporting tier of applications infrastructure (web server, application server, database, and storage). While this product does see GUI events it is restricted to web applications and has no concept of detection of generic GUI object sets. Additionally, it requires the insertion of source code at the application's site which is a very intrusive process and is not a transparent implementation process. The Veritas product is incapable of detecting anything directly from the operating system level. It cannot detect events or retrieve properties directly from component methods (i.e. functions) methods or directly interface with a Win32 application. Furthermore, with the Veritas product, concurrent measurements of multiple different application types such as web and Win32 are not possible. Still further, there is a lack of persistence across pages with no concept of localized state machines for execution of real time alerts. It does not support distributed local and remote state machines for efficient and rapid processing.

There are products that use files resulting from compilation of source code at development time. A product sold by Identify Software, New York, N.Y. under the name AppSight Black Box deployed on servers and/or clients, records application execution at multiple, synchronized levels, based on a dynamic, user-defined recording profile. Black Box requires no changes to source code or executables. Client-side, it has Video-style capture of user actions and screen events. This product does not do transaction response measurement. Furthermore, while this product does a form of method monitoring it relies on files generated during compilation of development source code and is not strictly support a transparent implementation process. The current invention described in this application achieves method monitoring without requiring compiled source files, and furthermore, also monitors function returns as well. It does not generate monitoring data from the GUI presentation layer of a Host Application at the GUI object level from GUI Object models. It cannot detect subsets of GUI objects in generic, categorized sets. It cannot support Multi-Instances at the GUI level of Host Applications. It cannot be implemented transparently and requires changes to application source code or requires some output from the compilation process. It does not support distributed local and remote state machines for efficient and rapid processing.

U.S. Pat. No. 6,108,700 entitled "Application End-To-End Response Time Measurement and Decomposition" relates to end-to-end measurements generally across all tiers and is a framework for integrating a spectrum of data types. U.S. Pat. No. 6,078,956 entitled "World Wide Web End User Response Time Monitor" discloses monitoring requests at the HTTP level where a response time associated with a first HTTP request is calculated, then passed to a server, and logged for a later use. U.S. Pat. No. 5,991,705 entitled "End-To-End Response Time Measurement for Computer Programs Using Starting and Ending Queues" and its continuation U.S. Pat. No. 6,202,036 each relate to a system for measuring end-to-end response time for a transaction performed by a computer. U.S. Pat. No. 6,189,047 entitled "Apparatus and Method for Monitoring Event Queue Operations With Pluggable Event Queues" discloses the use of customized message queues to reflect system message queues used by an application as a result of user GUI interaction. Each of the aforementioned U.S. patents is hereby incorporated by reference in their entirety.

Particularly, the prior art patents U.S. Pat. Nos. 5,991,705—6,108,700—and 6,078,956 fail to disclose a method or system that can generate monitoring data from the GUI presentation layer of a Host Application. None of the techniques described in the prior art support distributed (localized and remote) state machines for rapid event processing, nor do they implement any modeling or tree structures of GUI object sets beyond simple queues, nor do they support the handling of GUI Multi-Instances. None of the techniques in the prior art disclose the use of subsets of GUI objects in generic, categorized sets, and furthermore, offer no ability to do Method Monitoring. The prior art also does not provide a GUI Context for all other forms of non-GUI data.

The present application is directed to similar subject matter as applicant's issued patent (U.S. Pat. No. 6,340,977, titled "System and Method For Dynamic Assistance In Software Applications Using Behavior and Host Application Models"), and to applicant's pending continuation application (U.S. Ser. No. 09/989,716, filed Nov. 20, 2001 ). Applicant also has commercial implementations sold by applicant under the brandnames "User Performance Measurement 3.0 (Knoa Operation Response Time Monitor, Knoa User & Application Errors Monitor, Knoa Application Usage Monitor)," "Knoa Business Process Meaurement 3.0 (Knoa Business Process Monitor)," and "Knoa Compliance Measurement 2.0 (Knoa User Compliance Monitor)." The present application addresses and improves upon the applicant's prior work.

Missing from the art is a GUI detection and monitoring system that is capable of automated detection of multi-instances of a host application, and detection of multi-instances of subsets of GUI structures. Further missing from the art is a system capable of generic detection of categories of GUI objects within multi-instances of host applications, or subsets of the host applications. The present invention provides these and other needs.

SUMMARY OF THE INVENTION

In one aspect of the invention, provided is a method for monitoring events derived from a computer target application presentation layer. The method including the steps of providing, independent of recompiling the target application's source code, a script running at a level within the target application. The script scans run-time instantiations of objects of the target application, and allocates structures in real-time to the object instantiations. These allocated structures are adapted to create a reflection of the target application structure, which is used along with detected object instantiations that match a predetermined object structure to capture a portion of an environmental spectrum of the detected object.

In another aspect of the invention, a method processes state machine events occurring on at least one of a server machine and a client/localized machine, correlates the state machine events with the environmental spectrum, and deduces a user experience based on the correlated state machine events.

In yet another aspect of the invention, a system configured to monitor events in a computer target application presentation layer comprises a server and a client computer interconnected on a communication network, where the server operating instructions include a monitoring program that includes a script operable to run at a level below the presentation layer. The monitoring program includes instructions to perform scanning of run-time instantiations of objects including method calls, method returns, and GUI objects of the target application, allocating structures in real-time to the object instantiations, adapting the allocated structures to create a reflection of the target application structure, detecting one or more object instantiations that match a predetermined object structure, and capturing at least the contents of the detected objects.

These and other aspects, features, and advantages can be further appreciated from the accompanying drawing Figures and description of certain illustrative embodiments.

DEFINITION OF TERMS

The terms used in this specification generally have their ordinary meanings in the art, within the context of the invention, and in the specific context where each term is used. Certain terms are discussed below, or elsewhere in the specification, to provide additional guidance to the practitioner in describing the devices and methods of the invention and how to make and use them. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to the preferred embodiments.

"Agent" means a primary code unit that is associated with one or more running instances of a single engine DLL.

"Component" means a general operating system package comprised of programming code and data to be executed. Component programming code contains methods or function calls that are used to execute functionality of an application or service and facilitates code reuse and modular packaging for a complex Host Application. Components implement many different technologies created by companies to promote reuse and the publication of interfaces for external applications. Components containing object oriented classes or programming code may be implemented in component technologies such as Microsoft's (i.e. Microsoft Corporation of Redmond, Wash.) Component Object Model (COM), a framework for developing and supporting program component objects COM or other kinds of component technologies.

"Environmental Spectrum" means invariant and time variant conditions present in a target application, and manifested in, but not limited to, objects, GUI objects, messages, method calls, and method returns.

"Event Model" means a set of events whose detection and collection of events reflects and represents some real process that has taken place in a Host Application.

"Exported Function" is a method interface that is exposed in a DLL component where the exported function's name is documented in program module headers.

"Framework" means a working fundamental structure for modeling states and the detection of GUI objects and Method call and return events.

"Generic" means an operation which detects a set of targets. This set can be referred to as a class or category of similar objects and is used here to describe sets of GUI objects, method, or other events. The opposite of Generic is Specific which usually refers to a single GUI object, method or other event.

"gMg Engine" means the script interpreter that processes binary script files that contain the logical and conditional descriptions that execute selective monitoring within monitoring targets.

"gMg GUI Object Tree" means a hierarchical structure used in the invention to model and represent live GUI objects comprising the user interface of a Host Application "gMg GUI Context" means, within the gMg System, the interleaving of any data type within a stream of GUI data where the GUI data provides a GUI (or user) context for the purpose of analysis to better reflect the user's experience on an application.

"gMg Solution" means binary packaging of compiled script that describes the conditions, logic, and selective targets executed for the purpose of Host Application monitoring.

"GUI" is an abbreviation for graphical user interface which is controlled by a Host Application. It is the primary interface between the user and the Host Application. "GUI object" is a type of object that is part of a programmed GUI structure normally in RAM, that comprises the user interface that is displayed or reacts to and is controlled by computer input devices through Host Application code.

"Hook" means the part of the sensor that performs the capture of operating system messages or messages generated by a Host Application to be further processed by an external system to perform filtering or alter actions based on the Host Application's run time messaging.

"Host Application" means the application targeted for monitoring.

"IE" stands for Microsoft's Internet Explorer, an Internet browser application.

"Instance" means some functionality of a program whose operating code can be traced to a deriving set where a single deriving set can instantiate one or more operating units into memory to implement functionality. The program code residing in memory that has been initiated and running as a result of the deriving operation is referred to as an instance.

"Logical Events" mean state machine processed events which represent a targeted state that can be processed to one or more levels—i.e., successive stages of state machine processing at different physical locations such as in a client(s) or server(s).

"Method" is used synonymously with function as in a program function and vice versa. The Method/Function resides in a component or library.

"Method Events" mean events generated by monitoring a component's method or function (e.g. a program function or method).

"Multi-Instance" means that more than one instances of a designated unit are residing concurrently in memory.

"Object Variable" means a specialized object of the invention which attaches to an existing GUI object member residing in the GUI Object Tree.

"OS" is an abbreviation for computer operating system.

"Sensor" is a specialized code unit which retrieves realtime data from application components using public or private interfaces.

"Specific" means one operation will detect one logical condition such as the detection of a single GUI Object.

"State Machine" means a processing unit that has input and output events and determines discrete, distinctive states in a sequence or progression, through the conditional processing of incoming events, coupled with persistent storage.

"Thunk" means a dynamically allocated structure used to execute code or store instance information in method monitoring. The Thunk structure is applied to a variety of scenarios of capturing function calls or function returns.

"Virtual Function" means a function that when overridden by a subclass will be called by the base class.

"VTable" means a virtual table which is a table in a COM class that contains method pointers to methods or functions, belonging to a class.

BRIEF DESCRIPTION OF THE FIGURES

The Computing System and GUI

Monitoring Targets

Figure 3:
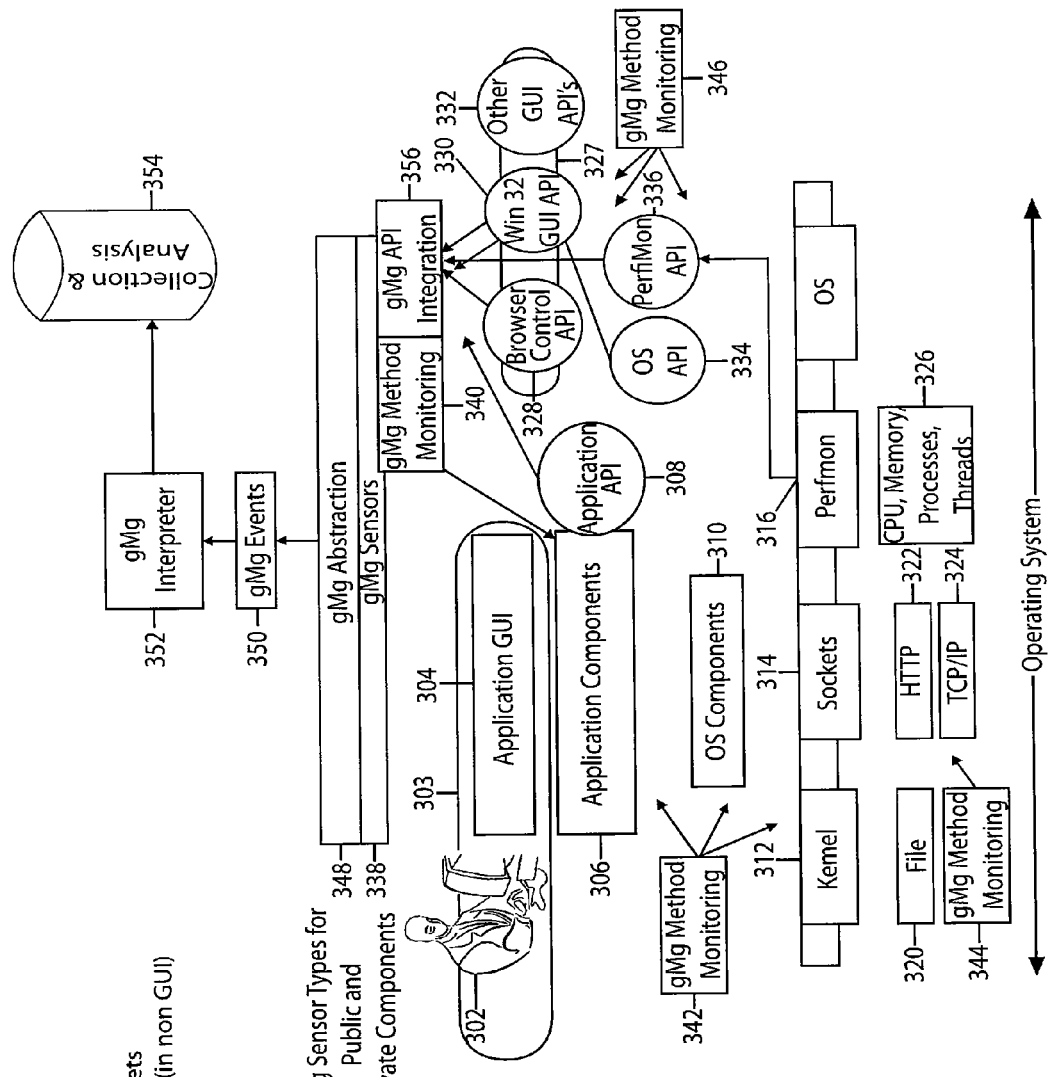

FIG. 3 shows Monitor Targets in a computer operating environment on the Client or Server (in non-GUI) in accordance with an embodiment of the invention;

gMg System Component Overview

Figure 4:
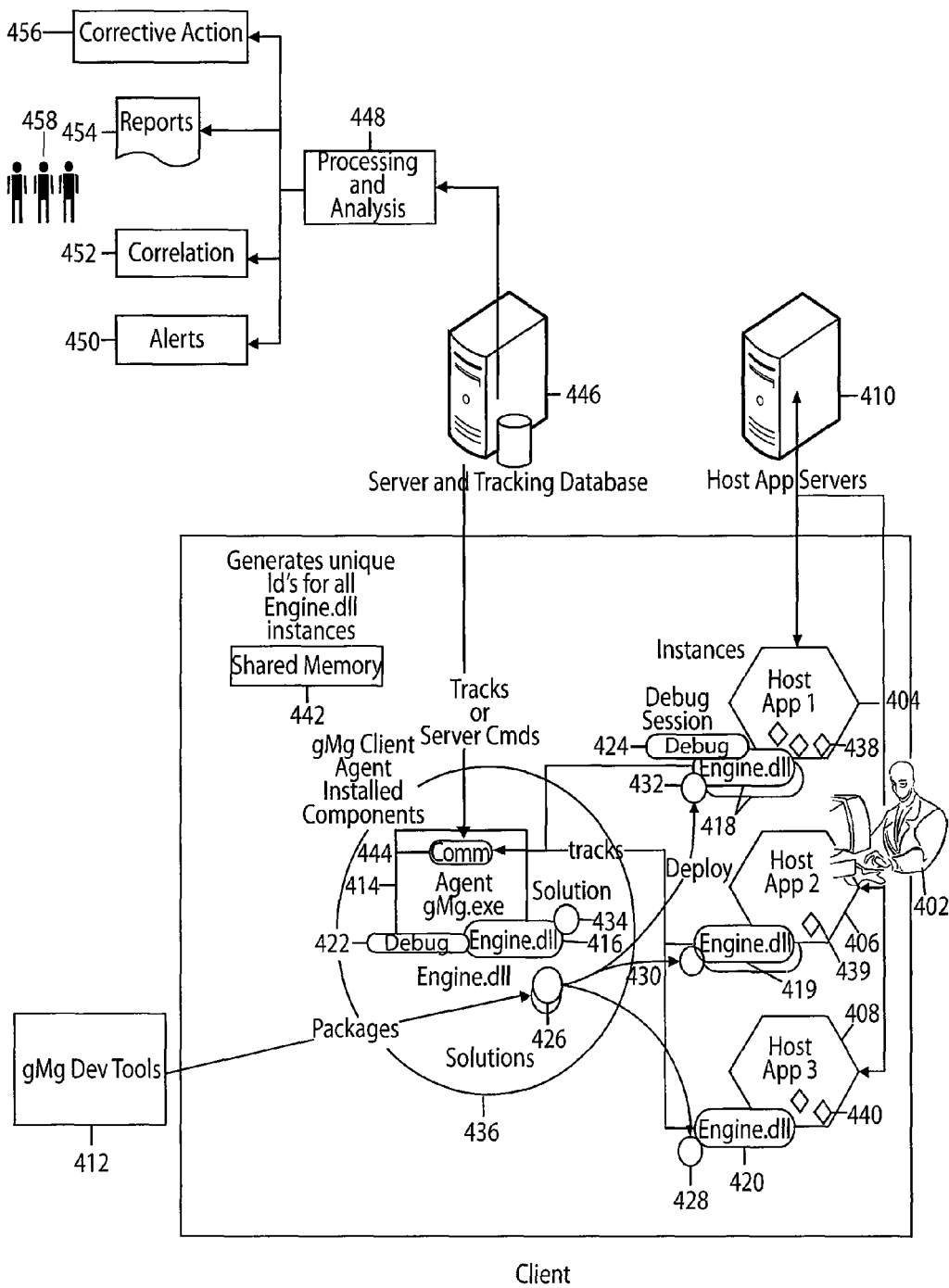

FIG. 4 shows an overview of the gMg System Component Overview in accordance with an embodiment of the invention;

gMg System Event Flow

FIG. 5 shows an Event and Property Flow Overview in the gMg System in accordance with an embodiment of the invention;

FIG. 6 shows Main Event Sources in accordance with an embodiment of the invention;

GUI Object Tree

FIG. 7 shows updating of the GUI Object Tree in accordance with an embodiment of the invention;

FIG. 8 shows Object Tree gMg Events: the update of the GUI Object Tree, and gMg create and destroy Events in accordance with an embodiment of the invention;

Functions for Multi-Instance Support

FIG. 9 shows the Load Program functionality in accordance with an embodiment of the invention;

FIG. 10 shows Object Variables in accordance with an embodiment of the invention;

FIG. 11 shows the WhenObject structure in accordance with an embodiment of the invention;

FIG. 12 shows a Process Window Context with process and different window elements in accordance with an embodiment of the invention;

FIG. 13 shows Contexts and Multiple Popup Windows in accordance with an embodiment of the invention;

FIG. 14 shows process Hooks in accordance with an embodiment of the invention;

Generic Detection of GUI Objects

FIG. 15 shows the Specific to Generic Spectrum in accordance with an embodiment of the invention;

Method Sensing Techniques

FIG. 16 shows a Method Monitoring Overview in accordance with an embodiment of the invention;

FIG. 17 shows a Module Tree used for Method Monitoring in accordance with an embodiment of the invention;

FIG. 18 shows the creation of a Method Monitor in accordance with an embodiment of the invention;

FIG. 19 shows Method Signature and an Method Code Overlay in accordance with an embodiment of the invention;

FIG. 20 shows Thunk Allocations for Method Monitoring in accordance with an embodiment of the invention;

FIG. 21 shows Monitoring a Virtual Function Method in accordance with an embodiment of the invention;

FIG. 22 shows Monitoring a Method Return—Stack Copy in accordance with an embodiment of the invention;

FIG. 23 shows Monitoring Method Return—Stack Allocation in accordance with an embodiment of the invention;

Analysis

Figure 27:
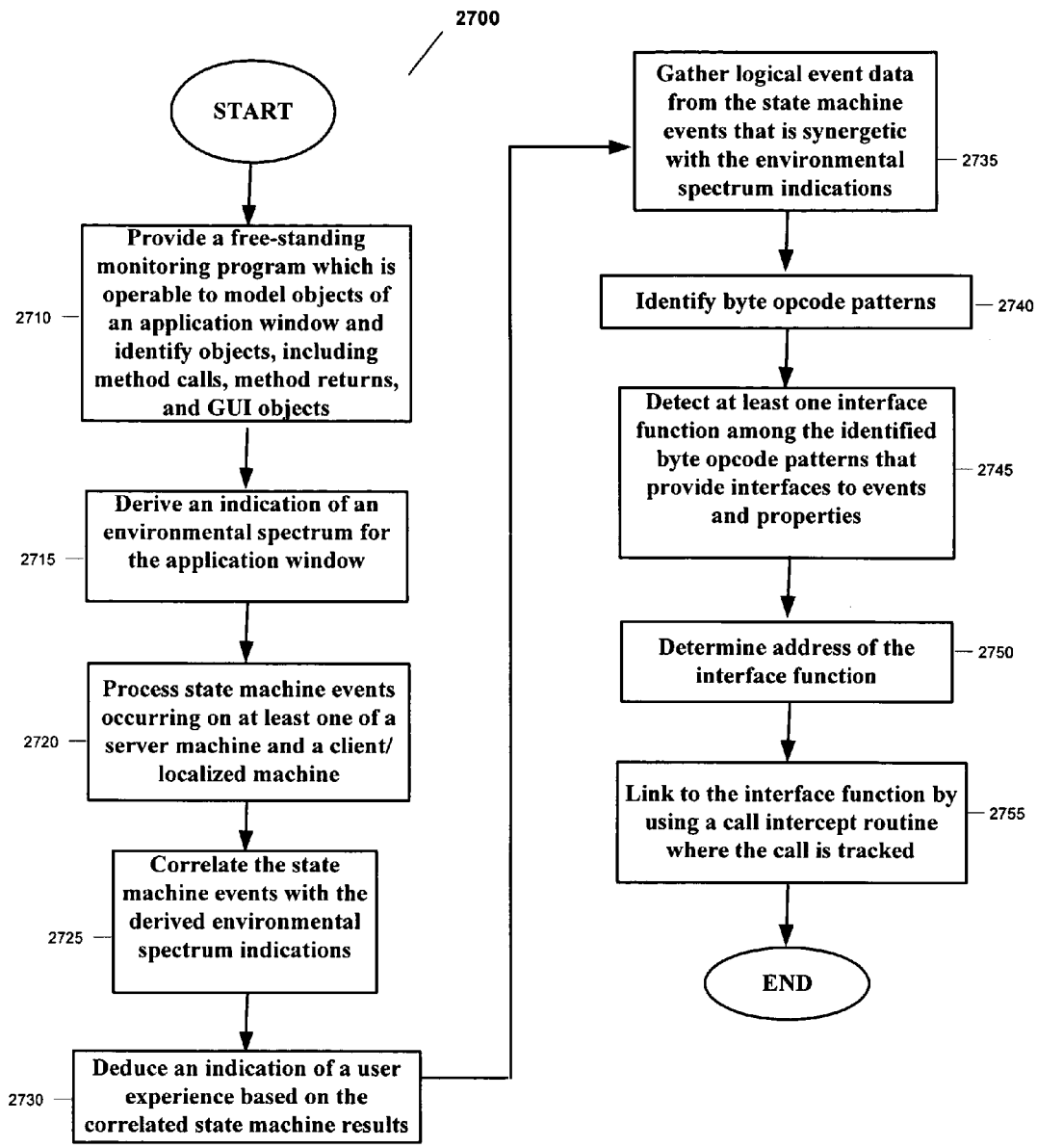
Figure 28:
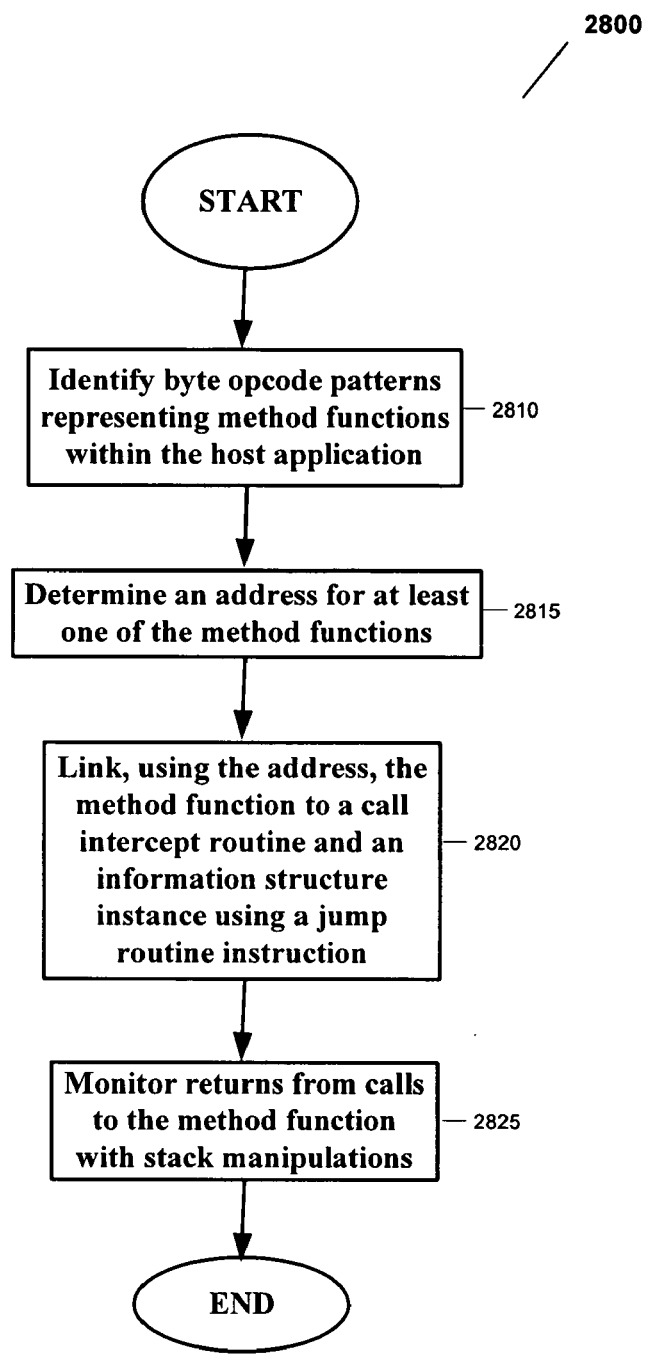
Figure 29A:
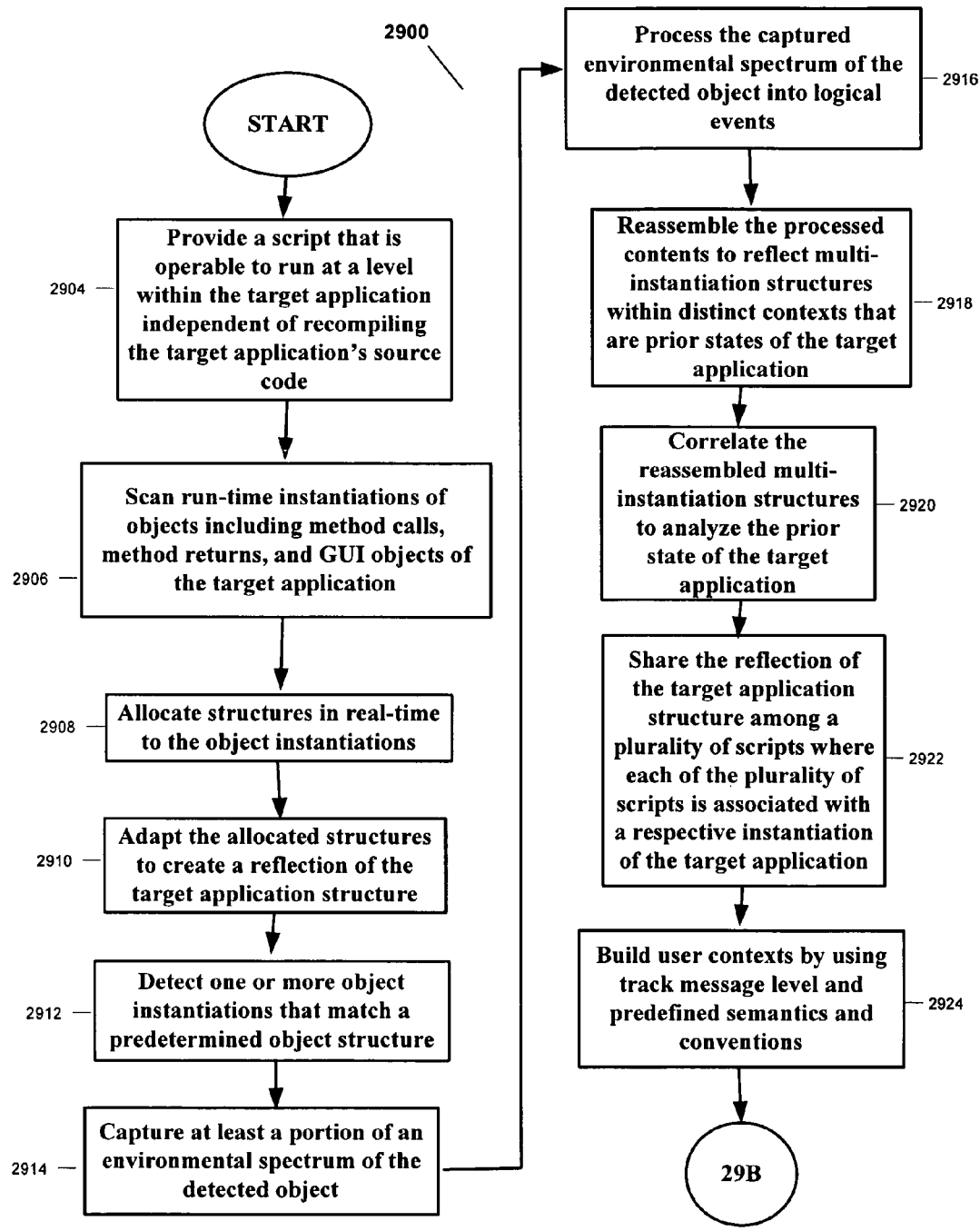
Figure 29B:
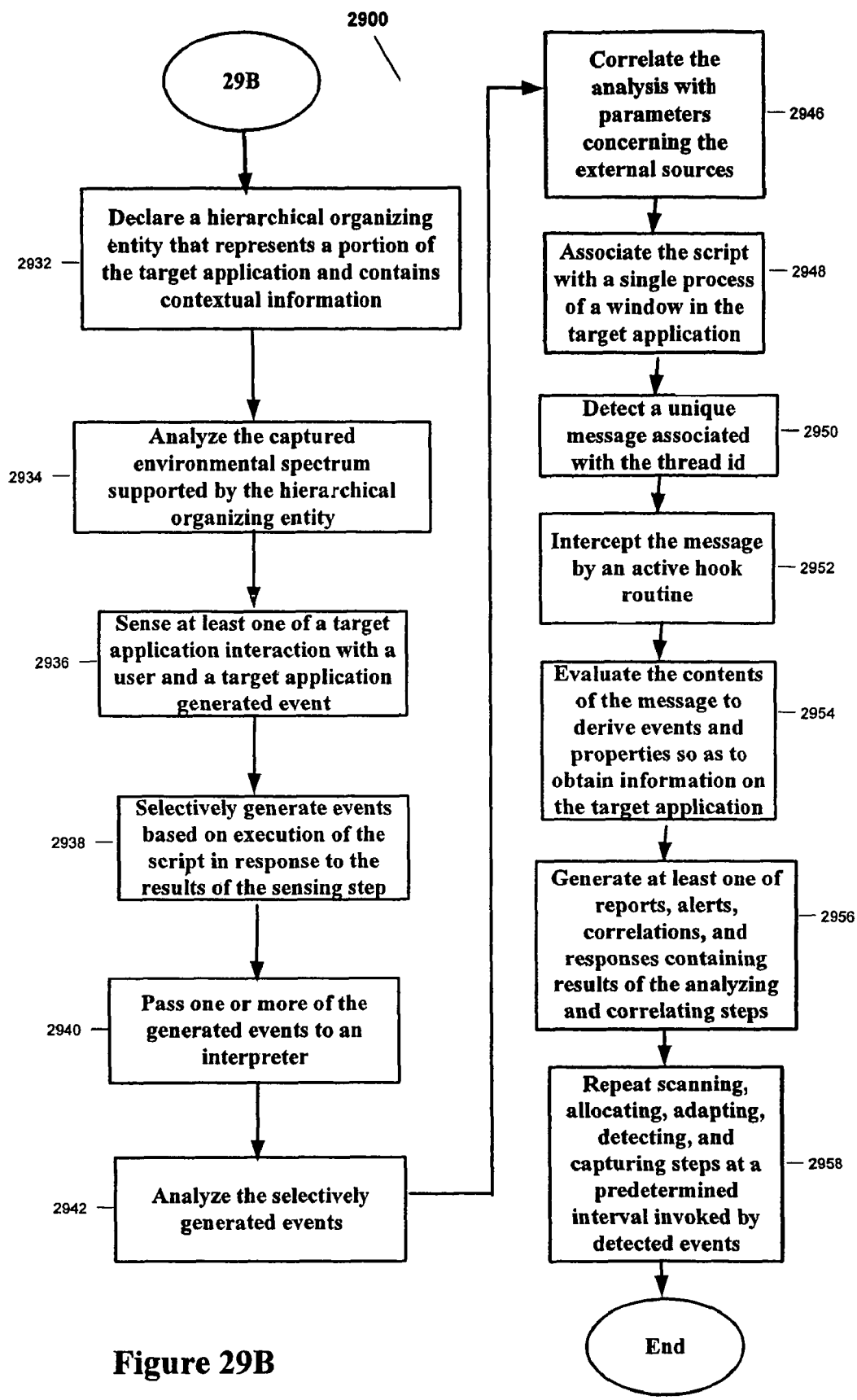

FIG. 24 shows State Machine Hierarchy with local and remote State Machine processing in accordance with an embodiment of the invention;

FIG. 25 shows Static and Instance Evaluation for Transitions in State Machines in accordance with an embodiment of the invention;

FIG. 26 shows State Machine Event Processing in accordance with an embodiment of the invention;

FIG. 27 is a flow diagram illustrating a process in accordance with an embodiment of the invention;

FIG. 28 is a flow diagram illustrating a process in accordance with another embodiment of the invention;

FIGS. 29A and 29B are flow diagrams illustrating a process in accordance with yet another embodiment of the invention;

DETAILED DESCRIPTION OF THE ILLUSTRATED EMBODIMENTS

By way of introduction, presented are embodiments of systems and methods that provide timely tracking and monitoring of specific or generically structured events within multiple instances of a host application. The tracking and monitoring is derived from an application's presentation layer, for example, at the GUI, or at the function or method level. The generation of the events, and the subsequent pattern detection analysis provides insight and measurement statistics. User monitoring includes, but is not limited to, the measurement of response times, the detection of errors, and the collection of application events. The user monitoring provides information from which it is discernable the user's context and application interaction.

As applications become more complex within the enterprise environment, comprehending and measuring the actual user experience becomes more difficult. A range of problems can occur where users can experience everything from slow load or response times, cryptic error messages, partially rendered web pages, to incomplete database tables and records, and so on. IT departments presently are focused totally on the backend infrastructure even though it really is the business users who are driving the revenues and profits of companies.

To determine the quantitative measurement of a user's experience, there are potentially many information sources that are available in the user or server environments. Since there are many components that execute interactions and transactions with centralized data sources each component becomes a link in a long chain of events that comprise the User Experience. Such components can be at the network layer, the hardware layer (CPU, Memory, Virtual Memory), the GUI presentation layer, the application server, etc.

Because the user drives critical business processes as a user interacts with the GUI layer of an application, the problem of context and identification at the GUI Level of all action and activity within any infrastructure tier of an application ideally should be traced back to a user action within some user context. Events from the GUI layer provide just such a context. The system tracks at this level and "sees what the user sees." The GUI is organized in a hierarchical structure and contains many subsets of GUI objects which can replicate at run time depending on user action and the application's organizing logic, which controls how the GUI object structures are generated and kept in memory at run time. The system provides supporting identification mechanisms that differentiate structures that otherwise might appear as identical. In particular, if a user encounters an error message generated from any tier of the infrastructure, that error instances is captured for later analysis to facilitate remedies for the application.

In today's internet world, it is very common for applications to run in Multi-Instances where windows have identical structures that can all run simultaneously creating problems of precise detection of GUI objects within the Multi-instances of the application. Particularly, there is a problem in making distinct identification of interfaces that look different to a user, but may appear internally structurally identical. Modern applications can spawn numerous windows labeled with different text on the user interface, yet have identical internal object structures. This multi instancing, is also an after effect of modern programming practices that strive to maximize procedural sharing, and the reuse of components for both greater run time efficiency and maintenance.

With respect to the problem of Transparency, a monitoring system needs to be non-intrusive and transparent to the targeted Host Application, and operate as if the monitoring component is not present. Most often deployments of enterprise applications do not provide access to source code to enable interfaces and publish customized events to external applications such as a monitoring program. With a monitoring system the problem becomes how to extend an application for selective monitoring without changing the application. To achieve this transparency, the monitoring system would intercept and filter incoming events, read, and process them. Optionally the system can also filter which events are passed on in continuance to the Host Application.

With respect to the problem of available Measurement Sources, track business processes within enterprise Host Applications can be very challenging for executing real User Performance Monitoring with available Measurement Sources. At the GUI level, insight into complex processes requires more data from more dimensions than is readily available in a standard form. While many API's are published by enterprise application vendors, the majority are kept hidden, and often, some critical events or properties can only be retrieved from such private components. With access to these private components, accuracy and accessibility is greatly enhanced.

With respect to the problem of Monitoring Coverage, with the complexity and scale of today's enterprise applications, executing monitoring coverage can be a daunting task. There can be hundreds, or even thousands of modules, and thousands of operations made possible by the nature of permutations and combinations of large databases that can generate user interfaces dynamically based on conditions derived from data. To monitor even basic usage, a system must detect hundreds of states or conditions, and capture data efficiently in real time. Furthermore, a system implementation of solution monitoring must be fast enough to accommodate the demands of the enterprise and provide adequate feedback and coverage.

With respect to the problem of Aggregated Real Time Detection, complex detection of events for large user bases can be a formidable challenge in efficient programming within environments with limited resources. Often enterprise applications can generate many events where the processing and detection of selective business processes or operations can prove very challenging in view of limitations of data traffic, speed of delivery, and transparent monitoring.

To address the problems thus stated, the invention offers a number of mechanisms.

To address the problem of context and identification at the GUI level, in the Generic Multi-Instance Method and GUI Detection ("gMg") System there is a User Context which is a stream of GUI Events that can be interleaved with any other type of data available within the environment and can be correlated with other external sources in particular, with data from servers or environment infrastructure. Events detected at the GUI layer provide a direct mapping of the user's experience and interaction with the presentation layer of an application. The system includes abilities to address a wide variety of data sources with embodiments of different sensors, i.e., Method Sensor, as an integrated view all within a GUI Context. Using a specialized transparent GUI Sensor, all other forms of data can be interleaved within the GUI event stream to provide a direct correspondence of events to the user's actual run time experience.

Within the gMg System dynamic models are synchronized with real time Host Application structures to address the problem of multi-instances of applications, and provide support for complex Host Application graphical interfaces, where multiple instances of similar or identical GUI structures are common. A dynamic GUI Object Tree models a Host Application's GUI objects. Dynamic variables can be attached to select GUI objects in the tree to support GUI object Multi-Instances.

The complexity of enterprise applications, and their deployment, makes any changes to the enterprise application extremely slow, cumbersome, if even possible at all. The gMg System includes embodiments of various sensors aid in application transparency by retrieving events and properties from the enterprise application, and its environment, without altering the source code of the enterprise application. Thus, these sensors have the ability to extend functionality of the application without recompiling any components of the Host Application. The sensors intervene minimally and non-intrusively to capture the data necessary to populate models of the enterprise application. From these models precise events can be generated to enable analysis.

The gMg System's Method monitoring functionality greatly expands available measurement sources. Within the Host Application environment, there are two categories of interfaces: Public and Private. Public interfaces are published and documented for integration to external systems. Application Programming Interfaces (API), through a range of programming language conventions, provide the ability to integrate component functionality with the external functions of an external system. Private interfaces are not openly documented; but, if their behavior is discovered, they can provide valuable and sometimes critical events or properties to build additional contexts for measurement which all can be framed within a GUI context. Described below are sensors which have the ability to transparently (e.g., without changes to the Host Application's source code) inspect both public and private components and to integrate their events with other types within a single development programming environment, thus, opening additional, richer dimensions to the measurement process.

For monitoring coverage of the GUI layer the prior art requires manual implementation of a corresponding descriptor for every specific GUI object as well as extensive selective instrumentation of an application's GUI. To efficiently achieve sufficient coverage of an application for effective monitoring, a more effective mechanism is thus needed to provide extensive coverage using a reasonably small number of operations. The gMg System achieves this with its Generic detection of Methods or GUI structures by optimizing and greatly reducing the effort for implementing measurement solutions.

At the GUI layer and other structures, it is the nature of an application's internal organization to have related sets of objects to implement and render the visible presentation layer. Taking advantage of this inherent organization, Events are derived from the detection of related run-time GUI object structures, which spawn categorized Events and are executed as generic operations to monitor GUI object sets. A great benefit of the system's approach is that during development time, developers of the monitoring solution do not need to describe every possible output, but instead need only to analyze a structured operator expression that will detect all similar structures at present and into the future. Generically collected data can then be integrated with the system's other sources to provide multi-dimensional views of the user's interaction with the Host Application.

With respect to Aggregated Real Time Detection, presented in the gMg System are Alternative embodiments of distributed local and remote state machines that process detected first level events. At the source, within a stream of GUI Contextual data, state machines can process localized events and generate a higher, logical state and then issue a track message to the collection server. On receiving a logical state other remote state machines can subsequently further process this logical event type along with other received similar logical event types from other user computers. This configuration of distributed processing provides very rapid detection rates for large user bases.

Using local (client) or remote (server) GUI models, $gM^2g$ (herein referred to as "gMg") is an automated Multi-Instantiating Specific and Generic GUI and Method Tracking system for modeling Multi-Instantiating and concurrent Host Software Applications, or subsets of concurrent Host Applications. The gMg capabilities can be transparently applied without requiring recompiling of the target application source code.

The gMg Model residing on the local client, or on the remote server, is a GUI and Method Object framework that reflects the real structure of the Host Application and is the system mechanism that reconstructs and interprets collected data into output analysis. Logical GUI objects are tracked by code commands that filter Events and GUI object properties to detect sets of real GUI objects. Method Objects are tracked by code commands that detect Events created by the interpreter engine in response to Host Application Method calls and returns to components. GUI and any other Events and properties available can then be retrieved from the components. As a dynamic system using prescribed gMg Models, the gMg processing allocates and adapts structures in real time to the Multi-Instance existence of real GUI and Method Objects in Host Applications. These structures are processed to derive logical events and reassembled to reflect Multi-Instance structures within distinct Contexts, without necessarily obtaining prior knowledge of all relationships or properties of the host application.

Dynamically organizing real time extracted data from the Host Application into Object, Process, and Code Module Trees, the gMg System handles complex, multiple structures with their corresponding multiple property sets (e.g., text), and correlates these structures together for precise analysis. Analysis for reporting, alerts, or responses is achieved through Multi-Instance handling, by connected State Machines that are run on the client and/or the server in a variety of configurations.

To detect occurrences within related multiple instances of a single Host Application, provided are different and extensible code members for the different types of sensors that detect Event Categories appearing at various points in the application, or its operating environment, from the GUI level down to Component Method calls. The system includes a Multi-Instance Interpreter component that parses a proprietary script that specifically, or generically, filters and interprets the Events passed from the Sensors. Depending on event and property conditions, the Interpreter generates Track Messages. Optionally, Interpreted Events can be optionally analyzed in a stream within the Localized State Machine component before generating the Track Message. A Communication component then packages either the Interpreted or the Localized State Machine Track Messages and transmits them to the Remote State Machine component which further analyzes the received Track Messages. Alternatively, the Remote State Machine can directly route messages to Alerting or other State Machines for a more timely delivery and display on a display console.

The Reporting component can perform analysis for aggregate viewpoints, trends, groupings and categories. The analysis can be rendered in a variety of graphical, tabular, or textual forms and made available for a variety of user roles. Such roles can be for the technology infrastructure support group, line management, user support, education, and many others.

The systems and methods described herein are applicable to many areas. For instance, when deployed into the production environment, it is useable in a wide spectrum of applications for User Performance, where there is a need for continuous monitoring. For Infrastructure Support, the system can be used to measure response times and also detect all error messages encountered by the user. For Training, usage information can detect what parts of an application users are having difficulty with. For Compliance, monitoring processes can detect where users are deviating from accepted policy practices and generate alerts to management. For Security applications, detection of suspicious user activity on one or more applications can generate alerts to security managers. For Resource Planning, usage information profiles how resources are being applied and reveals profiles of peak times. For Programming development, feedback, precise response times and errors can lead to faster delivery of fixes and new releases. GUI events are measured for both transactions and in between transactions that interleaves with different data types and presents them as single set within a User's GUI Context. For Help Desk Support, usage, error, and response time information provide automated profiling of help ticket incidents and facilitates the troubleshooting process.

The description proceeds as follows: a brief outline of hardware and GUI environments is presented, then the description of the gMg monitoring system begins with a discussion about the different types of Monitoring Targets, followed by a deployed component overview. The Event Model is then discussed followed by exploration of the GUI data structure (e.g., the gMg GUI Object Tree). Description about methods of implementing Multi-Instancing of gMg engines and scripts within a multi-process and thread environment are then presented. Then generic versus specific GUI object detection is discussed, followed by a description about Method Call and Return Monitoring using gMg Method Signatures and virtual functions in COM objects. The final section explores analysis using hierarchical distributed State Machines to execute rapid real time detection and actions.

Figure 1:
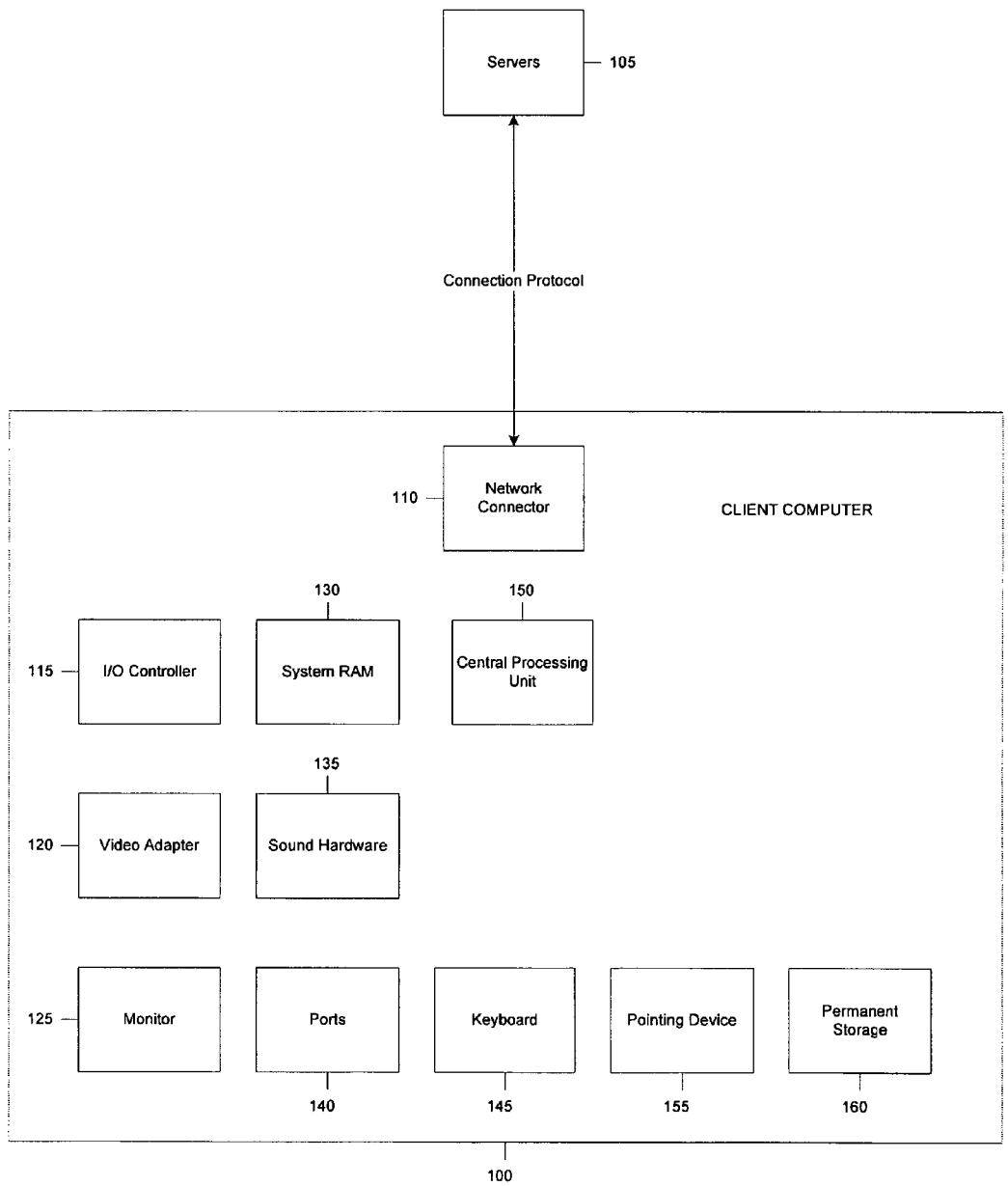
FIG. 1 shows a computer and Client and Server Hardware in accordance with an embodiment of the invention.

FIG. 1 illustrates an embodiment of a configuration of a client computer 100 and server 105 capable of implementing and operating the Generic GUI Method Monitoring system and method. The gMg System and method can be an application program or software executed by a client computer 100, which may be a personal computer, workstation, or other computing platforms (e.g., personal desktop assistants (PDA), or personal electronic devices (PED), which can include: cell phones, MP3 players, still and video digital cameras, and personal video recorders, etc.). The Server 105, another computer distinguished by its server software, collects data from many client computers and complements client processing tasks. The Network Connector 110 provides connectivity to external computers, e.g., servers. A standard connection protocol transmits and receives data in any format between remote computers. The client computer 100 can include subsystems connected together by an internal system bus. Instructions included in the System RAM 130 are executed by the Central Processing Unit 150.

Numerous external devices are connected to the Input/Output (I/O) Controller 115 via Ports 140 which provide a connection to external peripherals such as a modem on a serial port (not shown). The display of 2D and 3D graphics and video, or any form of moving images, is handled by the Video Adapter 120 that displays the contents of the graphics buffer on the Monitor 125. Sound processing is performed by the sound hardware 135. The Pointing Device 155 and Keyboard 145 transform user inputs into input data, with such user inputs generated from a user interacting with visual information as displayed. Permanent Storage 160 retains data between computer power off states, and is accessible, as needed, at run-time.

Figure 2:
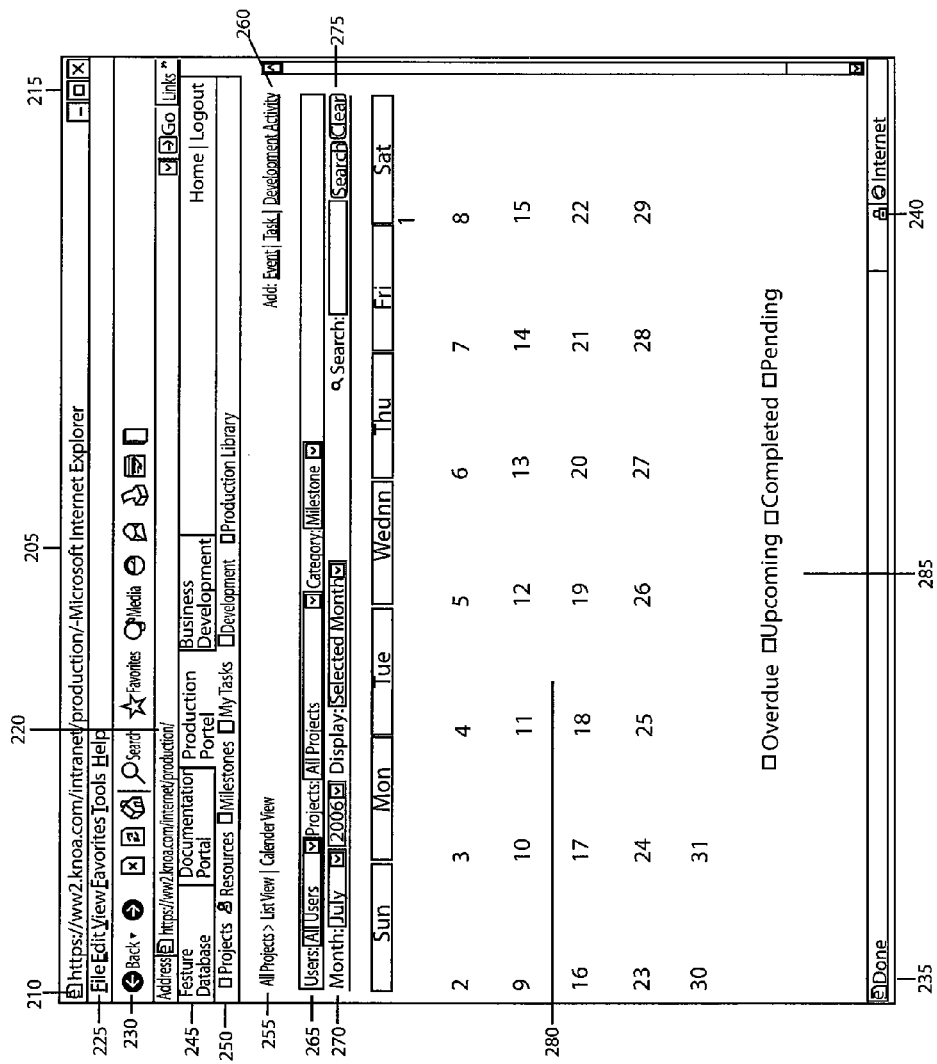
FIG. 2 shows a GUI presentation layer in an example GUI Web Application in accordance with an embodiment of the invention.

FIG. 2 illustrates a typical application GUI, which in this example is a web internet application. There are actually two types of GUI objects being monitored namely, Win32 and Web IE controls. The main window 205 contains all subsection GUI structures that comprise the web page and include both the container application (i.e., the browser), as well as the browser's page contents which can include many web page (i.e., html elements). The browser container application consists of Win32 elements (e.g., the main window 205, window title, main window controls 215, menu items 225, a URL interface address display 220, and navigation and operation icons 230). Additional elements of the main window provide status indicator 235 and security state indicators 240. The main web page itself represents the Host Application's html page delivered by the server and is comprised of various functional interfaces for user interaction and information retrieval.

FIG. 2 depicts a simple calendar function, where there are various elements that provide different views and filtering operations including the following features: various tab controls and icons for the application's main organizational sections 245, 250, Project Views 255, User filtering, Projects, and Categories 265, Add 260 and Search 275 operators, date display 270, graphical calendar display 280, and project status icon 285. This example illustrates how a GUI is rendered with a combination of two kinds of GUI application processes: to provide two target types for the gMg Win32 and Web IE sensors. It is the user interface that provides a critical stream of GUI Events against which many other kinds of counters from statistical data, response times, computer performance counters, to Method Events can be placed within a GUI Context to connect directly to a user's experience for more precise analysis of application performance or business processes. The simple calendar function is provided as an example of a Host Application. The invention is not limited to any particular type or nature of Host Application.

A Monitoring Target is any entity or organized real time process within a Host Application whose properties, Events, or behaviors can be translated through detection into a logical Event for interpretation and analysis by the gMg System. There is a wide range of potential Monitoring Targets in a target environment that is divided into private methods or public API's within either the operating system or the application. Each Monitoring Target can contain its own values or have detectable Events that can be used to build behavior profiles for any area of concern and interest.

Referring to FIG. 3 a User 302 interacts with a Host Application GUI 304 that in turn controls its Application Components 306 serviced by its application server. The GUI and component layers all in turn, where necessary, interact with the Operating System Components 310-326 to achieve full functionality. While there are many aspects to an operating system, represented here are a few critical functions relating to the Kernel 312, networking 314, 322, 324, core operations such as CPU, Memory, Processes and Threads 326, File 320, and miscellaneous Operating System Components 310, 318. The Host Application Components 306 interact with any or all of these OS subsystems to execute basic functionality such as network communication, graphical display, and so on.

Different standard subsystems in the operating environment are made available by operating system publishers through public application programming interfaces (APIs) 308 and 328 through 336, which are integrated into the gMg System at 356 and in the gMg sensors 338. An Application API 308 can provide Events and properties from a wide spectrum of categories of internal information that is typically published for application partners to extend an application's functionality for customized purposes by customers or by services. Operating system API's 318 provide functionality about all aspects of an OS from its processes, threads, memory, memory allocation, etc. Performance Monitoring ("PerfMon"), is a specifically built API 316 published in Microsoft Windows that provides counters and data about many aspects of the hardware or services, for instance CPU utilization, virtual memory, etc. The Browser Control API 328 provides properties and Events about the browser container application's document object model (DOM) and is used to support web GUI monitoring applications. The counterpart of the browser control is Win32 GUI API messaging interfacing 330 that monitors win32 client applications GUI. There are also many other GUI APIs 332 such as for JAVA® (available from Sun Microsystems, Inc. of Santa Clara, CA), VISUAL BASIC®, and .NET (both available from Microsoft Corporation of Redmond, WA) rendered client applications. The gMg System can build upon all of the above interface categories to create different monitor data sources for its collection and analysis processes.

The gMg System accomplishes the generation and integration of data sources with its various Sensor types 338 that are linked through its adaptors to the various available monitoring target interfaces (308 and 328 through 336). These sensors are deployed and detect Events that are fed into the gMg Abstraction layer 348 which then outputs gMg Events 350. These output Events are then fed into the gMg Interpreter 352 for real time conditional analysis that creates yet another layer of track Events which are fed into a Collection and Analysis Server 354. Analysis produces a range of outputs from alerts, correlations, to direct actions. As part of the gMg System there is a specialized gMg Method Sensor (i.e. gMg Method Monitoring 340, 342, 344, 346) that performs general monitoring of targeted method calls within a range of components from the Host Application to the operating system. The Method Sensor can extract Events and properties from private and public components under appropriate conditions and scenarios.

Given its wide range of extensible and adaptable sensors, the gMg System can marshal data from many types of sources to provide comprehensive monitoring of Host Application and environment processes, all within a user GUI Context. In server environments, where during operation there is no direct user interaction through a GUI interface, all other monitoring interfaces both public and private remain valid for generating gMg monitor data sources. Within a server (without a User 302), GUI run time layers 303 304 and 327 would not be present. However, GUI's for server administration tools could be present and monitored.

Referring to FIG. 4 which illustrates the gMg components deployed in a typical enterprise environment, a User 402 can access one or more Host Applications 404, 406, 408 or one or more instances of the same application delivered by a Host Application's Server(s) 410. The gMg System Development Tools 412 can create and package gMg Solutions 426, which are prepared for deployment into the user's computing environment. Development tools include GUI and Method inspection tools, compiler, debugger, server analytical State Machine tools, administrative, and deployment packaging utilities, and an integrated development environment. The gMg executables includes a single Agent gMg .Exe 414 and one or more Engine DLLs 416, 418, 419, 420. The collection of an Agent gMg.exe, one or more Engine.DLLs, and a gMg solution comprise an instance of the gMg System 436. FIG. 4 illustrates multiple engines monitoring Host Application 406 and Engine. DLLs 419. The Shared Memory mechanism 442 has a role in coordinating and sharing resources across multiple engines. The gMg System dynamically tracks multiple processes within a Host Application if needed, and the Sensors 438 439 440 detect method calls or GUI events within the Host Application(s) to build User Contexts for collected data. The user context including the system context (e.g., method calls, method returns, and messages), are captured to create a "snapshot" of the environmental spectrum of the Host Application and system.

The Agent gMg.exe and engines are deployed within the targeted environment, whether a desktop computer, a server (both GUI or non-GUI modes). or a terminal server (a server that executes client components on a terminal server which delivers rasterized display data to the user). Used during a development phase, the optional Debug DLL 422, 424 is for real time debugging that is used in conjunction with the development tools to provide breakpoints, variable displays, traces, and other typical debug tool features. Small and easily dynamically updated, the gMg Solutions 426, 428, 430, 432, 434 consist of compiled scripts that define and describe the separate or overlapping Monitoring Targets and executes tracking operations. These solutions are run by different engine .DLL instances and can track Monitoring Targets that can be separate or even overlap if required. Upon detection of GUI or Method Events, track messages are created and sent to a Server and Tracking Database 446 by the communication module 444. The collection server performs analysis in real-time, near real time, or post time depending on available requirements and computing resources. The output of the Processing and Analysis module 448 includes Alerts 450, Correlation with external data sources (e.g. backend monitoring statistics 452), or Reports 454. The Reports 454 can be of a wide variety of perspectives with aggregated processed data revealing group or detailed individual behaviors about interaction with the application's processes within a true GUI user's Context. Within the enterprise different roles 458 from technical support, training, infrastructure support, etc. can access the reported information or alerts to make improvements and Corrective Action 456, or support end users.

Referring to FIG. 5 a User 503 interacts with one or more concurrent Host Applications on a desktop or terminal services with a Host Application Site 506, related components 512, and one or more Instances 545 of the Host Application's Presentation GUI 509. Elements of the Host Application can be located within the presentation layer, and enable the user to invoke operations and receive application responses. The Host Application may run more than one instance concurrently, or can concurrently run Multi-Instances of GUI sets, which are subsets of the Host Application.

The GUI can be organized within memory as a hierarchy and have many subsets of GUI objects, which replicate at run time depending on user action and the application's organizing logic that controls how GUI object structures are generated. Besides the presentation layer, an application also contains many Components or DLL's 512 that execute functionality (e.g., communication with a server, calculation, environment property retrieval, interaction with the computer's operating system, etc.). Component libraries contain the methods for executing functionality and gMg's detection of Method Events provide access to properties, input, output, events, or other information about processes related to the function of the component in support of the Host Application. Method Events are detected from library components that provide either GUI or some other underlying Host Application functionality.

The gMg System utilizes GUI Object Properties 518 and object state information to support analysis. A set of name-value pairs as well as their relation to other objects reflect the object state at any given time. The value of the property can be retrieved programmatically at any time using polling. The object can also have custom properties associated with them, defined and controlled by the sensor through the script. Additional state information can be derived from combination of states and prior events. The gMg Sensing Engine 548 in reaction to the Host Application's process flow can generate a set of real time events 515, which are events derived from User, Application, OS events and particular values of GUI object and Method properties. The events reflect conditions that are satisfied at a given moment of time or a current state of the application (i.e., an environmental spectrum). These events are in several categories: user events generated with an input device such as a computer mouse or keyboard; events indirectly derived from a user action; application events generated by the application autonomously (e.g. refreshing a window with news updates); operating system events such as resulting from a file operation, registration action, or network; and Method Call and Return Events which are set up to monitor specific component functions. Further events can have properties that provide details or further qualify events. From this input of lower level events, Logical Events 521 can be optionally derived by using conditional logic processing to determine states via State Machines. Both the logical and unprocessed events when they reach the Communication module 524 are prepared for transmission to a remote collection server 557. This module controls buffering and compression or security before transmission. Buffering also provides a mechanism to store data temporarily in the event of collection, or network, interruptions or in non connected environments.

Information exchange is provided between client 548 and the server 557. The Client communication module delivers either logical event values or selected GUI object properties, and also receives control commands from the server. In the collection and analysis stage, data is delivered to the collection Server Instance 557 in the form of track messages that can be processed, or stored in a database. The stream of events is de-multiplexed into separated user logical contexts determined dynamically by analysis parameters.

Depending on whether data arrives as GUI object properties, at the lower level event or at the logical level event determines how the data is routed 554. If arriving as lower level multi events then State Machine processing produces Logical Events 530 and contexts. However if the data arrives as previously-processed state machine Logical Events 521, then new contexts can be produced with further State Machine processing 527. As output, whether through Generic or Specific Detection, GUI Object sets as well as Generic or Specific Event Sets are formed 533. Further analysis finishes the predetermined metrics and states identifying patterns 536 to produce a complete processed data set. This data in a process complete form is fed to the Analysis and Reports stage 539 for aggregated, trend, and report processing for graphical presentation, and, use within the gMg reporting consoles.

For a wide spectrum of users, the consoles are used for purposes such as change control, program repair, support, debugging, optimization, and so on. Alternatively, processed events can be directly routed to the system's Action components 542 that include the display and communication of threshold conditions that demand higher priority attention such as errors or slow response times. Actions can include communication with external systems 560 that provide functions such as issuing support tickets, automated repairs, training, or other defined actions that ultimately affect the user.

Referring to FIG. 6, the gMg System uses several major categories of Event sources. Within the general events 610, there are Windows32 operating system events retrieved via APIs, hook functions, and callbacks. These events provide access to many different messaging, property, and functions that make accessible many different aspects of processes of interaction between the user, the application, and the operating system. Another source of events can be from the browser (e.g., Internet Explorer Events), which exemplifies how a container application exposes events and properties about data models and types such as the Document Object Model (DOM) for external processing which are retrieved with listeners and available COM objects. A web browser such as IE exemplifies the dynamic nature of modern internet application GUI's which exhibit complex multi-instanced window structures. Within the gMg System, COM listeners are enabled and use callback functions (IEEvents.cpp) to detect IE Events. Classes are registered with IE, and a method in that class is called whenever an event occurs with the retrieval of IE object properties being provided through COM interfaces. Another example of an event type is the call-and-return method event that provides a wide spectrum of Sensor Events created by gMg Sensor monitoring components.

All of these events are passed into the gMg interpreted script 625. Before reaching the interpreter, the events are serialized using a locking mechanism 620. Locking is also further differentiated for different N instances of the engine and/or script 625, 630. 635. Once a script is parsed and the already serialized event processed, a function executes an intermittent poll operation (via the application scan 640) into the Host Application's GUI 605. Concurrently there are operating system timer events arriving via the timer callback procedure 615. which schedules scans of the Host Application GUI 640 at a set rate that is configurable and adjustable. As this process occurs, the gMg GUI Object Tree 660, consisting of branch record structures 655, 660, 665 becomes updated, deleted, or copied to snapshots of the system's current view of the application's state of its GUI. The gMg script also sets other timers 645, which are handled, but are at a lower priority to gMg WhenObject commands. When Object processing 650 is a process that creates gMg create and destroy Events for GUI objects that require synchronization at 640 where there are no events produced by the Host Application and operating system. WhenObjects provides a gMg simulated timer to poll specific sets of GUI objects.

The gMg set of different monitoring processes provides a wide range of source categories throughout the application environment and the operating system. The interaction rate can be controlled for read-only operations that do property retrievals, so as to extract details and build records for track messages and subsequent analysis.

The following are support mechanisms for GUI, process Multi-Instancing, and run time script processing that are set up during the start-up process. The gMg features include the GUI Object Tree, the loading and organization of multiple scripts, script features that support Host Application Multi-Instance handling (e.g., Object Variables, and the WhenObject command) feature, followed by the provision of Contexts, Hooks, and finally the Generic detection of GUI Object sets.

The gMg System can be configured in a number of different ways for deployment. In the client/server configuration a local Agent and its engines and solution(s) can be installed to execute on a local computer to detect Events. In a web environment, gMg Solution code can be injected, installed on a server and the gMg Solution code delivered dynamically to a user's local computer, where the gMg Agent and engine have already been installed. While there are advantages to either of these deployments, both will detect Events based on common structures and be able to also extract specific properties as needed. The gMg deployment configurations are not limited to the above, specifically other configurations are within the scope of the invention so long as the gMg System is operable.

Once the gMg System is deployed, on start-up activation, the command line is parsed for options such as load script, stop, etc. and establishes communication with the message queue. The run options in the .ini file, which can include scripts or directories of scripts, is inspected and sent to the main parse command line routine. A list of scripts in the .ini file can be run on startup and injected into multiple processes. A call to the function changehookTidL causes gMg.exe to inject the engine into itself via its own window, and run its own interpreter (gMg engine) as if it were monitoring another application. Alternatively, the gMg associated window can also serve as an inter-engine communication, along with the gMg protocol for other gMg engines, associated with the same Agent .exe, that have been injected into other applications.

A file path is used to construct and register a special windows message which registers gMg processing within the operating system. The full file path name of the gMg.exe module is used, and becomes the unique identifier for the windows message to distinguish between all other instances and copies and versions of agents and engines running at the same time, thus enabling dynamic, unique instances to run. The ability to distinguish between instances enables separate gMg.exes, installed in multiple directories, to establish their own run time structures for proper simultaneous operation. If more than two Host Applications are running, and consequently more than one gMg engine instances are running, and both engines make the same request (e.g., for export lists), there could be file conflicts in the Primary Directory such as a file failing to open or one file overwriting another. Preferably, to solve this, filenames are attached to the instances. This becomes part of the basis for dynamic Multi-Instance support. Under this condition there cannot be 2 files with the same name in the same location.

On startup an objective is to setup gMg monitoring Sensors using hooks, where hooks are needed to execute the interception of window messages before the application receives them. Hooks are at the thread level, where there is one hook per thread. Monitoring a thread for windows messages causes a gMg DLL to be injected into the associated process space where there is one gMg DLL injected (via CALLWNDPROC, GETMESSAGE hooks with SetWindowsHookEx) per process. The gMg script hooks other processes if needed, and injects the DLL into the process space(s). Given the handle, the thread object belonging to the object being monitored is retrieved, and derives the thread object to find the instance (i.e., the thread id), for either hooking or unhooking the thread. To further control the thread hooking there are multiple versions of the function ChangeHookTid Locked and UnLocked. The Locked version is used when the lock needs to be set. If the lock is already set, the Un-Locked version of the function is called. After shared memory is initialized, startup code also calls loadDBGDll to load the debugging DLL if present (as an option) in a designated directory into the same process space. As there are usually multiple threads in a single application, the gMg gMglock implements a locked process when using the script interpreter, and forces all events to be single threaded. If two threads in an application try to generate an Event that gMg is interested in, or if there are N events from different sources, the engine forces a serialization of events. Serialization refers to events that are processed one after the other. The interpreter opcode execution code is first locked by gMglock, and then a call is made to DogMgEvent( ) to process each event.

The function LoadProgram called by gMg.exe is passed a thread id, script filename and option (load/unload). The gMg System examines the wide characters and converts a file name to unicode. If the specified thread-id calls ChangeHook( ) with an asterisk '*', an operation is implied that detaches all hooks. Because the system supports Multi-instances of engines, multiple scripts can be run, however, when invoking more than one script, the system controls how many scripts can be started (e.g., start scripts with an asterisk wildcard is not allowed). If the script is without a wild card, the hooking setup proceeds, and will hook the thread passed to it. The Changescript function then sends a message to the thread passing it the filename, and its own thread-id along with possible options to either: load/unload the script; load the program directly; inspect the list of all programs running; load a single script with an unload option; or reload a script.

Once a script is running, the function Do_gMgEvent( ) passes an object in an event, and if the lock is already set, counts the number of events being processed. The GUI Object Tree FIG. 7 and FIG. 8 must be built on start-up before the very first event is processed by the script. Preferably, every script is processed but if the unload flag is set, the script unload operation is performed which includes sending a script end track message. However, if the script is not yet initialized, a start track message (a Null Event zero object) is first sent to the script to initialize it along with send Exist Events for all objects that exist. This action invokes the script which now begins listening for events. This startup loop begins for every script in succession to either remove a script, initialize, or pass it events.

A mechanism for synchronizing sensors and engines is a centralized block of shared memory that contains window handles of all the gMg main executable modules. The gMg code checks for terminations of executables, or if there is another version running and if an executable's window no longer exists, a flag is cleared. A status check is done and if another flag is set, a message box is optionally displayed to give status and indicate whether another gMg.exe is running in the background. If another executable is detected, gMg uses the WM_COPY message to pass the entire command line as a block of data to all other engine instances and then exits. However, if no other instances are running then processing proceeds to create the main window. The gMg.exe's main window which is never displayed, is used for messaging to enable gMg.exe to monitor itself as an application. The handle kept in shared memory is set to point to a gMg.exe's own instance.

During the termination phase gMg Multi-Instance handling is still needed. At shutdown, during the call to DLLProcessDETACH, a flag in the process prevents tasks currently running from doing additional work since other operations are still running asynchronously. The function Cleanthread( ) which calls CleanIEthread( ) in web applications, calls disconnect and any callbacks or releases, or COM objects left over in IE can be cleaned up. The DLLProcessDETACH (and its counterpart DLLProcessATTACH) are recursive so as to support multiple instancing and dynamic Host Application environments.

There is at least one gMg script per Host Application process. Alternatively, multiple gMg scripts can monitor a single process. Scripts are designed to handle all threads of a process, but a single script can monitor any number of threads such as found in applications that are built with one windowper-thread such as typically found in web applications. The script is processed rapidly and attribute retrieval is heavily cached for better performance. Caching is enforced wherever there is a liability in fetching properties, or in retrieving attributes safely within the same thread.

Potential issues can occur during cross thread accesses or when a thread is accessed from a COM object whose marshaling behavior is unknown, particularly when running in an IE environment. However, issues regarding cross thread access of COM objects (especially in an IE environment) become less significant because a gMg Event is generated by a specific thread, addresses only objects related to that thread, and rarely reacts to objects residing in different threads. When handling objects from different threads, gMg processing has to finish processing the current thread. before addressing the other thread's objects. Collisions are avoided by serializing the Event processing which prevents ambiguities such as when two threads share and modify a common variable. The processing in gMg is guided by the principles of common concurrency problems as is known in the art.

The serialization principle applies to both Component environments such as COM or non-COM(component) applications. Within COM environments, interface methods may be invoked in multiple threads. Regardless of threading model (e.g., safe thread, single thread, etc.), monitoring of the threads is serialized with gMglock. Processing IE events can be done per thread, but the gMg script needs to be deterministic and is therefore serialized per Event. Per-thread processing is important for Events that are related, but relationships are determined by the gMg script content. The gMg System uses single threading for Event Processing and extends this to any Event. All parameters that are being passed to Invoke has a pointer which is later used to retrieve the properties of an Event. If a script asks for Event properties, it uses one of the global pointers to the Event parameters and retrieves the details of the Event. This mechanism keeps retrieval centralized, keeping it from becoming distributed over too many locations which can cause excessive stack push/pop operations. The Serialization of the Events and the script must be efficient. For example, if an application's GUI is processed by a single thread gMg Sensing is easily handled, but if an application has many windows each with its own thread, thread collisions can occur. Preferably, this potential problem is avoided by having one thread A process an event while another thread B is forced to wait on the global gMglock. As messages are allowed to be processed by A, thread B waits for gMglock to release.

The gMg System uses a locking mechanism to establish serialization of generated Events. BeginLock which is the Lock Macro, performs an interlock exchange of the parameter, and if it returns 0 that is, the previous value is 0, then the lock is done. The thread id is set and the caller's location is determined by forwarding where the lock was used and the thread id that was doing the locking. As BeginLock records the thread, another macro gTid uses the thread id which is stored in the gMglock. Once it is confirmed that the gMglock has been set, gTid is much faster because it just needs to fetch the thread id that is stored in the lock.

For debugging deadlocks, beginlockD can handle specific actions if there is a recursive lock. BeginlockD is also capable of handling special actions for recursive locks, where in certain places one level of recursion is allowed with different actions performed for recursion as opposed to just executing a timeout or inadvertently leading to a failure. Beginlock performs an interlock exchange and store the thread id. The gMg's System's locking mechanism is equivalent to a critical section but works across processes when the lock is in shared memory and is very fast when there are no collisions. If there are collisions, preferably gMg processing forces a call to do a Quicklock which tests to see if the thread-id is the thread current id. If the thread id is the current thread id, the recursion count is kept for statistical reasons and returns −1, otherwise a recursion is flagged and a collision count is incremented. A controlled loop is then executed, where the loop sleeps for 1.0 milliseconds, and then wakes up with a 10 second timeout. A check is made such that if a lock is done on the global gMglock, there is a loop count (i.e., a script count) of the instructions being executed. If the gMg script is large, where a lot of parameters are fetched and all properties of every object in the tree are fetched, then the timeouts are extended from the default setting. If waiting for the gMglock and a script code is being executed, Quicklock is only called if there is a collision. Occasionally there is a recursive lock (function BegLockD) and a message is issued for diagnostic reasons. Quicklock returns 0 if there is a complete timeout, where there is a count of the number of timeouts in the lockout. The function returns a one if it successfully set the lock and −1 if it is already locked by its own thread. Note the thread id (tid) could be passed as a parameter to Quicklock, so that it does not have to be retrieved again. The code can automatically extend the gMglock_timeout message, if some other process has the thread locked while the interpreter is still executing script code. For diagnostics, the Quicklock structure contains information about the lock, thread id, collision count, timeout, recursion count, the line number of last lock, and module file information.

The gMgLock can control the debugging diagnostic provided by the gMg DbgDLL which provides diagnostics for inline expressions, as well as for blocks of code. The DbgDLL contains a function diagnostic that passes the diagnostic enumeration request issued for run time analysis. For diagnostic support, if the gMgLock lock is not successfully set it acts as a failsafe mechanism and processing stops the diagnostic function and sets it as a low priority.

To model events from the real Host Application, the gMg System can include three main trees: one for GUI objects such as windows and html elements; one for process and thread objects; and one for tracking component modules and methods. The gMg System also includes a timer object list.

FIG. 7 depicts the GUI Object Tree 715, which is the foundation for providing the GUI Context for all collected tracking data. The GUI Object Tree 715 can be shared by all running scripts 775 and maintains states for each script. There are three sets of GUI objects presented in FIG. 7—i.e., set P 725, set Q 720, 735, 740, and set R 730. The following is a description of the process of updating the GUI Object Tree 715 structures with dynamic structures extracted from the Host Application's GUI 705.

The UpdateTree function models the Host Application's GUI, or other processes and targets being monitored. To provide Events to the gMg scripting engine, there needs to be accurate detection of dynamically changing objects in the environment. To achieve this, the UpdateTree function handles all primary updates to its internal structure to properly monitor the differences between old and new object sets within a controlled schedule.

Regarding scheduling, the UpdateTree function has a number of mechanisms to control the rate of object synchronization with the Host Application. The UpdateTree has its own timer to avoid over processing, where the timer is run at an interval that is a function of the time it normally takes to scan a tree. The UpdateTree function is also called during Event detection if a timer Event is not fired because the application is busy and also any Events that gMg is intercepting could cause UpdateTree code to still run. Processing priority is raised to a higher level and causes UpdateTree to scan, update objects, and capture info even if the application appears to be blocked. UpdateTree also sets aside one thread to process all windows from other threads during that time. For example, if three threads are running with a polling rate for each thread at two times a second, only one thread is delegated for checking windows from the other threads to improve performance. Object filtering is done at the thread level and polling rates are further adjustable by the gMg script. Additionally, there are a number of other options such as to clear out the object tree, or to process all threads as opposed to limiting processing to just the current thread.

To handle the dynamic nature of the Host Application, the gMg System includes a tracking mechanism that tracks the changing status of GUI objects that are constantly changing, being deleted and created. Referring to FIG. 7 to accommodate these changing conditions, a list is kept of objects to be destroyed 760. The gMg processing destroys the messages, and generates Events 770 that are sent to the Script interpreter 745. SList 760 is a structure that contains a list of old objects as objects are moved from the Old List 750 if they still exist, and then added to the end of the New List 755. The previous set of objects remain in the Old List, but new objects not previously existing, are added to the New List 755. A pointer is set to the set of real existing windows at the top of the tree 720, the status of the set is changed to old, it is then emptied out, and a New List is built starting from this point.

The Enumwindows function performs the update by scanning through every window, and finds the Old List and puts it into the New List as needed as the application GUI is scanned, or if items no longer exist puts the window item into the destroy list 760. Whatever is left in the Old List is then processed. Notification is received of any destroyed windows left in the Old List. The update process occurs in Enumwindowsproc 710. The callback function Enumwindowsproc is called by the win32 API for each top level window 780. Lparam is a pointer to the SList structure. The window thread process id is also retrieved. The function obtains the windows thread process id, and goes through the Old List to see if the window is there.

Objects are checked to determine if they are in the Old List. The Old List, which includes a set of pointers to the Object Tree structure, is retrieved and objects that still exist are marked to become members of the New List as needed. When done, process or thread objects are processed for windows. If a new window is detected that belongs to a particular thread, the system creates both process and thread objects for the thread in question. A visited flag is used as a status indicator to mark if an object is listed (as part of a list) in a given process in a window or thread. The visited flag is checked and is used to issue to the script that objects have been terminated via a destroy Event 770.

The code operates efficiently where there are no changes in the tree structure which is the usual condition. If no changes, the code de-links the objects, updates the flags for its thread, and process and links the window into the New List (e.g., the window is removed from the Old List and put into the New List). Using the thread, the inspected windows are on the same level, with no windows below the current level being examined. This mechanism skips over any top level window that belongs to another thread and only processes one thread at a time. Preferably, if processing is not restricted, the processing of one thread will fall to zero, meaning that the process has been delegated to process all of its threads.

Referring to FIG. 8, illustrated are operations on the Object Tree 832 next the class of the window 806 that uses the same interface 808 as the script 812, is fetched. The class does not need to be retrieved from the live application 804 if it is already in the gMg cache 810. If the retrieved class matches the IE class (of the window), it is from the specific thread (and current thread 814) belonging to the Object Tree members. Objects in the tree 832 contain associated thread ids, consequently each branch of the tree is only be serviced by a window whose thread matches the tree object's thread 844.

The function notifydestroytree builds a destroy list 816 and discards the Old List 820. If processing does not lead to a call to notifydestroytree, the previous old tree in the Old List remains intact. But if the branch objects match the current thread, processing will proceed. There is now an empty New List 822, and all the child windows are enumerated at the next level down. Processing proceeds recursively to capture the current window structure. The figure element 832 represents the Object Tree consisting of the P 836 834, Q 838 842 848 850 852, and R 840 object sets, prior to updating. Referring to the updated tree 854, if there is a new IE window, or GUI objects, a call is made to GetIETree for retrieval of all the HTML element children in the hierarchy 866, 870, followed by a call to Notifydestroyrealtree( ) to kill all left over old objects in the tree. This is the basic processing that enumerates the tree for all windows, including windows or GUI objects that still exist 856, 858, 862, 860, 868, 872 from Old List to the New List. Once objects have been marked as discarded in the Old List, everything that is newly created 866 870 is automatically now linked in a global list. Everything that is left in this location is calling the variant (i.e., calling the function Notifydestroyevents 818), and while parsing the tree, will issue a destroy Event 828 to the script 812 as it detects that objects no longer exist 864. The previous tree structure is still kept intact, so that the destroy Events are sent in the context of the old tree to keep the gMg script's current context for orderly updating of deleted or maintained objects.

The function SynchTree 826 processes the set of real windows which is actually the new tree. The Dwindows structure 824 contains the old tree which is the tree that the gMg System uses. This section of SynchTree code has built a new tree out of the same objects under real windows which represents all the new objects and notifies gMg of all the destroyed objects in the context of the old tree (which is kept intact for later use by the script). A call to SynchTree is made which recursively copies the real pointers into Dwindows and results in the transfer of the real current tree into the gMg tree. At this point, gMg script 812 now has access to the new tree, and the old tree is now gone. Further, all the destroyed objects no longer exist in the tree 864. There now exists a global list of all the new objects created. Issuance of a create Events 830 to the gMg script notifies the script of every new object that comes into existence 866, 870. Simultaneously, if there is an HTML document object in the DOM that's been discovered, the function IEEvent will be set up as a subscription.

On completion of the tree update process, the temp list which is used to store all the new objects, is de linked and cleared. The new object list end pointer is then reset to point back to the head of the list. The list is built in the order as the objects are discovered as they are created, not in reverse order. The function Updatetree scans the application and generates create/destroy Events. Destroy Events are issued first for objects that have disappeared and then create Events are issued for new objects that have been detected.

Within a set of gMg engines belonging to a single gMg.exe (Agent), communication between different instances of the gMg engines can be established with the registered OS window gMg message. This message is a unique gMg windows message which is also created using the full directory pathname and the module file name (i.e. gMg.exe). The full directory name comprises the identifier for the gMg message and is stored into the shared memory area for access by concurrently running engines. The registered windows message is registered in the OS because it is required that an application has a windows message that is unique to the computer system. Applications such as the gMg Agent and its engines, will call an OS API function, passing an identification string, from which the OS checks an internal table for the identifying string, and if present, returns an already assigned identifier. The first time the message is sent by an application, it is added to the internal table and is assigned a globally unique window message for that application executable within the OS and being volatile, if the computer is rebooted the identifier is lost. For example, in regards to inter program communication, if 2 programs each have OS registered window messages, unique strings will identify each of the program applications. The OS will return unique identifiers corresponding to each of the respective programs. Upon registration, the windows message information is stored into gMg's shared memory ready to be retrieved by all targeted processes that are being injected by gMg Sensors.

The Primary Directory contains all gMg Agent system components including the main executable (i.e. gMg.exe), DLLs, .ini files, and others components. The full OS path name of the Primary Directory plays a role in the Multi-Instancing gMg agents and engines. The path and directory containing the main Agent's executable file is used to key internal gMg instances containing component sets. If there are multiple agents on a single computer, each Agent is in its own directory. Furthermore, all run time instances of the gMg engines are keyed to the directory by the full file name and path, which enables multiple installed engines to run simultaneously. The OS allocates a portion of the shared memory block keyed to each DLL name and its path to ensure uniqueness. This memory block is independent across different installed engines to prevent conflicts. For all run time operations, the OS associates the shared memory with the primary directories of each engine DLL.

Referring to FIG. 9, each Agent and engine can load one or more scripts 939 from separate directories or from a remote server location to support gMg Multi-Instance capability. If the same script is run in N processes to execute in N Host Applications 901, 902, 903, there would be N instances and copies of the script 945, 948, 951 running in the N processes 909, 912, 915 with multiple threads 918 through 936. Different scripts can also be running in each process, where each script can handle threads of their respective process, or a single concatenated script could monitor all N processes. Multi-Instancing at the gMg script level is handled primarily by a script data area. To handle N scripts within a single engine function LoadProgram 942 executes a load operation via command line, or is a result of a command within the gMg script itself. A file name is passed by a number of options (e.g., load, unload, or reload). A program list (PGMLIST) 957 is maintained of all scripts that are concurrently running. During the program loading process, the size of the script binary file is determined and memory is allocated to the specific size and once the file is loaded successfully, the file is closed. An integrity check is performed and looks for a Signature at the start of the block. If valid the file is loaded and the file is added to the maintained list of ProgramList structures 957.

The Program list Operations include remove, add, or replace. A script does not load if the script is already running. A reload operation terminates the currently running script, and loads a script with the same file name. The engine can run only one script at a time with the same file name where the script name is the identifier in the list of programs. Alternatively, an engine can run two scripts with the same name if they are in different directories. Since the name contains the pathnames as well, two scripts with the same name but in different paths can be loaded and executed without conflict. The unload function also permits the use of wildcard characters (e.g., unload DirectoryName\*) which removes everything from the DirectoryName directory. LoadProgram cannot be executed while a script is running in that process, because LoadProgram 942 requires the gMglock to be set which is normally already set by the executing script. If there is an attempt to load or unload a script that is not finished processing an Event, an operation stops the current script before another script can be loaded. The script then initiates and executes the load operation.

Interpretive scripts serialize Events and a script runs for a very short time since each pass is processing just a single Event. When the Event occurs, the script runs, and usually completes processing the Event within 1 or 2 milliseconds. Hence, scripts are often not running and the engine is idling. While there are many different organizations and structures that are possible, at a high level, in its simplest form, the script acts like a group of "if" or "switch" statements.

Where remotely automatically updating scripts on a schedule is required, if a gMg script is running and governed by gMglock, an update of a new version could be executed. Controlled by the Agent's script, various actions can be run such as updating, removal, reloading, etc. which is how the script can be loaded and invoked as needed. A designated primary gMgMain component (i.e. Agent) can receive a GLOBAL_RELOAD_SCRIPT message (generated by a RUN command) from the server or some other source across processes. This message can be transformed or directly forwarded by the primary gMgmain component to all the agents and their respective engines running in different application processes. Upon receipt of the command message, the targeted engine and/or script operations will result in script loading or updating command execution.

Two additional features within the gMg Monitoring System are Object Variables and the WhenObject keyword that are important for enabling response, modeling, and handling of Multi-Instance GUI object sets.

The gMg script keyword Object Variable offers a mechanism which tracks different sets of objects within a constantly changing environment. Preferably, to track dynamic states within each of the different processes, where there are multiple scripts, each script has its own set of variables. Each set of variables is independent of the others and supports each engine and individual script instance. The Object Variable provides the mechanism to respond in real time to potentially different instances of GUI object sets and subsets running in multiple processes and threads concurrently. Scripts can be written to reflect and model an application's run time dynamic, Multi-Instancing structure. The term "Object Variables" refers to gMg script "objects", where the objects are intended for abstract manipulations, operations, or dynamic, allocations in response to, and associated with dynamic, Host Application GUI structures.

Referring to FIG. 10 a gMg Object Variable 1035 defines an abstract structure that is attached to a GUI object 1020 in the gMg's run time GUI Object Tree 1015. Object Variables are used to represent targeted GUI objects or sets of GUI objects that reflect the user interface of the Host Application.

Additionally, an Object Variable's ability to store pointers to objects inside Object Variables further supports multiple instances, and the management of multiple instances, in very dynamic application GUI object environments. An object reference can be stored as a variable inside an object or as a pointer to another object or object variable. The pointer to an Object Variable can be dynamically created in every object located in the GUI Object Tree 1015 and be assigned its own set of variables in response to Multi-Instance Host Application detection. Further, an object pointer can be stored into any Object Variable whether that Object Variable resides in the GUI Object Tree within some other structure, or is explicitly declared independently elsewhere. For example, if there are two Object Variables of the same type, each Object Variable has its own "private" set of variables. These variables reside inside the object in the GUI Object Tree, not in the script's data area. In another example, if there are twenty objects in the Object Tree, there are twenty corresponding locations for twenty sets of variables that are dynamically allocated by the gMg engine.

Referring to FIG. 10, any given Object Variable 1005 can attach a list of variables 1010 where the association is handled by the function Setnumobjvar(ObjHandle, Progid). At compile time a unique id can be generated for that Object Variable in the script (e.g., the Object Variable name value assigned to it). In the gMg script 1040 a value can be assigned to a script Object Variable which is typecast to a physical structure. The list of numerical or string or other types of Object Variables 1025, 1030, 1035 attached to objects is scanned until one is found belonging to the current program structure and containing the matching id assigned at the time the program was compiled for that Object Variable. Because there are specific Object Variable sets 1039, each with their respective list of variables per program script, when running multiple scripts or programs each script has its own Object Variables even though they are referencing 1045 the same GUI objects of the application that all other concurrent scripts share or have references. A set of scripts will share the same GUI Object Tree 1015 that reflects a running process, where each script has its own independent variable set attached to each of the Object Variables 1039, contained in the Object Tree, for multiple instance support. Preferably, there is a single Object Tree that can be expanded to multiple trees with similar instance supporting structures.

This dynamic segmentation of state variables results in the ability to track many instances of an application's GUI concurrently. As an example of an implementation of the Object Variable, the same web page could be tracked from a different point of view by multiple, separate scripts simultaneously. To accomplish this, a script is run and listeners and sensors are established. When an Event occurs, the Event is sent to each separate script where each script decides how to handle the Event independently.

Alternatively, in a further embodiment every gMg Object Variable (e.g. located in the Object Tree, or in other structures and corresponding to application GUI objects or internal abstract organizations) can in turn contain its own object property values (e.g. string, Boolean, number), that are declared in the script. This provides a further depth of processing for doing comparisons, condition tests, or performing logic for different states of Object Variables and their properties.

The second gMg command, the WhenObject keyword described in FIG. 11, is another feature supporting multi-instancing capability in the gMg monitoring system 1133. Referring to FIG. 11, the WhenObject is an object that is attached to any object 1106, 1109, 1112 in the GUI Object Tree 1115 belonging to the Host Application 1103. When GUI objects are Multi-Instanced in the tree, WhenObjects are also Multi-Instanced. The role of the WhenObject command is to retrieve properties, or evaluate GUI object property changes, when there are no clear events (issued by the OS, the Host Application, or its container) associated with changes in the Host Application GUI. Sometimes there are GUI property changes when no events occur. Conversely, sometimes events occur when no GUI property changes take place. At other times identifying what events to use in detecting targeted property changes becomes more difficult or ambiguous. The WhenObject command solves these issues by accessing GUI object properties through a lightweight polling mechanism.

The special gMg script command WhenObject results in the WhenObjects routine PollWhenObjects1148 to be called. This routine associates a block of script code 1160 with the WhenObject 1157 and keeps track of what script it belongs to. There are several threads 1121 1124 1127 running in the Host Application's process 1118 where in each thread a Pollwhenobjects( ) call 1148 is separately made by gMg code. Each thread sets gMglock 1120 first so that a script engine executes only one script, one Event at a time within an Event serialization process. At this time the list of all relevant WhenObjects 1151 is processed. There is a cleanup operation where, if the WhenObject is disconnected from a GUI object, it is obsolete (i.e. a GUI object is deleted), and its corresponding WhenObject counterpart is removed from the WhenObject list.

If a GUI object belongs to a thread that is currently running, then that thread runs the appropriate WhenObject. The current program is set up to refer to whichever gMg program script issued the WhenObject request, then sets up the code pointer 1157 which is the script interpreter program counter that points to the WhenObject condition expression as defined in a fragment of script code 1160 that tests whether the WhenObject execution should fire. The script program counter points to the script code (i.e. the program structure that establishes a context). This points to the actual Boolean expression that is compiled in the body of the script code and a WhenObject Event is issued. There exists an object 1139, 1142, 1145 in the GUI Object Tree 1136 to which a WhenObject has been attached. A call is made to Getnumber( ) and if it evaluates to true then the WhenObject becomes active. The expression is being evaluated in the context of the script program and the Event object, and sets the "execution context." The context ensures that the processing occurs within the correct process, thread, GUI object in the tree, etc. The gMg script processes a WhenObject Event which is the global (current) Event being processed. The WhenObject Event's object is the object in the Object Tree and linked to the WhenObject structure being processed by the appropriate thread. If the expression is true, it is added to statistics that are kept regarding how many times WhenObjects become active. Commands are continually processed until a stop opcode is encountered.

Within the gMg interpreter 1153 (and shown running 1130 within the Host Application's process) the function ExecCommand( ) points to the gMg script's set of opcodes. The variable gPC pointer is the global interpreter program counter that points to the script code (pointing to the condition expression and immediately after the condition expression is a list of statements followed by a stop opcode). The expression is evaluated which moves the program counter past the expression. If the expression yields true, then it is pointing to the first statement and executes the command in which case there is a WhenObject command.

Execution of the WhenObject command performs a poll operation via the Getnumber expression at this point which may do a retrieval of properties of the object, and subsequently script commands are executed. All the WhenObjects from all scripts go into a centralized list 1151. Additionally script objects indicate their association with respective scripts. When the script terminates, the WhenObject (structure) is removed and when an object terminates, the specific corresponding WhenObject is also removed. The structure gWhenObject is the collective list of WhenObjects from all concurrent, Multi-Instanced scripts.

The WhenObjects need to be executed by threads across scripts and what script is executed when, and in which thread, is determined by thread control. Thus, only WhenObjects related to the current thread are processed in the current thread. The thread sets up the context for each respective script 1154 (which is an expanded representation of the engine and script located in the application process at 1130) before it performs the function. By setting up the context the thread sees object variable that belong to that script and blocks access to the object variables of other scripts. WhenObjects can be centralized for all scripts being run.

The following code sample illustrates embodiments of the gMg System's Multi-Instance capability. The script detects an unlimited number of threads, where each thread controls one popup window concurrently with an unlimited number of message windows. If a gMg script monitors the life time of every GUI object in an application, for full monitoring many instance structures would need to be created. For every object gMg automatically maintains structures that represent the instances of the GUI objects. The Object Tree has an attributes cache for every object, and has Object Variable storage for every object.

```
// "ManyInstances" - this script handles an unlimited number of objects
objvar createtime:number;
if ( create ) // on creation
{
createtime=sys_time;    // createtime is an objvar that is created (hence an
                        // instance) for the current Event . Where an instance is
                        // a resultant action of the Event
var s=title;            // s is a temporary variable and illustrates gMg's
s=class;                // instantiating ability. Here title and class for the
}                       // current object are stored separately inside the GUI Object Tree
if ( destroy )
{
// the current time − createtime (which took place previously) yields the
// lifetime of the object
dbg( objtypename(objtype) + ' [' + title + '] [' + class + '] existed for ' + string(sys_time−
createtime) + 'ms\n' );
}
// -----------------------------------
// Boolean expression that indicates if the current object is a popup window
function ispopup = iswindow && title == 'blabla' && class == 'whatever';
// indicates if the current object is a message window of interest
function ismsgwindow = iswindow && title == 'blabla' && class == 'whatever';
// if a create event and the create is a popup, and in the thread object of the popup
// store a ptr to the object that popped up, object is a keyword that refers to the
// current object i.e. the object that's being created. creates a ptr to the popup in
// the thread object whatever thread the object belongs to
objvar mypopup:object;
if ( create && ispopup && thread.mypopup == none ) // if a create, thread val would be empty
    thread.mypopup = object    // pointer to popup object
// if a destroy evt and the object being destroyed and the object is in thread.mypopup
if ( destroy && object == thread.mypopup )
    thread.mypopup = none; // clears thread.mypopup
// when a message window is created a WhenObject is attached to objvar
// prevtitle; checking if the title changed compared to the prev title i.e. the
// changed fn.
objvar prevtitle:string;
if ( create && ismsgwindow )
    WhenObject ( changed( live_title, prevtitle ) && thread.mypopup != none )   // thread val is
non zero
```

Numerous keywords or Object Variable definitions have implicit behaviors determined by dynamic allocations of GUI objects (e.g., prevtitle, title, class) all in response to the current object, where the current object is the structure reflecting the current Event and the current object being processed by the interpreter.

The variable mypopup is an Object Variable. During processing a call to the function Getnumobjvar( ) is made. On initialization, the first pass finds that the object is not present and returns a default to zero. Then a call to the function SetObjObjVar( ) puts a reference to the current object into the location for the popup window and also puts a reference to the popup window into its own thread object.

Live Title is current and refreshes the title in case the title changes, which is true if the live title value changes from the previous title, where the previous title is stored in the message window object. For example, if an application creates ten message windows, each one will have its own previous title value and will keep track of all title changes. There are ten WhenObjects associated with each of the message windows.

The system monitors the message windows where each will be monitored to detect if the contents of Live Title, i.e., the current title changes (Changed command), from the previous title. If true and the popup window title is "abc", a check is made to see if the respective popup window is running in the same thread as the message window. Therefore, when a message window title changes and the displayed popup window title is "abc" on detection the condition resolves to true and the WhenObject action is executed.

The WhenObject fires for every message window detected which is then further qualified by the test for the popup window. There can be an unlimited number of threads where each thread can have an unlimited number of message windows, but only one popup per thread is allowed). This code also illustrates an object pointer inside an object (i.e., thread.mypopup=object. As an example, there can be twenty threads where each thread can have its own popup window. For every twenty thread variables named, mypopup records information about each thread and its corresponding popup window. From these structures each thread variable can be tracked as to whether its respective popup window exists or not.

The description will now turn to gMg Context and its role in the identification of Multi-Instancing of GUI structures. Referring to FIG. 12, the gMg script Context keyword declares a hierarchical organizing entity that represents a section of a Multi-Instancing GUI application structure to provide the server with contextual information to support the analysis of collected track data. The Context command can be used for all object types. The top level is a process 1215, but if the process has multiple top level windows 1210 a sub context starting with the top level window for the current process builds a hierarchical relationship of the windows to represent and identify a context for generated track Events sent to the server. The contextual description is flexible in describing a variety of object organizations. If a top window is specified, the track message is formed with both the top window and its parent process, otherwise just the process is sent.

For tracking an Event which is within the scope of a process, the context can be set to process, but if tracking objects such as multiple popup windows 1205, then the context could be set relative to the specific popup window in which the Events occurred. Depending on the definition, the Context sets up an implied hierarchy that the server analyzes. There is an arbitrary threshold of a five level hierarchy that is sent with every track message record. Five levels is considered sufficient for most all cases, but this level threshold can be easily expanded or reduced.

Referring to FIG. 13, the context level value becomes significant if within a Host Application's GUI tree organization 1305 there are multiple similar instances of GUI objects or GUI object sets or objects. For example, if given a process 1315 with multiple threads 1320 through 1335 with multiple popup windows 1340 through 1355, (i.e., one for each thread) and with each popup containing a tabbed window with multiple tabs 1360, this is described as a level four context. The context provides extra information that is useful when each instance can be identified (e.g., if each tab in a set of tabs in a window is unique). Considering an OK button in the change font size tab of a typical windows GUI dialog box, in this example, the context is absolutely necessary when there are multiple identical instances and structures of similar OK buttons occurring simultaneously. Microsoft Internet Explorer particularly in web applications allows multiple threads where each thread can have the same web page as the other thread. Context is absolutely necessary for an application that has such a deep hierarchy of GUI objects, where each GUI in turn can have multiple instances. Five levels is sufficient because the contexts are usually identifiable using properties or other mechanisms for detection.

In another example, for a window with multiple tabs as commonly found in web applications, just sending the tab control name or other labels can indicate what tab exists or is being clicked. However, if all the tab controls have identical structures for application in different places), to distinguish among different tabs for activity tracking another context level definition is required. The additional context level passes data such as the unique id and/or references and reflects occurrences in each tab.

In an another example, a Contact Application contains records of customer information, and displays to the user multiple customer records containing name, address, phone, and e-mail data. In this case, all the records have identical internal structures consisting of separate threads and separate popup windows, but contain unique content information for each customer. The popup windows have identical structures, but each has unique content. At the top level structure, they appear identical to the gMg System without additional information. To resolve this ambiguity, an extra context level is used to differentiate the different popup windows resulting in reconfigured context information that is sent with every track message to the server. On the server, common context levels are grouped together to track Events that occur within each GUI window structure such that if a click occurs in one window it is not confused with a click in another window.

Besides GUI objects, thread objects can also be targeted for the identification process. The threads can be contextually identified where each application thread in a GUI multi threaded application is assigned their own context. Given an application with multiple threads and multiple identical top windows, an additional level (a thread object in a process), would be introduced and a thread-id used for identification. This handles a multi-thread situation, when there are multiple identical threads with each thread having identical top windows, needing to keep track of activity in each top window groups separately from activity in other identical top windows. Since multiple threads can also appear to be identical, other objects or relationships (e.g. ancestor), are defined to identify different threads and their associated objects. This ambiguous situation, when identifying GUI structures and hence Events, is encountered in many web applications such as in industry standard customer relationship management applications ("CRM").

In different implementations, such as in Microsoft's CRM application (CRM is a product of Microsoft Corporation of Redmond) it was found that a popup could be opened for any new activity which in turn creates a new thread, then as many threads that can be created as additional popup windows are needed. In this situation, the use of gMg's thread Context distinguishes the separate popup windows. However, if there is only one level, and within the popups it is possible to create additional multiple identical instances of windows, then an additional context level is required. Ultimately, the Microsoft CRM example requires just two levels. Extension of the number of levels can prove to be more convenient and can be reserved for future expansion. As an alternative, other attributes can be utilized within the popup windows to distinguish among them.

By defining a GUI object contextual hierarchy of sufficient depth (resolution), GUI object structures that are otherwise identical can be distinguished. If there are multiple GUI object structures windows that are the same a topwindow context can be used to group all Events in logical sets associated with targeted GUI objects. The gMg Context feature supports multiple instance capability for object differentiation.

Discussion now turns to problems of identification and event detection for the purpose of supporting Multi-Instances to establish Hooks that provides one of the main categories of events for the gMg System.

Referring to FIG. 14, ChangeHook and lockgMgEngine are passed the thread id, and hook the application's process 1406 as needed. A gMg message 1424 is then posted and registered to the application with function PostgMgMsgo. The PostgMgMsg function, using the passed thread-id, finds the window using the thread-id and then sets the windows message. As mentioned previously, gMg registers its unique windows message using the full path name of the .exe which establishes uniqueness for multiple gMg.exe's. PostgMgMsg works generically and posts multiple copies of the message to complete the registration process, where the first message to succeed is used in the system with the remaining messages discarded. Shared memory 1454 is used to control and track the obsolescence of the gMg windows message for every gMg Agent or engine instance. For diagnostics support, the tmdiagnostics value is contained in the message wparam with lparam pointing to diagnostics data located in shared memory. When diagnostic information is needed by some gMg component, gMg's windows message sends the diag_exports message which arrives in one of the winhook routines.

Driven by a clock 1457 from the operating system 1403, all running hook routines 1433 through 1442 eventually intercept the message and call the routine Handlemsg( ) 1445. Within Handlemsg, at the getmessagehook routines 1445, the getmessagehook is concatenated with a number N based on the number of hooks currently being set by the system. The hook is implemented in a set of macros from 0-N 1427 that call the function handlegetmsghookmessage 1430. There is also an array of pointers to each of these routines when hooking is being done, where autoinline during compilation is set to off to prevent the gMgMsg routine from getting duplicated multiple times in each of the instances. Furthermore, within Handlemsg there are N Sendmessagehooks which also handle the sendmessage 1448 message that calls HandleMsgHookMsg 1451. These routines will intercept the messages regardless of their origin.

Preferably, instead of creating dedicated worker threads for monitoring processing, host threads 1409, 1412, 1418, 1421 are used. Window creation is minimized with only a timer created in the process to set up a callback function. Furthermore, no worker windows are created since the objective of hooking is to be transparent and minimally intrusive. Even if worker windows are established, the window would still need a timer for process control.

The gMg System sends a message to existing windows of the Host Application and then intercepts the message. Messages are rarely sent across processes but if this does occur, a search is launched for N different windows in the Host Application. Once located gMg sets hooks in each of them and intercepts the message as it arrives in the targeted, respective window.

The tid Macro gets the current thread id where there is one hook per thread. Normally messages are received from windows that own the current thread, but occasionally messages are received from other window threads. A thread that executes a sendmessage must belong to the same process otherwise a DLL would have to be injected into another foreign process that is not explicitly hooked. If a Sendmessage is initiated by a different process it is put into the target process and then is assigned a thread in that process that calls a hook routine. The Handlemsgs routine is called from both Getmsghook( ) and Sendmsghook( ) 1445. Message handling has uniform behavior—i.e., no matter how messages arrive, the gMg attempts an intercept.

GetExtParams( ) is used to pass additional parameters and information across processes with gMg inter-process window messages (e.g., load script, unload engine, etc.) during SendMessage calls. It has a lock in shared memory consisting of a version number plus an index. This function masks off the version number and can index into an array in shared memory to get additional data to be passed with the message after indexing. If the shared memory id (which includes the version) does not match the requested id then it is an obsolete entry. The thirty-two bit number id is continually incremented. The bottom six bits are indexes into a circular buffer into the ExParams structure. If the thirty-two bit id in the buffer does not match the passed parameter then it's determined that the id has been reused or is obsolete. GetExtParams( ) fetches lparam and returns null if obsolete. If lparm is not obsolete then process the message with the extra parameters. There is a macro used to remove the code for a release version of the engine. A test is also made to see if the dbgdll is loaded.

The GUI Object detection mechanism that detects GUI object sets in the gMg System is referred to as Generic detection. The Generic detection method determines and detects GUI Events with distributed processing on both the client and server. There are two types of GUI object operations: Specific and Generic. With a generic approach objects are detected through a much smaller number of operational descriptors to create a set or class of GUI objects. Input parameters fed into a function can be analyzed to detect a class of GUI objects rather than just one specific GUI object.

On the client, in the spectrum 1515 of GUI detection FIG. 15, gMg script expressions are deliberately made more generic 1510 (e.g., for detecting whole categories of related GUI objects) or more specific 1505 (e.g., for detecting single GUI objects). Detection expressions can detect GUI objects that are anywhere in this conceptual spectrum. The gMg Sensors collect the Host Application GUI object data and using this the gMg script defines expressions generically (or categorically) for GUI object detection. The resulting collection of GUI object details and properties are packaged and sent to the server. The server receives these categorized Events and accompanying properties and further processes them to determine specific GUI object Events. The server builds user contexts by using track message levels and predefined semantics and conventions. For specific GUI detection, a track message is sent to each GUI object identified that contains specific properties about the object. In generic detection, a track message is sent containing sufficient data for the server to determine Specific GUI object analysis and identification in post real time.

In the following Specific and Generic Binding code examples, the first embodiment shows specific binding (targeting a single GUI object) where the client filters out and sends different track messages for each of four defined GUI buttons being tracked:

1. Checks are made if the class is "button," the title is "OK," and the top window is the open window. If all true, then a track message is be sent indicating that an Open OK was pressed. (Open OK);
2. If it is an OK button within the Save dialog, a Save OK track message will be sent. (Save OK);
3. Further, if it is a Cancel button in an open dialog box, an Open Canceled track message will be sent. (Cancel Open);
4. If it is a Save Button and the save dialog that has a Save/Cancel message, the appropriate track message will be sent. (Cancel Save).

The following demonstrates how four specific types of buttons are being detected.

```
/* Specific and Generic Binding Code Sample */
context process = process server "someserver"
context thread = thread in process
context topwindow = topwindow in thread
// Specific Binding - client determines specific object and sends unique track message for each
if ( wlbutdown && class == 'BUTTON' && title == 'OK' && topwindow( title == "Open" &&
class == "332767" ) )
   track( priority, pressed, topwindow, "Open Ok" );
if ( wlbutdown && class == 'BUTTON' && title == 'OK' && topwindow( title == "Save" &&
class == "332767" ) )
   track( priority, pressed, topwindow, "Save Ok" );
if ( wlbutdown && class == 'BUTTON' && title == 'Cancel' && topwindow( title == "Open"
&& class == "332767" ) )
   track( priority, pressed, topwindow, "Open Cancel" );
if ( wlbutdown && class == 'BUTTON' && title == 'Cancel' && topwindow( title == "Save"
&& class == "332767" ) )
   track( priority, pressed, topwindow, "Save Cancel" );
```

```
// Generic Binding - client sends one track message for all, but with info for server to figure out
which
if ( wlbutdown && class == 'BUTTON' )
    track( priority, pressed, topwindow, "Button", title=title, toptitle=topwindow.title,
topclass=topwindow.class );
```

Any button-down message on anything with class "button," coupled with a press Event, sends a track message indicating that a button (any button) was pressed. The topwindow title and topwindow class can also be forwarded to the server to analyze and detect which of the four buttons have been active. In the generic code multiple track message structures can be identical, except they can contain different content data that distinguishes them as opposed to a track message that clearly identifies targeted GUI objects before transmission to the server.

In both Specific and Generic cases the Events are received by the interpreter and within the Event interpreter processing, based on the condition described in the script in both the Specific and Generic cases, perform property retrieval to enable the execution conditional expressions. The property retrieval is part of either the condition or part of the body of the condition statement (e.g., if (Q) {R} where R may contain one or more track messages). Additionally the server handles or detects different GUI objects, and either looks for types of buttons such as Save, Cancel, OK, etc., or parses text to do string matching. The latter case shifts the detection processing responsibility from the client to the server.

The gMg System's Method Monitoring implements a specialized Sensor used to monitor methods contained within components. This specialized, flexible sensor enables possibilities within the invention for generating and integrating many types of events across the spectrum of the targeted Host Application internal to the operating system on a client or server. Method Monitoring involves the interception of component methods to support a sensor type that intercepts function calls and returns in Host Application components packaged as DLLs. Interception of function calls enables the gMg System to retrieve Events and properties from components that can be passed to logical scripts for tracking and monitoring.

Given that any function can call another function or call itself recursively, gMg Method Monitoring is based on two basic objectives in a variety of situations and component environments. First the address of the targeted Method is to be located; second the targeted Method is intercepted. The technique to use for locating the address of the target Method depends on what component technology is used in its implementation such as COM, a non-COM object, exported function, or the information available in the typelibrary header, function parameters, function returns, memory, vtables, etc. While COM Methods (FIG. 16, items 1624 through 1636) are discussed as an example of gMg capability, the principle is applicable to methods contained in different component technology from other companies such as Corba (available from Object Management Group, Needham, Mass.), IBM's SOM (IBM, Armonk, N.Y.), and many other component systems used for building software applications. To the gMg System, expanding support of these additional technologies is a task of building a different component type adapter. The techniques presented in this description can be applied to other component technologies, as is readily apparent to a person of ordinary skill in the art.

In another implementation, an additional factor and technical variation within COM using a gMg temporary object occurs when the monitoring scenario dictates that the object containing the targeted Methods exists at the time the gMg Method Sensor can be activated. However, if the object does not yet exist, monitoring the operating system's creation of new objects will yield their Method locations. The gMg operates in a manner that preserves the Host Application's continuity of execution, (i.e., uninterrupted execution while monitoring Methods). The Method Targets are embedded within various component technologies that are in turn based on available interfaces in the operating system or the Host Application.

To support COM method interception if the gMg Method Sensor is activated after a COM component has already been created VTables are first located to retrieve method addresses. A VTable or virtual table is a table in a COM class that contains method pointers to methods or functions belonging to the class. The technique of gMg Method Signature Interception is then applied to establish monitoring. Note that COM interfaces if published, are documented as TypeLibs and are found within DLLs/OCXs.

Another component category, the exported function has method interfaces that are exposed in a DLL component where the exported function names are listed in component's export table in program module headers. Once located gMg Method Signature monitoring (refer to FIG. 16, items 1612, 1621, 1639) establishes capturing points during Host Application calls and returns to and from the Method.

Once the component type is determined (COM or exported function) gMg's Method Signature monitoring FIG. 16A, item 1657 is pivotal and applied pervasively throughout gMg Method Monitoring in a wide variety of scenarios once a targeted Method is located. A Method Signature is defined as the opcode pattern of a Method's entry point that is described in the gMg System and is discovered with gMg inspection tools. Once defined, these opcode patterns are used to locate and verify Method entry points that are then used for call and return interception. Method Signature monitoring can be universally applied to any located function regardless of its packaging, environment, or location. Once the Target Method addresses are found within one of the component types of COM or exported function, then gmg's Method Signature Method Monitoring is applied to perform the Method Interception.

In another configuration, Method Signature Monitoring occurs if, when a call begins with a located VTable Method and within the VTable Method there are other internal calls to Methods in the component, gMg Method Signature Monitoring can be used to track the internal method calls as well. Additionally Method Signature Monitoring is used as part of the setup of VTable Method Monitoring within COM objects.

Referring to FIG. 16 showing an overview of gMg Method Monitoring, the Host Application 1603 running within the operating system environment 1609, initiates the loading of its DLL components 1615 through calls to operating system code function LoadLibraryExW 1618. The gMg monitoring sets up an intercept of the kernel function LoadLibraryExW to ensure that all instances of a targeted DLL are detected. DLLs contain exported functions 1620 or COM Typelibraries 1624. For COM Method Monitoring, just prior to the creation of the targeted COM objects. The gMg monitoring intercepts different stages of COM creation 1627 for the purpose of locating the COM's VTable 1633, which includes pointers to all of its interface methods 1636. These stages of execution are as follows: gMg intercepts the DllGetClassObject Methods. DllGetClassObject is called by the Host Application and returns IClassFactory; gMg intercepts IClassFactory::CreateInstance; IClassFactory::CreateInstance is called by the Host Application and returns the newly created COM object; and Inspection and operations with the newly created COM object yields the location of its VTable.

In scenarios where the COM object already has been instantiated and has "late bound" (where Methods are instantiated and registered in structures such as VTables at run time as opposed to compile time) its Methods, the gMg System creates its own temporary COM object 1630 which provides the address to the same VTable used by other targeted (already bound) Methods within the component. Once the VTable is located, the gMg System applies its Method Signature Monitoring 1639 (which is shown expanded in 1657) to transparently and unobtrusively monitor the targeted methods. For the monitoring of exported functions 1618 gMg Method Signature Monitoring is also performed to intercept function calls.

Referring to FIG. 16A 1657, once Methods are located the gMg monitoring sets up Signature Method Intercepts for calls 1642 and returns 1645 of the targeted Method made directly, or indirectly, by the application's Method Caller 1606. The gMg intercept code maintains the integrity of the original function and based on the Host Application's call and/or return, issues appropriate gMg Events to the gMg interpreter 1660 and passes along relevant information requested by the script.

The monitoring of Method returns is classified as either generic or specific (note: not in the GUI object sense). Shown in this FIG. 16A are two techniques for generic return capture Stack Copy 1648 and Stack Allocation 1651 (sometimes referred to as a stack-per-thread) which are addressed in the following sections. Specific Monitoring 1654 refers to Methods whose parameters are found in a published location such as in a typelibrary. However, generic Method interception works with any function without pre-knowledge of the function's parameters or return values. In this case Events are only generated without specific information when a call is made or a return occurs from the function. In the generic Interception Method call and return Thunks and their code are executed Of the three important tree structures (GUI Object Tree FIG. 7 and FIG. 8, Process/thread tree) in the gMg tracking and monitoring system, the third, namely the Code Module Tree, contains modules, function monitors and COM object instances that are dynamically detected to support Method Monitoring.

Referring to FIG. 17 illustrating a Module Tree, used by the Method Monitoring Sensor, there is a separate Module Tree with a module list 1705 at the root. A function monitor tree item 1710, 1725, 1730 can be anywhere in the tree. On a function_call Event from an Interface Monitor 1715, a COM object 1720 can be the child of a function_call Event 1715 if one of the arguments (of the function_call event(Pl,Ptr_to_COM, . . . )) points to a COM object. Driven by the script, only selected functions are monitored. The Module Tree selectively contains only what's needed to satisfy script monitoring requests. Additionally, the gMg Interpreter, driven by keywords in the script, updates the GUI Object Tree and the Module Tree to model the real GUI application and support function Events in the application.

On startup, the Module Tree is filled with program modules 1705. Interface and Function objects in the tree are only created on requests from a script. Once running, the Module Tree is maintained using a LoadLibraryExW call and return intercept.

In Exported functions the script requests to monitor are added to child Function Call Objects of Module Objects in the Module Tree. Interface Objects of COM objects of interest are also added as child objects of Module Objects for reference and to monitor creation of said types of objects. COM Objects of desired types are added as children of Interface Objects when created. Method Function Call objects are added as children of Interface Objects or COM Objects when the script requests monitoring of those methods of an Interface, or COM Object. COM Objects discovered from intercepted method calls are created temporarily for script reference and are not always in the Module Tree. They are garbage-collected by the engine after use.

The Method Signature Monitoring provides a technique for monitoring function calls, and is applied to different situations to create gMg Method Events and property retrieval. Method Signature Monitoring identifies byte opcode patterns that represent recognized Method Signatures of Method functions. Once located detected functions can provide interfaces to items such as GUI Events and properties as well as other internal events or processes occurring in application components. Method Signatures can be applied universally to any Component environment for any type of call and to capture function parameters. Once the address of the procedure is determined, gMg links it using a jump instruction with a call intercept routine and an INFO structure instance, which tracks every call to the targeted function. The INFO structure contains a byte pointer to the function code, a void pointer to its interception procedure, and an INFO structure called InterceptMultEdxInfo that carries the instance. As part of Multi-Instance support there are various techniques of carrying and passing on relative information about the function call interception, such as the use of CPU registers (i.e., Instance Registers), or other mechanisms.

Referring to FIG. 18, the creation of a Method Monitor is illustrated. Initiated by the gMg script monitor command 1836 contained in the gMg script 1833, first the function's address is located by the MakeFunctionMonitor mechanism. Given a Module N 1806 containing N Methods 1827, as preparation for locating the function address and executing an interception request, the appropriate module list has already been found and is maintained automatically during intercepted LoadLibraryExW calls using module enumerating API's such as Createtoolhelp32snapshot 1815, Mod32First 1809. As would be readily understood by a person of ordinary skill in the art, these API's can be replaced with updated operating system available functions as such functions are promulgated. The Module List 1803 has been prepared previously at the time of an interception request. MakeFunctionMonitor 1851 receives the function name and a Module Object, Interface Object or COM Object and calls MakeFunction once an exported function name or COM method code address has been located. Then a Function Monitor Object 1860 is created as a derivative of the gMg Object class where the object contains a function intercept structure. Implemented properties contain a gMg object instance that returns a pointer to the original procedure, and is set to true if successful.

MakeFunctionMonitor implements a type "Function Monitor Object" which, unlike a window, HTML DOC, or a timer, is a function object type that can contain various properties such as how many times a target function is called. All instances and allocations of the function are tracked globally. At the time of the intercept request, the module containing the desired function is known from being found either during an intercept request or was previously determined. The gMg script passes the Module, and GetProcAddress 1824 is used to find the start address of the function body (e.g., MakeFunctionMonitor for Module Object uses function GetProcAddress 1824 on the function name within the call to InterceptCallMultEDX 1818).

Called indirectly as a result of the gMg script command 1839, CallIntercept 1848 performs the interception and accesses the INFO structure 1863 that is located in the function object 1860. To avoid recursion, if a gMg script command inadvertently calls an intercepted function while intercept processing, a lockd on gMglock is executed. Before the interception is attempted, a locking mechanism checks 1842 that the CallIntercept function 1848 is not being locked by the same thread, in which case the call intercept will be skipped 1845. Assuming the interception is successful then the interception code is passed a global pointer to this INFO structure which is then casted to Function Monitor Object.

The function Functionintercept 1866 has the gMg function object 1860. The gMg Event 1869, issued once a successful interception is executed, is then passed to the function call Do_gMgEvent 1872 that processes the Event and all scripts 1875 that are running. Do_gMgEvent receives the function call Event, acts on it, and when finished clears the global pointer and global lock.

Received by the gMg interpreter, the Method Event used by the Getstring and GetNum functions is called Method EventProperty 1869. These Getstring and GetNum functions are implied for each type of gMg object and call each other if not recognized for its own type. The gMg script asks for a stringevent property by index and if the property is not located, the script interpreter code calls one of the other types in a chain of functions for each type of gMg object.

If within the script such as event.sl, interpretation results in a chain of calls looking for getstring Event properties, the index that represents sl is passed. A check is done for a null pointer and a global Event selection value determines if a function call Event is being processed. Preferably if a different type of gMg Event is received, such as a create Event which is being processed, the priority of Object Tree scanning is raised which results in a scan of the Host Application tree. If the Event is processing a function call then a pointer is set which is an offset in the stack where the original call parameters are located. Each parameter can be retrieved from this stack location.

One implementation provides a function for handling parameters of unknown string length. This function determines if a string is of an unknown location, and returns negative or positive values to indicate if the found values are one or two byte characters, respectively. The function returns zero if there is no string present. It can be determined whether the string property being queried applies to the current call intercept Event 1869 that is being processed in the script. When true there is a call Interceptargument 1878 which is in the middle of processing the function call Do_gMgEvent 1872. This is the only time the string property variable is non-zero and points to the address of the INFO structure from the stack (i.e. at the stack address).

Physically residing inside the object structure, there is a pointer to itself and also to the hosting class (which is the only place it is used), and contains information about the interception, and a pointer to the gMg object, which is the Function object 1860. All these classes are local to the Method Interception Sensor and are self contained.

Referring to FIG. 19, which illustrates Method Signatures, to implement the gMg Method Sensor the gMg Method monitoring system loops through an array of captured byte patterns 1920 of the targeted Method called a Method Signature 1930 and compares them against run time, targeted function byte opcode patterns 1910 discovered with inspection tools to detect a Method's 1905 location. For Signature definitions, macros, which are strings of bytes representing different opcodes, are created. Defines are used for documentation for typical opcodes in function entry points. Signatures also consist of specially defined codes such as don't_care and signature_end codes. For example, specific libraries, which have a specific version of compiled code, have a fixed sequence of certain instructions in functions determined by the version of the DLL that change in different versions. The function's code is parsed to determine if the entry code 1910 is recognizable, and if true a pointer to the Signature that matches is returned. This evaluation also suggests how much of the code needs to be copied elsewhere before inserting the jump instruction and where to return to in order to execute the duration of the code. An exception is if a jump instruction is found as already part of an intercepted function and if detected gMg has already intercepted the application function call. The process then aborts since the gMg monitoring process cannot be recursive.

This opcode parsing technique also works within classes of different derivative CPUs. In single threaded applications, an alternative technique could be applied: restore the original target code before entering gMg code, effectively disabling interception, then after returning from gMg code (interception handler) re-enable the interception by putting jump instruction back at the beginning of target function code. For every documented Signature, processing loops through each byte code until a Signature_terminator 1935 is located. If the values do not match, then processing moves on to the next Signature, but if a match is found all the way to the signature_terminator value then the start location value is stored, and the length returned.

Once Signatures are found, for successful interception it is important to locate and then place a gMg code jump instruction overlay on a clean opcode boundary 1955. A jump instruction cannot jump into the middle of an opcode, therefore the location of the proper opcode boundaries need to be known. In a five byte overlay the first four bytes comprise two opcodes 1960, 1965, and the fifth byte contains the relative address 1970. The relative address prevents relocating the overlay and executing it because the address is relative to where it is being executed from in the original function. This restriction is overcome by translating the relative opcodes to absolute locations.

In the targeted function 1940, for a target overlay, five bytes are minimally needed 1955 (plus a signature_end) to set a jump instruction in thirty-two bit CPU's. The overlay could also be seven, or ten bytes, but not more than sixteen bytes. Once the five byte opcode is found, insert a special value signature_end which indicates where to jump back to when replacing the function's code. The original instructions are copied and the entire series of opcodes are overlaid 1945 and replaced with a jump instruction to the interception routine 1975. The copied opcodes are byte values that are stored into an array of short values 1980. Upon return from the interception routine 1975, program flow returns to this code interception/continuation point 1950.

Since functions pass one or more parameters, there are also gMg functions that do the work of fetching the parameters of the monitored Method (i.e., Getstringfunctioncall( )), where the opcodes may have both numeric and string types. For example, if given save event.sl (where s1 is a string property), there is a function Getstringeventproperty( ) which has one parameter that is a word constant taken from the N-Event properties list (NEP). The NEP list defines a list of possible word constants which are all the string Event properties. Getstringeventprops( ) is called, passing the Event property number. Event property cells are string Event properties such as in URL frame headers in the browser URL S1 through Sn. The Event properties are enumerated as the arguments and Boolean Event properties, and used as the argument in the opcode. Numeric Event properties are found in the same manner and are enumerated as the arguments and in Boolean Event properties. String Events start with "1" as a numeric property, and Boolean Event properties start with "1000" at run time.

To identify whether the parameters are ASCII or Unicode, either an API (e.g., IsTextUnicode) is called or, a count is made of ASCII unicode characters along with the unicode strlength parameters. A count is also made of ASCII characters, by looping through the ASCII target and finding the total ASCII length and number of characters in the string. If a significant proportion of the unicode characters are ASCII code characters, and the string is not too long, then it could be a valid unicode string. Otherwise the characters are considered not likely to be a unicode string and zeroed. The greater proportion string is returned, where a negative count indicates an ASCII string, and if pointing to a null string, zero is returned. If no string is located an empty string is returned. The routine also returns a pointer to the stack containing a set of wide characters.

Interceptions can occur at the start or in the middle of targeted function code. The gMg monitoring uses a function base offset of zero, and has provisions for a function base offset of non-zero where the interception point occurs in the middle of functions. Interceptions of multiple instances of the same function can also occur and be detected.

Code is examined for jump instructions to a gMg Thunk. If found, the function has already intercepted and the interception setup process aborts; otherwise, the function is set up for interception. In order to modify the targeted Method's code, functionality is needed to control the memory block containing the code. The gMg Changememory function is used to alter permissions in the memory block containing the function to be intercepted. The gMg changememory routine changes the attributes of the memory block by removing the execute option and setting the read/write option. Function interception depends on altering properties of the memory block, and fails without successfully modifying them in the Host Application's code. A handle is used to return the original protection and to restore the attributes. Since change memory can happen frequently, the process is split to both change memory and restore memory.

The use of Thunks is a technique used in a range of support mechanisms from late binding of identifiers to real objects at run time, or the tracking of Multi-instances during Method calls. Applied in different situations, a thunk can be a pointer to the real function as a pointer to code, or could be in the Thunk space which returns to the real function, or is the address of the original targeted, real function. Pointers are established within monitored code to point to an interception Thunk which is a section of memory with rewrite and executable attributes. Thunks are used for tracking multiple call or return instances. To facilitate support for intercepting a large number of functions, intercepting code can be shared except for Intercept Thunks and Resume Thunks. Each function's entry code is replaced with a jump to a separate Intercept Thunk per function. Meanwhile, the Intercept Thunk supplies a pointer to an engine data structure ("INFO") representing the specific intercept and then calls a common Handler Function shared with a large number of intercepted functions. The role of Thunks and their application is further discussed in the sections on virtual tables and COM monitoring.

In the case of a generic function call interception (without knowledge of the function's parameters or format), the Handler Function returns after script processing and the Intercept Thunk jumps to the Resume Thunk which has a copy of the overlaid entry code of the original intercepted function followed by a jump to the remainder of the intercepted function. For specific function intercepts (where the function's parameters and format are known), the Handler Function receives the parameters passed by the application in exactly the same format as the real function and additionally the Handler Function receives the INFOpointer for the intercepted function supplied by the Intercept Thunk. The additional INFOpointer parameter can be passed by the Intercept Thunk by adding it to the stack or placing it in an unused CPU register. The Handler Function calls the original function via the Resume Thunk (which can be located via the INFOstructure), and can then return the original function results back to the calling application. The Handler Function notifies the script of the call along with a reference to INFO describing what was called. The Handler Function also notes the location of the parameters on the stack so the script can reference the parameters as numbers or strings. When the parameters of the intercepted function are known (either published functions, COM methods in a COM Type Library, typed parameters, etc.), the parameters can also be referenced in a script as COM Objects (ex: "this" pointer) or Window Objects (derived from window handles). For special cases (ex: LoadLibraryExW, DllGetClassObject, and IClassFactory::CreateInstance), the Handler Function also does additional work before or after calling the original function (add a new Module Object, intercept IClassFactory::CreateInstance, and examines a returned value respectively).

With thunks, multiple N threads are supported where Thunk allocation needs to be locked via each thread. Locking by thread is required because, for example, two threads could call two different functions or maybe the same function where each thread requires its own return Thunk. In some situations, each instance of a call could be calling the same function recursively. Additionally, the creation of parallel stacks for every thread becomes easier if processing can dynamically release what was created on the fly during each call using thunks regardless whether the function uses a C style or a Pascal style call. The application of thunks within gMg Method Monitoring is used to generate a wide spectrum of events from Host Application component Method calls and returns.

Referring to FIG. 20 showing Thunk Allocations for Method Monitoring, when a Method Signature of valid length>=5 is found. If a valid value is found, the Virtualallocation function 2006 allocates a block of memory 2009 with rewrite attributes and allocates dynamically 24 bytes at a time. For Thunk allocation, a reusable block of buffer memory is used. There is one fixed buffer in the program for all expression strings and during their calculation uses free temporary strings which need to be emptied after every gMg instruction. This overhead needs to be reset periodically. A private gMg heap is also used instead of using the application heap to be more isolated and avoid affecting the Host Application if any gMg errors occur. A private heap function creates the heap and then provides a handle to do all allocations such that all New operators would have to be used with the new private heap. InterceptcallmultEDX 2003 allocates two blocks of memory: one for code to intercept the call 2012; and the other to store the original code 2015 to ensure processing continuity for the targeted function. Inside the gMg intercept section, a series of codes are inserted: a PUSHAD instruction 2018 which is an instruction to push all data registers; followed with a push of a long value which is the address of the INFOstructure 2021 that needs to be associated with the instance of the intercept.

The InterceptmultEDX( ) function is based on the assumption that an instance register (e.g., the EDX register) is available for use by a called function without first saving the register, so as to improve efficiency. Since modifying the CPU stack is to be avoided, insert a move EDX register for the infodata. Then move the data EDX register to pass the instance information to the next piece of code. This approach can be used where it is known what function is being intercepted, and also for creating an identical template with exactly the same parameters such as a kernel function like Loadlibrary.

Information stored in RAM (i.e., the HEAP) cannot be used for the same EDX purpose because conflicts with other threads due to shared access could occur, and, thus is not thread safe. Using registers or stack is the only thread-safe way of passing instance information without needing synchronization or other expensive operations. RAM could be used for passing instance information but would be much less efficient. By using RAM, at each call, the interceptor would have to perform lookup based on the address of the intercepted function. Also, the maintenance of the lookup table (a map of function addresses to info instances) would have to be synchronized to be thread safe which would be an expensive operation.

In some cases the stack can be used but like RAM, this approach also has its disadvantages in maintaining transparency. The interception function must substitute completely for the original function and probably call it in the process. This can be difficult from a control viewpoint. In this situation, the interception process must clean up the stack the same way as the original function and have exactly the same parameters, and, at the same time, add one more parameter i.e., the Instance or Context Info to support the monitoring system's interception. Some targeted functions are invoked via jump instructions and the stack cannot be changed by a push (where a push results in the extra information placed after the return address of the targeted function's parameters and return address). In this situation the interception routine's code would not have easy access to the original parameters and cannot clean up the stack in the same manner as the original function does. For example:

```
Stack:
...
dwFlags
hFile
lpLibFileName
Return-address
// A push does not "add" a parameter. It follows the return-address:
dwFlags
hFile
lpLibFileName
Return-address
Info // for interception routine
```

Regarding an EDX alternative, the use of "PUSH infoAddr" instead of "MOV EDX, infoAdrr" might be viable option that is also thread safe, but this alternative is slower than using the CPU register.

There are benefits to using a CPU register. For instance, passing the instance address through a register is optimal for passing instance context information. This approach only works as long as no parameter is passed to the monitored method/function through the same INFO passing register. It has been discovered that passing parameters through the EDX register is never used for exported functions. However, it is possible to write code that would cause a crash while in gMg Monitoring using EDX, but would probably require an assembler and is unlikely being used with available compilers. This crash is extremely unlikely for exported and COM functions. Further, using EDX would not work for interception of kernel level calls that are made through a 'sysenter' instruction or other internal calls that often use EAX and EDX as parameters. However, in these conditions, another register could be substituted. Use of EDX also reduces code size. The invention is not so limited that using EDX is a requirement for "generic intercepts," where passing on the stack is reasonable. However, passing additional context info material in CPU registers is much better than on the stack or in memory when SUBSTITUTING one new Handler function for multiple instances of original ones.

Multiple Instance:

```
HRESULT STDMETHODCALLTYPE iIClassFactory_CreateInstance(
    IClassFactory * This,
    /* [unique][in] */ IUnknown    * pUnkOuter,
    /* [in] */ REFIID    riid,
    /* [iid_is][out] */ void    ** ppvObject)
    HRESULT ___stdcall iDllGetClassObject( REFCLSID rclsid,
    REFIID riid,
    LPVOID * ppv )
Single Instance:
    LoadLibraryExW
```

Referring again to FIG. 20, once the parameters of a targeted function 2036 are known the function is intercepted, and is then substituted with a gMg "proxy" (or interception) function 2045. The original caller 2024 remains blocked waiting for the function results. The gMg proxy function 2045 calls the original function 2048, 2042, receives the return value, and then returns to the original caller 2024 with the results 2051. The gMg creates a proxy function 2045 with exactly the same parameters as the original function 2030, but adds at least one extra gMg parameter 2033 for instance information. This is done in case there is a need to hook multiple functions in different DLLs 2060, 2063, 2066 all with the same Method name 2072, 2075, 2078, and with the same function Signature. To forward information to the intercepting routines, the EDX register can also be used for passing an extra gMg INFO parameter which avoids modification of the stack of the original application during the call interception.

The gMg intercept function assembles a push of the address of the instance of the INFOstructure and then builds a call intercept procedure that is specified to be called during the interception 2045, 2048. The gMg processes copies of the original code of the function being replaced and saves it 2048. On the return afterwards all registers are popped which causes a jump to the code in the Thunk (a structure holding an address or pointer) 2054 to return to the original calling routine. The code for the original routine can be accessed using prealproc which points to the real routine.

During the call from Host Application code, a jump instruction 2039 is assembled that thunks from the interception point in the original targeted function code to the associated gMg interception routine 2045. The original code is copied 2048, then another jump instruction is assembled that thunks back to the continuation point 2042 (in the targeted code) where the interception routine returns.

This completes the building of the two Thunks: one to intercept and another to return. In an alternative implementation the two Thunks are merged into one bigger Thunk which allows the ability to make a direct call of the original routine from inside a gMg interception routine or make a call to the address prealproc which jumps to the original routine, thereby bypassing the intercept.

There are a number of issues that arise in the setup or Method monitoring process and the use of Thunks: thread conflicts between multi-threaded applications, and Event Processing in relation to gMg GUI Object Tree updating. A problem can occur while modifying or overwriting the original Thunk code if another thread is calling the Thunk executing it, allowing the possibility that it will inadvertently execute the replaced code. To avoid this issue, the gMg System uses techniques that can be used dynamically to accommodate different situations namely, sleep or thread suspension.

To avoid thread conflicts during Method monitoring, the sleep technique issues a sleep function for N milliseconds as an attempt to possibly avoid a conflict if multiple threads try to execute the same code at the time gMg tries to modify the code. The sleep suspends the thread and restarts the time slice for this thread. This means that the thread has a complete time slice to complete its operations to reduce the probability of an error occurring. As mentioned, the jump instruction is assembled as part of the modification of the original code which jumps to the gMg interception routine. This is implemented as a macro or inline function which puts in the jump opcode and calculates the offset address.

Another technique is to suspend all other threads in the process momentarily with an API call. If the thread does cause an exception the exception, can be intercepted in response to some message using a hook and allow the thread to cause an exception but force the thread to restart gracefully. To further decrease the probability of problems, in addition to the sleep, the thread priority can be raised to "high." Another thread can be started but has less chance to conflict. The sleep technique alone may be sufficient, except when monitoring in environments with multiple CPUs. With multiple CPUs the OS will typically allocate processing to different processes during function/method interception.

With respect to multi-threading, for functions that are called through the import table, an extra intercept mechanism using import tables basically locks the call, does a code change for interception, then unlocks the call by changing the values of the import table. The function Getprocaddress provides the address in the import table.

Additionally Method Monitoring is interleaved with GUI Object Tree scanning to coordinate with, and to keep the tree synchronized with, the Host Application. There is an Event and tree scanning control mechanism that calls a chain of functions beginning with ObjectInterfaceEPT. GetStringEventProperty( ) is called first and passes the index, but if the property is not present, then a call is made to GetStringWinEventsProperty( ) followed by a call to StringGetWebEvent Property( ). Before the monitored function is called, prior to the application calling the intercepted function, a test is performed to determine if gMg is potentially monitoring in the current Event. In case other events are being processed at this time, and where there are detected Events, the Host Application's GUI tree is rescanned as a way of updating the priority of scanning the application tree. Otherwise, the only time the application tree is scanned is normally on the timer Event. If the application is busy, many events may be generated that are being intercepted. Furthermore, the OS ws_timer Event is controlled, which keeps the changes to the application tree in check. In some cases, and if not done recently when processing a gMg Event, the tree is rescanned which causes a create or destroy Event to occur inside processing another type of Event. For this reason a check must be done.

Different kinds of application component packaging will present different Method structures and hence require different methods for locating targeted methods/functions and their interfaces. As COM is an important component technology used to build enterprise Host Applications for Microsoft Windows, the detection of COM Methods through VTables for property retrieval or event detection is a required gMg technique for component monitoring.

Within an instance of a COM object which is a particular instance of a class, the first main gMg objective is to locate the object's VTable. If an object does not exist the VTable can be retrieved during its creation phase, but if an object already exists, gMg locates the VTable through the creation of its own temporary object. When any new object is created the object accesses the same VTable as existing objects that have already been instantiated. The gMg creates a temporary object which is used to locate an existing VTable that is shared by a set of Methods belonging to the component. Once the VTable is located, then gMg Method Signature interception routines can be set up to execute the monitoring process.

Classes are used to instantiate objects into memory and are identified by both GUID (a unique identifier commonly used to identify any programming component in Microsoft Windows) and interface name. Found in the typelibrary, gMg script writers provide the id via the interface name using gMg inspection tools. Published by the DLL, the id can be found in a utility such as the gMg tool VTree or Microsoft's OLE View. The DLL contains a type library which has a description of the COM object. Once the id is found then the GUID of the interface associated with a class within the object can be found. At run time, the id of the object's interface is then derived from the script.

A class can implement multiple interfaces (e.g. IUnknown, IDispatch, etc.). All other interfaces of the class implemented in the object are usually published in the registry. An id of the class is used to create an instance of the object in order to create an interface to the object of interest. Conversely, once the id of the interface is known, it is possible to get the id of the class that implements that interface.

Given the class id and the interface id an instance of the object can be created. The instance is created for a very short time and before the object is destroyed the address of the VTable is stored as it is discovered in memory. The interface is monitored only after the module that implements the interface is loaded. A gMg create Event on the module object is received meaning that the module exists. The interface can be monitored as the VTable is now instantiated in memory. The compiler has previously created and at compile time generates all the possible VTables that are in the source code at run time.

A Vtable, which is compiled as a fixed table containing pointers to code, is shared by all the instances. When an instance of the object is created a block of memory is allocated with the first dword pointing to the VTable. For instance, if there are ten objects of the same type they all share the same VTable, where the VTable is synonymous with the interface.

Regarding compilations in different computer programming languages, while standard C programming interfaces, for example, will use data structures to implement its Methods, components built in C++ use Virtual Functions. As discussed, Virtual Function are implemented as VTables and contain pointers to corresponding Methods. Additionally, the VTable includes of a number of interface sets as part of the COM definition (i.e., IUnknown, IDispatch, and other optional custom sets). Given a COM object which can have multiple instances, all interface sets are derived from IUnknown. Additionally, derivation determines VTable content. For example, if an interface is derived from Invoke, then the VTable contains a pointer to an Invoke pointer to a Method. But if an interface is not derived from IDispatch and if a QueryInterface is executed, a different VTable would be built.

As part of IUnknown that depends on different factors such as multiple class inheritance, the first three entries of the VTable FIG. 21 2106 always point to methods of IUnknown interface which are: QueryInterface followed by AddRef, and Release. The next interface set derived from IUnknown is IDispatch which contains Invoke, Invoke is a generic method for accessing a set of Methods within the component.

VTables are not always singular as there could be more than one VTable pointing to the same Method, such as in the case of multiple inheritance. Furthermore, there could be other VTables located elsewhere that are connected to the same set of Methods. For example, there could be two VTables that need to be returned (e.g. Method X). Method X might be available as an index N in a VTable with a particular interface, or it might also be available as a dispatch id Q through invoke to a different VTable.

A number of issues are encountered when working with VTables. Intercepting VTables that contain pointers to functions is one method of monitoring Method calls. However, VTable interception of VTable pointers can prove unsuitable in some situations because there can be internal calls occurring within a function call that could bypass the VTable. Other issues can include that the Host Application can call the function directly without using the VTable to locate the function, also there can be multiple VTables all pointing to the same function. This implies that a monitoring system would have to intercept all relevant VTables for a given targeted function, which could prove prohibitive or if gaining access to all of them could be difficult. With one known interface (iKnown), QueryInterface could be used to locate multiple VTables, but may create considerable processing overhead. However QueryInterface is an alternate method where the digital signature function interception technique can be used.

IDispatch, a part of Automation which is a product available from Microsoft Corporation, provides interfaces to an application's components, where Automation is used to execute late binding (i.e. the functions to be called are determined at run time and not compile time). IDispatch is derived from IUnknown. Contained in the VTable, IDispatch has a dual interface if an Invoke and a direct Method interface are both available.

The Method id is specified, in Automation (Microsoft's component technology) which then invokes the indexed Method using the generic invoke Method, where Invoke is part of IDispatch. Invoke executes a Specific Method and everything is mapped to a Method for retrieval or setting a property. Where not a dual interface implementation, the Invoke can be slower due to such factors as having to prepare all the parameters, or the need to setup a list of variants prior to the call. However, if a dual interface is available a Virtual Function exists and there is a pointer to the function located in the VTable which points to a Method located in the actual code.

The first objective is to intercept the creation of new COM object instances, locate the iknown interface, and determine if Virtual Functions are present even if they are not derived from IDispatch. The client calls exported function DLLGetClassObject( ) which asks for a class factory interface. Once it gets a class structure interface it calls the Method CreateInstance( ) which requires the parameter to cast an id of the GUID of the interface for the object to be instantiated. The call to CreateInstance is also intercepted as part of the gMg Method Monitoring. The method requires as a parameter the GUID of the interface that the instance to be created implements. When DLLGetClassObject completes processing it returns the IKnown, the GUID of the interface, and also the ThisPointer from which the pointer to the VTable can be found.

If the interface does not derive from IDispatch Method, it implies that the application is using early binding that is, the functions to be called are known and linked together at compile time, all of which is also supported by the gMg System. Often the pointer to Idispatch is synonymous with the instance of the object. If an interface derives from IDispatch, it creates its own VTable but conversely, if an interface is not derived from IDispatch, a completely separate VTable is created.

After the creation of the new COM has been found, the next objective is to locate and access the real Method code that implements functionality contained in a COM component. The actual COM Methods perform a specific action and can be accessed either directly or via Invoke where everything is accessible through a switch statement with an id. Sometimes Methods can also be exposed and called directly. If in a Typelibrary an object is declared as a dual interface in a virtual table, and where there is a pointer to a virtual table, the table can be inspected to locate the address of the targeted functions.

The Method is really only in the context of a particular interface, such as in a component calendar control example. If there is a GUID of the interface the VTable and its interface are known. IKnown provides the VTable of the Method if it is available. Furthermore, a QueryInterface must be done to get IDispatch which may return a different VTable.

FIG. 21 further illustrates COM objects and their internal automation interfaces and VTables. While there can be many instances of a COM object 2109, 2112, 2115 the instances will share the same VTable which in turn shares the same code 2135. Within the DLL 2115 there is a pointer 2106 pointing to the DLL's VTable. A Virtual Function located in the VTable 2136 is a pointer that is part of the structure which indirectly finds the Method (e.g. 2139, 2142, 2145). Being virtual, new classes can be derived from the different classes to form new ones. For example, a new class can be derived from the IDispatch interface 2124. During compilation the original VTable can be copied, except there will be a new pointer pointing to the newly derived Invoke class. Fixed Classes which are derived from classes declared as with pure virtual methods must be provided with implementation of those actual defined Methods at compile time and can override their respective interface definitions. If Methods are not provided, compile errors occur. The portion of the figure labeled "VTable Details" provides a close-up view 2118 of the Vtable 2136. COM's Iunknown 2121 and IDispatch 2124 containing QueryInterface 2127, Addref 2130, Release 2133, and Invoke 2134, are specific to the class being created and must have their respective implementations linked in at compile time of the component.

FIG. 21 represents a specific interception routine for the Invoke Method as part of monitoring a Virtual Function. Exactly the same parameters as the original function are copied and used during gmg's call to the monitored function as well as an implied gMg parameter. There can be many different derived Invokes contained within the component depending on the implementation design. For example there could be any number of Invoke Methods derived from IDispatch, (e.g. class A Invoke 2148, class B Invoke 2154, class C Invoke 2157, etc.) as well as many calls to any of the implemented Invoke class Methods. Different calls to the respective Invokes (either of A, B, C) causes the gMg interception routine to allocate each a separate contextual Thunk 2169, 2172 for any number of calls 2175.

Considering the Invoke A class as an example, gMg call interception causes program flow to move from the redirection at 2163 to reach the appropriate class A Thunk 2169 for the call containing context data for the specific call instance data structures. A different IDispatch derived Invoke would have a different Thunk, for example with Invoke B's information 2172. However, the gMg intercept Handling routine 2166 is identical for all call instances and services all the VTable Methods 2135. Furthermore, gMg processing routes from the interception routine 2166 to the appropriate Method destination 2148 by retrieving the appropriate call context information and code 2178, This will be the appropriate destination pointer contained in a contextual data structure. Context information is kept in a gMg object which contains a pointer to a Thunk, monitor function continuation location 2160 (after the entry jump instruction inserted by gMg interception processing), and other information.

The flow of the gMg interception takes place as follows: the setting up of the intercept code takes place via the technique of using a temporary gMg created object. Then when the caller 2103 invokes the targeted function, the interception setup process overlays a part of the original code at the entry point of the monitored function 2163 in 2148 but keeps a copy of the overlaid code stored in 2178. To execute the real function, the intercept call retrieves the entry code portion from 2178 and first executes it, before jumping to the continuation location 2160. For gMg to execute its own call to achieve a task such as retrieving some properties from the Method call, the call execution will take place at 2178 via the established intercepted interface. gMg Events will be generated if the monitored Method is called by the Host Application. However, gMg has a protection mechanism that prevents the interception of a call if the call is initiated by the gMg interpreter by checking a global gMg lock (refer to FIG. 6). Only Host Application originating calls become gMg Method Events.

The original parameters detected on entry to the monitored function are captured and passed on to the original code of the function by the gMg interception routine. The result is that the gMg interception routine retrieves the actual parameters from the stack. Upon the return from the Method, the parameters are retrieved primarily from registers or indirect pointers contained in registers.

While the previous discussions in the Method Monitoring section has focused on the pre-creation or post-creation of memory objects to locate and monitor Method calls, of equal significance in the gMg monitoring system is the monitoring of Method returns. Besides capturing calls, techniques of capturing Method return values are useful for capturing and passing a Method's results to the gMg System for further processing. The monitoring of Method returns yields the results of Method calls that are made available to the gMg script for manipulation in many environments. The principles of function return interception can target many different kinds of targets in component packaging, there are two methods of capturing a function return discussed here. The first, the Stack Copy method, involves making a copy of the stack, while the second, the Stack Allocation Method, dynamically allocates and deallocates thunks to preserve calling and return contexts.

For the monitoring of a Method return, the first "Stack Copy" technique is based on copying a section of the stack (using the caller's stack frame) and using it to affect the targeted function's program flow to and from gMg call and return interception routines. The Stack Copy Method intercepts the stack without modifying the original stack. By making a copy of a section of the stack and intercepting execution points of the return of a function, program execution moves instead to a gMg interception routine which detects stack movement and executes stack operations within the gMg code's version of the stack. Given that the gMg System is transparent and requires no modifications to the application's source code and given that the component is private, it is presumed there is no documentation available for a targeted monitored function and it would not be known how many parameters are being passed to the function. Therefore, when copied, this captured stack section (sufficiently large enough to capture N parameters) contains both the needed function parameters and some additional data which probably isn't relevant to the monitoring process.

The stack copy technique contains the return address pointing to the gMg interception code which recognizes how much of the stack pointer has been moved. For example, if gMg code adds twenty words (as a preset configuration) then on the return to gMg code adds twenty to the stack pointer which positions the stack pointer to the proper location in the stack. A copy is made of all the function parameters on the stack and the function returns the call with a return address. Finally, when the call to the method is complete, the copy of the parameters on the stack is removed before returning to the original caller. The approach in this example always copies twenty words of parameters on every return. At the location where the parameters are being passed and called from the destructor, UninterceptcallEDX( ) unhooks the function, releases any used memory, restores any saved memory to the original method's state if needed, and when the reference count of the gMg object becomes 0 it destroys the object and releases the intercept. Timing issues must be considered during the establishment of the interception routine.

Referring to FIG. 22 illustrating the Stack Copy technique Monitoring Return, a caller 2205 calls the Method which is being monitored. Upon arrival, the stack 2210 can contain the parameters 2215 of the Method, along with the return address 2220 of the caller whereupon program flow continues after completion of the Method call.

However when the Method is monitored, from the gMg monitor setup stage (refer to FIG. 18), the monitored function call's entry-address has already been located and the entry is modified with a jump instruction 2230 during the call phase of the interception. Before overlaying the original code, the opcodes of the function that have been overlaid are kept and made available for the intercepted call to the original function code call 2245. Thus, when the application calls the monitored function 2225, program flow enters the function's code address. Because of the modified entry, the gMg jump instruction 2230 is executed which switches program flow to the gMg interception setup routine 2240. First the interception setup routine makes a copy of a section of the stack 2250. The gMg System makes an assumption about the maximum number of parameters in a monitored function call which determines the number of bytes of the stack to capture. Based on this assumption, gMg uses a configured size limit for capturing a portion of the stack upon entry to the function. This stack portion contains the function parameter values 2255, the original return address 2260, plus some additional data. Another step taken during this return setup stage is the modification of the return address 2260 in the stack copy that results in a pointer to the return capture execution 2280 that takes place prior to program flow returning to the caller 2205. At this point, the setup of the return capture is done and the capture of the Method's return values is ready to execute and proceeds as follows.

To execute the call to the monitored function, opcodes that have been overlaid by the jump instruction 2230 during the setup of the gMg interception routine are retrieved and executed before jumping to the continuation point of the Method's code 2235. The remaining code of the monitored function now executes including the initial entry opcodes (overlaid by the interception routine's jump instruction) as well as necessary stack operations to pass parameters from the original caller 2205. The stack operations are performed on the interception routine's copy of the stack 2255 instead of the application's original stack 2215. Upon completion, the program flow reaches the end of the Method and executes the return instruction located in the gMg interception routine's stack copy 2260. This instruction moves execution flow to the interception routine's Return Capture code 2280. At this moment, the return values are captured either from registers or with pointers found from the stack copy 2250 and stored 2265 into storage accessible by the caller, and then a gMg Event is issued to the interpreter 2270. At the gMg script level, if the script refers to the current Event object of the function call interception it can be assigned to a script variable, then the variable can be referenced. Provided the assigned variable is part of a condition (whether for a call or a return detection), if the Method call (or return) Event is received, the script's logic will route script execution to the appropriate action. The final step is to execute a return to the original caller 2275 by jumping to the original stack which contains the address of the caller 2205. The execution of the return code pops the stack in a normal fashion i.e. by adjusting the stack pointer register by the amount copied at the beginning of the interception process and program flow resumes within the Host Application.

Alternatively, the Stack Allocation Method provides another method for capturing return values. Unlike the Stack Copy Method, in the Stack Allocation Method, no copy of the caller's stack is made. Instead there is dynamic allocation of small Thunks to keep track of calling contexts and their respective returns. To track function Return values, a Thunk contains the modified return address on the stack that points to another Thunk which examines the return values. Unlike Thunks that support call monitoring, return monitoring uses Thunks that are dynamically managed, that is on every call and return they are allocated and deallocated. Within this Stack Allocation Method there are a number of stages: first is the entry to the monitored function from the caller, next is the setting up of the return intercept routine which occurs during the call to the monitored function, then there is the call to the original monitored function, then is the return and capture of the return values, and finally is the cleanup and return to the caller.

The Stack Allocation Return Monitoring Method shown in FIG. 23 allocates Thunk memory dynamically where the Thunk is used for code redirection and the preservation of calling or return contexts to preserve Host Application continuity. When a function is intercepted the original code that is overlaid is saved in a Thunk space followed by a jump instruction that resumes execution of the monitored function. Several Thunks are setup, one to do the interception, another to resume execution after entering the initial part of the interception, and another to handle the return.

Because of the shared aspect of any given Method, interception contexts are needed to handle proper routing of the Host Application's calls and returns using individual data (i.e. Call Thunks 2330, 2327, 2354, 2357, 2342, 2351) that describe the details of different call instances. For example, if given two host Application functions X and Y which both call Method Q, then the gMg interception routine P would track two different return addresses, one for function X and one for function Y. Keeping track of the different contexts to ensure preserving program flow and continuity for different Host Application functions is a key role of the gMg Thunks.

The caller 2303 calls the monitored function 2315 and encounters the jump instruction 2318 that has been overlaid at the entry to the monitored Method. This jump instruction reaches code that begins the setup process of the return interception routine to handle dynamic information needed to successfully perform the intercept. The return address 2312 is modified in the stack 2306 which also contains parameters 2309 to point to a Thunk that provides a jump connection 2345 to both the gMg shared Thunk deallocation and the Return Capture routine 2366 that connects to the return portion 2348 of the Method call's context where the context tracks different call instances. This dynamically allocated Thunk contains the original return address 2348. Another action of the return interception routine setup during the call is the allocation of another Thunk 2330, which provides context information for the current call instance and also is part of the setup of the return phase (the return will be redirected per instance). Processing then reaches the shared allocation routine 2336 that allocates the Thunk 2342 which stores the caller's original return address for the current instance and sets up a link to the return capture process 2360.

The handling routine 2333 call to the monitored Method is executed 2339 by calling the Thunk 2354 that has stored the monitored Method's opcodes which have been overlaid by the jump instruction at the entry point to the Method 2318. Execution of the Method resumes at the continuation point 2321, and continues until processing reaches the return instruction 2324 upon completion. Recalling that the original return address was modified 2312 during the return interception setup phase, program execution now reaches the gMg routine 2345 that contains a link to the return capture code instead of returning to the caller 2303. The flow now reaches the end of the capture process 2366 where Thunks are deallocated 2363, return values are captured 2360, and gMg Events are issued to the gMg interpreter. At the gMg script level, if the script refers to the current Event object of the function call interception it can be assigned to a script variable, then the variable can be referenced. Provided the assigned variable is part of a condition (whether for a call or a return detection), if the Method call (or return) Event is received, the script's logic will route script execution to the appropriate action. With the output captured, program flow follows to the original return address of the caller 2348 and an indirect jump handles the return to the caller 2303.

In the Stack Allocation Method, gMg Thunks act like a per-thread stack that allocate and deallocate Thunks in stack order, which need to compliment each other since information must be paired with the return address. A block of memory is preallocated to be used for incremental memory allocations for efficient operation and its properties are both rewrite and executable simultaneously.

In summary, gMg Method monitoring provides access to a wide spectrum of components from the operating system to applications, and provides access to functionality that is either published and documented (for other non-gMg tools), or unpublished and undocumented. Method monitoring is implemented as an additional Sensor for the gMg System that, together with the GUI Sensor, communicates with the gMg interpreter to provide integration, expansion, or correlation with unique GUI contexts and additional information sources that are used for describing Host Application behaviors. While COM and exported functions are described here, the principles applied in the gMg Method monitoring system apply to many other component technologies and can be easily adapted to gMg's abstraction model.

At this stage, all gMg monitoring sources are generated in the form of gMg events that can yield a compound of different data types, especially all within a GUI context. Low level events i.e. events detected at the point of a gMg source, can in turn be processed by state machines at different stages of processing at the most applicable and efficient locations. In principle, as soon as something is known, it should be considered immediately for state processing given the requirements. For this purpose, within the gMg System, state machine execution is available for both Localized and Remote processing.

FIG. 24 illustrates the gMg State Machine Hierarchy. Given both the Localized and Remote State Machine mechanisms, the gMg System has the ability to build light weight distributed State Machine hierarchies to provide maximum flexibility and timely delivery of real time responses across networks. Monitored target Host Applications 2418, 2421, 2424 are represented here as having gMg Sensors injected into them to detect and collect Events. Once events are detected they are sent as gMg messages to their respective interpreter 2412, 2413, 2414 where each is running a script (e.g. 2409). For instance, the script can define a small and fast "localized" State Machine 2403 that can translate lower level trigger Events (detected with gMg Sensors) into logical Events. Once processed, these logical Events can then be packaged as one or more track messages 2415 that are received by a remote (now a second level of processing) State Machine, usually on the gMg collection server 2406. These logical Events in turn can be further processed by other set(s) of State Machines to yield a multi level logical Event based on successive sets of states which can be passed forward as a detection response 2427.

This process is further illustrated with State Machine 2432 within the hierarchy 2430. This single State Machine 2442 (in close-up) has a series of input trigger Events 2445, 2448, 2451 and an output 2454. This output can in turn be fed into other State Machines that either reside within the same script locally 2409 or remotely 2406. The State Machine hierarchical tree 2430 represents a collection of State Machines (i.e., 2430, 2433, 2436, 2439) in any combination of local and remote state machines with compatible outputs to inputs to form a flexible state detection mechanism based on gMg Events. The ability to link State Machines in a distributed form allows the rapid detection and routing of Events on a centralized server, since the majority of state processing can execute locally and immediately upon detection as a result of a user or some local Host Application action.

Depending on requirements, State Machines can be executed on the client (i.e. Localized), to significantly reduce the server resource requirement in large user bases. Commands that preserve state between Events facilitate this optimized processing for real time alerts and other time sensitive operations as well as reduce network traffic. To achieve this, the gMg script language has a Sequence command that handles state on the client computer or virtual client space such as in terminal services. The gMg Sequence command detects different states of the target Host Application as Events that are described in logical expression statements contained within the Sequence command syntax.

The following code Sample illustrates the use of the Sequence command to track a group of states which results in a single action, namely, the track command.

Code Sample:

```
init
{
function filesavemenuitem = ...;
function savedialogmydocuments = ...;
function savedialogsavebutton = ...;
function savedialogfilename = ...;
var filename=nostring;
};
if ( sequence (
   wlbutdown && filesavemenuitem,    // (1)
   wlbutdown && savedialogmydocuments:filename= _ // statement
   continues to next line
     findsibling (savedialogfilename) .title, // (2)
   wlbutdown && savedialogsavebutton ) ) // (3)
track( saveend, topwindow, 'File Save To My Documents Completed',
file=filename );
```

In the code example, the "left button down" is pressed on different open dialog menu items. The state command looks for a sequence of left button down Events on the "file menu open" item (1), followed by an "open file save" dialog (2), and finally a "save command executed" (3) with the triggering of a SaveEnd Event and a SavedMy DocumentsCompleted Event. The if statement presented in this example contains a series of conditions with each condition representing GUI objects detected as a series of Events. The interpreter receives each Event and keeps track of the state between Events, where the sequence aggregates state in some order as determined by its commands. Upon all conditions completed, the condition becomes true, and then execution falls into the body of the sequence command and executes its contents. Normally the contents would be a single track message that reflects the states and conditions met by the sequence command or other actions.

Other features of the sequence command would enable more complex operations such as OR's or Compound Operations which are Ordered Sequences or Any Order sequences. For the All_Of Sequence, the Sequence group condition for Events A, B, or C becomes true when all of Events A, B, and C occur. For the Any_Of Sequence, if any of Events A, B, or C occur once, then the group Sequence condition becomes true. At the sequence level operations enable the combining of sequence commands with logical Boolean operators. OR, And, NOT, etc. can be used in any combination. Sequence commands can also be nested that is, one sequence command may contain another sequence command as in the following code fragment:

If (Sequence(S1a, Sequence(S2a, S2b, S2c), S1b))

```
{
Action...
SendTrackMsg(Q)
}
```

In this example, the second Sequence command is contained inside the condition clause of the first Sequence command. On processing, the interpreter encounters the first Sequence 1 and sets up the state tracking for its conditions. One of its conditions is another Sequence 2 command which in turn sets up its own separate state tracking. The Sequence 2 command awaits Events until it completes its defined logical sequence upon which it turns true. When Sequence 1 is again evaluated, its expression completes its logic and processing continues. In general the entire operation is recursive N times within whatever acceptable resource level (memory, CPU, etc.) the computing environment allows.

Furthermore, a code generator such as a JAVA® programming language code generator, with gMg script as input, could be used to generate and deploy state machines on either a client component in various configurations as gMg script, or as a gMg tracking and monitoring server State Machine component. The overall benefit of this Localized State Machine mechanism and flexible configuring is the dramatic reduction in both server resource requirements and network traffic.

With reference again to FIG. 4, illustrating an overview of deployed components, it is shown that the gMg application generates the track messages or gMg Events which are collected and received by the gMg collection server and tracking database. At this stage, the gMg analysis processing is implemented based on Remote State Machines designed for flexibility and efficient processing. On entry to the processing mechanism, Events are saved to the database and then processed immediately by in-memory state machines (real-time), or batched for later execution based on a schedule (near real-time or post-time batch) State Machines Events. Furthermore, within the State Machine analysis there are also a number of mechanisms to detect multiple instances of GUI object sets, whether they are from separate gMg scripts or are GUI object sets from a single script.

Initial configuration of the State Machines is defined within an XML file that uses the paradigm of a railroad diagram. A railroad diagram describes parallel processes or conditions in a succinct form and is commonly known in the art. The Initiation routine is called when the XML is first loaded from a file and the initial State Machine set is created. The parsing routine checks for each element, the Properties, the children elements, etc. The XML file describes the properties of a server State Machine solution with blocks that define State Machine contents and transitions. The Block embodies the concept of a container which is a structure within the XML that helps combine multiple elements for a logical relation. A container is a Boolean structure such as an OR, where the OR is a container for the transitions. The container is unique for all its children.

Programming Statements within blocks describe Event Process handling or logical actions such as a link, block, goto, or transition. The transitions are guarded by conditions consisting of Boolean expressions or timeout expiration.

Generally states are defined in the State Machine by keeping track of where any given track message or Event is currently being processed within a given State Machine. Given a state, the next transition destination depends on the content of a subsequent Event defined in the fields of a track message record. A received Event has a processing location which becomes the state. If an Event matches transition criteria, a state location is reached and becomes the new state. Therefore a state becomes the net result of a transition execution. A current state is dependent on previously encountered state Events and changes if transition criteria match any given current Event.

Within the gMg syntax for its State Machines, transition criteria are linked together with link and goto statements. A goto executes a change of state, while a link does not. A link is like an additional branch, while a goto changes the state. A link acts like a parallel splitting path (or parallel if statements) for evaluating and routing input Events entering the system. Links create possible pathways or traversals for the next transition, but will not cause any state change. Labels can be used as a destination from a goto statement (state) or a destination from a link statement (non state).

Another keyword command, the Anytime statement similar to a listener appearing at the end of a block, is executed each time its condition matches the incoming event and the current state is inside the block. The Anytime statement can be compared to an OR for all the transitions (e.g., given a block with an Anytime at the end), when the state is anywhere in the block, processing checks all the Anytime statements which are executed in addition to the transitions. Anytime is used in a situation if something needs to be done irrespective of the precise state within a given block. The Anytime acts as a listener. If processing reaches a block and an Event is received, there may be interest in the Event, but state is not necessarily affected by execution of an Anytime statement depending on conditions and criteria. In a given state when another Event is received all the Anytimes within a given block and all parent blocks are checked. Then a call is made to all Anytimes matching the event and a check is made to all the next potential transitions. The first one that matches is executed. With each new Event there is potential to perform a state transition and to execute many Anytime blocks. An Anytime command is evaluated once for every condition in the block list and a resultant action will execute once for every match.

For example, if several pages are to be monitored and measured for response time, the Anytime statement enables the programming of the measurement with fewer program statements. The targeted pages are listed within a block statement and an Anytime statement is added. The Anytime statement will then apply its measurement process to all the targeted pages via defined Events and enumerated in the list in the block statement regardless of the order the user traverses the pages. If a sequence is defined with the pages that is, topic=page 1, topic=page 2, topic=page 3, etc., and the pages represent a sequence of transitions, no matter what page the user is on, the Anytime statement results in a load time measurement of each page. Another example of an application using Anytime is to count a given process. The Anytime is executed once per Event within the block and the State Machine evaluates one Event at a time. Anytimes are associated solely with the block and within a given block. The detection of the existence of multiple scripts requires a combination of Agent and script identifiers. An Agent session id must be unique, and within that Agent session id is also a script session that is uniquely identified with a script session id. The identifiers lead to an instance detection. In State Machines, used for example, to detect a registration or an error, Agent session ids are used to organize the State Machines which are also made identifiable and unique. Normally global State Machines are not created with global visibility but is possible if required. There usually is not a state across all users, but instead, each user or process requires its own state that is tracked by State Machine instances.

Besides having clear identifiers, another important processing structural mechanism to enable efficient processing of the Events, is the scope definition originating from the track message sent by the gMg data source generator. Scopes identify and further support Multi-Instance detection of GUI object sets, Events, or other processes that occur on the gMg data source (client).

Events from different sessions are collected into a queue. Based on field values the Event object is assigned a scope. Usually the scope is also the session, but alternatively the scope can also be defined by using some other track message fields such as the Topic field. Within each scope there are one or more instances of State Machines. For example, if the task is to detect errors then one State Machine for that session could be created to determine the message without requiring multiple State Machines.

To avoid proliferation of State Machines (and higher demands on server resources) if a new Event matches the initial transition, it is not necessary to create a new State Machine if a State Machine already exists in that scope. The new Event can be passed for processing to the existing State Machine. For example, if a page appears in an application, the page Event is used for the initiating transition which occurs only the first time when the page is created and displayed. Only at this time is the new State Machine created. The created State Machines is unique where unique means a single instance within a single Scope.

The state machine instance is assigned to a scope based on the scope of the event that triggered its creation. The scope is usually identified by the session id where Scopes are defined with the track message level definitions L1 through L5. There are both session and script level scopes. If a script level scope is included there would be a State Machine to detect the script id. The script id is unique with respect to the Agent session id, and the client is notified by the server about the creation of an Agent id, and is repeated for every Agent on every client machine.

The following two implementations illustrate the application of the scope feature. In the first embodiment, a login procedure to an application requires only a simple initial transition. For a secure login procedure, the user enters id information and then submits their entry. On the initial appearance of the login screen (normally once in the lifetime of a session) an Event is generated. The server receives the Event and the state engine on the initial transition creates a new State Machine. In another implementation, a windows application having two threads, with one thread per window, where gMg monitoring will track the processing in each of the two windows. In this scenario a user is identified within the session or within the State Machine. There also could be multiple scopes in the same session for the same user. The server analysis will utilize two scopes, one for each window but will be still associated with the same user. Furthermore, within the State Machine collection there can be a different State Machine for each window.

Referring to FIG. 25, within the set of State Machine definitions containing transitions 2505, given a serial Event 2550, each static condition within the set of state machine definitions 2565 that refers to the event (e.g. 2510 through 2520) is processed by EvalStatic 2555 which leaves the remaining set of conditions 2570 that refer to the state machine instance variables 2525 through 2545 which must be evaluated in the context of a state machine instance. The instance conditions are inspected with function EvalInstance 2560 for each state machine instance and the first matching transition is executed. This happens for either existing or newly created State Machines. The initial transition is not partial, except when it creates a new instance, but then it processes the Event similar to any other transition. If the transition matched is acceptable from the current state, there are links to open paths, and if the transition condition is true, there also can be conditions at the instance level for the Event.

For example, if a track message arrives and its status field equals 5, this value is stored in the instance, but cannot be verified at this point because the instance is not yet accessible. Only when processing reaches access to the instance, can values be evaluated and a check made to see if the status matches the Event received. This is an example of an instance condition as opposed to a static condition. If the condition is acceptable and the transition condition is true, then an evaluation of static (false) leads to an evaluation of instance conditions. The server State Machine compiler distinguishes between static and instance conditions, and calls the appropriate handling routines. If these transition Event conditions are true, the code action associated with that transition is selected and executed. Transition processing then moves to the post-transition stage, or if there is a goto there will be state processing at the goto destination.

Referring to FIG. 26 the bulk of the processing is in the evaluation process and the routing or the dispatching of thousands of received Events 2603 at very high rates. Within this large set to avoid ambiguity of states all session Events are serialized 2609, and then input into the set of State Machines 2621. The state engine 2627 checks the received Events with the defined State Machines (e.g. 2624). The distinction between State Machine definitions and their instances as discussed in the previous section is applicable here. The State Machine is the definition of a state detection mechanism, and all defined State Machines will process every input Event. If an Event condition (static) is matched 2612, then the State Machine engine checks the Event 2633 against the scope and only processes the Events in instances within the matching scope 2639. The condition of a certain instance's state cannot be decided at the higher State Machine definition level. If a State Machine is interested in a received Event, the Event must be captured by the State Machine's instance, depending on the state of each instance. Given the set of all transitions, the overall objective is to first test the static conditions 2615, and then test all the instance conditions 2618. Checking the static conditions is a higher level operation that is done first to improve efficiency.

State Machines are grouped by scope, and for a given Event, the state machine instances are looked up in a map using the event scope as a key. Within the set of static structures, the transitions and all the Anytimes matching the incoming Event 2612 are retrieved. Static evaluation can be used as a quick test to exclude transitions that do not match the event. Instead of repeating Event Processing once for each instance, processing can be done at the top level (i.e. State Machine definition level 2615), and transitions that do not fire with the current input Event in the condition will not appear in the executing transition list. However, if the Event matches a transition, or an Anytime statement, each type of match is added to their respective matching transition or Anytime lists 2612.

If certain conditions are met the next step is to create State Machine instances. If the list of transitions contains an initial transition (i.e. the initial transition was matched) and the State Machine is not unique, as many instances needed within a scope need to be created, or, if there are no instances created in the scope, a new instance needs to be created 2636. In other words, whatever transition is matched either the State Machine is not unique, or if there are no instances within the scope, an instance must be created within the scope. If true, a new State Machine instance is created.

Utility Methods are also maintained by the state, timeout, etc. If a transition is matched 2642 it is verified that the transition is accessible 2645 (i.e., the function IsAnytime-Valid verifies that this Anytime is accessible from the current state). The function (transition) Executing occurs inside the transition, and is called within a valid transition 2648. A check is made to determine that the transition has now been performed 2651. As previously stated, common gMg instances can be verified efficiently at the top level (State Machine definitions) but, if conditions refer to an existing State Machine instance, each State Machine can have different values for those instances and, therefore, must be checked at the precise instance.

After a transition process is completed there may or may not be another transition. Such a condition occurs if a process driving the data source is interrupted, or if the state machine has reached its last transition. If none of the transitions match the current state, after a set period of time, then a transition times out to prevent the gMg System from locking up.

If any transition is performed the timeout is checked 2654. A timeout must be registered in a timeout buffer that might later be triggered. In every state a timeout registers the shortest timeout position acceptable. For example, if there are two timeouts (e.g., 5 minutes and 10 minutes), the lesser one is registered. The 10 minute timeout is discarded since the 5 minute timeout will expire first, and subsequent state changes are executed first. At any point there is only one possible timeout in a State Machine which will be the shortest timeout. Therefore, if a transition is performed the timeout must be refreshed, the new state is moved, all possible timeouts from the new state are sought, and the new timeout request is registered. Timeouts are checked when an Event arrives. There is a buffer of timeout requests which contains the registered timeout requests. When Events arrive, based on the Event timestamp, the buffer is inspected for any timeouts, a registration Method is called 2654, and information about the State Machine is updated. For example, if the system is in a given state and if there exists a timeout of 30 minutes, before the 30 minutes is up and if moving to a different state, there will be access to another set of timeouts. However, if there are no timeouts, the timeout registration is deleted. If the system is waiting for an Event but is not sure when the Event will arrive, a parallel timeout of some time interval (e.g. one minute) can be created. Then if the Event does arrive within one minute the state processing proceed. However, if the Event does not arrive to prevent processing from being blocked, the system can proceed with the registration of a one minute timeout. After performing a transition, the current timeout registration will be removed 2654. Only new timeouts are registered if they are acceptable that is, there are proper transition paths from the currently inspected location. On the other hand, if at the current location an Event is not received after one minute, the timeout buffer is checked, the timeout is used, and the transition is executed and moves to the next state. From this next state a search for new timeout transitions is done and they are registered.

Preferably, timeouts are handled after the Event is processed. The timeout is processed after the regular processing, because execution of transitions might remove the timeout. The timeout is registered into a buffer and is treated like a transition, where the condition is the timeout which has a code action. A timeout is a special transition without an Event, because it is actually triggered by the lack of an Event where the transition is triggered after the time interval when there is no transition. The code action normally has a parameter for an external Event, but in the timeout there is none. There is one timeout buffer 2630 used at the state engine level. The buffer entries correspond to minutes, and for each entry there is a list of transitions scheduled to timeout at that minute. After processing is completed the time of the current event is used to look up the corresponding minute in the timeout buffer. All transitions located in entries up to and including this minute can be timed out where the occurrence of a Timeout will delete State Machines. There is no loop over all pending timeouts, and processing is very fast for making calls to transitions for all the State Machines. After a transition is performed, the engine calls IfEndState( ) for the currently processed State Machine, and if in the final state, the solution is then terminated.

In closing, the gMg monitoring system with its wide range of possible Monitoring Targets provided by its sensor architecture for public and private component Method interfaces, creates data sources that can be analyzed within a rich GUI user context to reflect performance profiles for underlying systems supporting enterprise applications. The gMg System's ability to support Multi-Instance application GUI's with Generic or Specific Detection of GUI objects provides maximum flexibility and adaptability within internal dynamic application processes within operating environments. Additionally, Local and Remote distributed state machines provide timely analysis for types of event within a range of applications such as detecting slow response times, excessive error conditions, business process analysis, etc.

With reference to FIG. 27, a flow diagram illustrating process 2700 for analyzing method events is presented. At step 2710 a free-standing monitoring program 436 (including Agent 414, Engine 416, and Solution 426) is operable to model objects, in the form of different tree structures including a hierarchical GUI Object Tree 660 of a host application (to identify GUI objects), a Code Module Tree FIG. 17 (to identify code modules and method monitors, COM instances), and a Process/Thread Tree (to identify processes and threads of the host application). An indication of an environmental spectrum (i.e. conditions of a target application manifested in objects, GUI objects, messages, method calls, and method returns) is derived, step 2715, for the application window. State machine events that can occur at two (or more) levels for the timely delivery of meaningful events (e.g. a first level local user's desktop 2403, and a second level remote server 2406) are processed, step 2720. One or more state machine generated events created by the gMg System's sensors or state machine processing in response to a Host Application's dynamic environmental spectrum indications 515 (e.g., user, application, OS, and method events) are correlated, step 2725. An indication of a user's experience is deduced, step 2730, based on the correlated state machine results. The logical event data that is synergetic with the environmental spectrum indications is gathered at the server 557, step 2735, from the state machine events. Byte opcode patterns 1920 are identified, step 2740, and are used to locate and detect Method entry points of component functions. At step 2745, an interface function among the byte opcode patterns is identified 1910, where the interface function provides interfaces to events and properties. The address of the interface function is determined, step 2750. The technique used depends on the type of function intercepted (e.g., either Exported Functions 1620, or COM TypeLibrary 1624), and, whether the monitoring process initiates before (1627) object creation or after (1630). The opcode patterns enable the execution of a call 1642 and return 1645 interception to identify objects, including method calls, method returns, and GUI objects. The process 2700 links, step 2755, to the interface function using an intercept routine (FIG. 18) 1848 to track function calls.

FIG. 28 illustrates a flow diagram for process 2800 that monitors host application functionality. Byte opcode patterns representing method functions within the host application, are identified, step 2810, from an array of captured byte patterns of the targeted Method—i.e., a Method Signature 1930. At step 2815, process 2800 compares run time function byte opcode patterns 1910 to a list of Method Signatures to determine a Method's location 1905. Links are established, step 2820, between the targeted method function, a call intercept routine 2012, and information structure instance 2045 using a jump routine instruction 2039. Process 2800 monitors, step 2825, the returns from calls to the method function using alternatively two Stack manipulating techniques: return capture Stack Copy 1648, and return Stack Allocation 1651. The result is the capture of return values that can be used to retrieve additional information about an application's internal processes.

Referring to FIGS. 29A and 29B, a flow diagram for process 2900 which monitors events derived from a computer target application presentation layer is illustrated. At Step 2904, a script in the form of "Solutions" 426 and is provided on a client computer 436 local to the target application. The script 426 is capable of running within the target application. Run-time instantiations of objects 509 from multiple instantiations of the target application 545 are scanned at step 2906. Scanning of the objects result in a set of real time events 515, which are events derived from User, Application, OS events and particular values of GUI object and Method properties from method calls and method returns of the target application. An internal GUI Object Tree 832 is allocated, step 2908, to organize data structures which are then adapted to reflect, step 2910, real-time dynamic changes 854 to the real application's GUI. A "multi-typed" stream of events from the adaptation reflects actual states of the real application 1115, 1103. This GUI structure reflects a type of event that provides a context for all other types of data to interleave and reference. At step 2912, object instantiations are detected from instantiation(s) of the target application that match a predetermined object structure by using script expressions capable of detecting categories of related objects (refer to code samples). FIG. 15 shows gMg script expressions which can be generic 1510 for detecting whole categories of related GUI objects (or more specific 1505 for detecting single GUI objects). Detection expressions can detect GUI objects anywhere in this conceptual spectrum to reflect the many variations found in application run time structures. At step 2914, at least a portion of an environmental spectrum of the detected object is captured from the contents of detected objects from any target application instantiation.

At step 2916 logical events 521 are derived using script logical sequence expressions (local state machine) or state machine (remote state machine) processing from events from gMg Sensors 438, 439, 440 received from the environmental spectrum (i.e., Method, OS, User, and Application Events). The processed contents are reassembled (i.e. data is collected on a server 446), step 2918, to reflect the multi-instantiation structures detected by gMg Sensors and reflected by the GUI Object Tree. gMg System's hierarchical state machine processing 2430 and 2442 detects sequences of events that re-create the state of the application as in contexts experienced by a user. The reassembled structures are correlated, step 2920, into data sets which are detected using Scopes 2639 defined for unique state machines that separate instances of the applications and instances of GUI Object sets into user sessions to reflect prior states of the application. The reflection of the target application structure (i.e., multiple scripts use the same GUI Object Tree 660) is shared, step 2922, among a plurality of scripts 945, 948, 951, where each of the plurality of scripts is associated with a respective instantiation of the target application 901, 902, 903. Intermediate processing uses captured events in the form of a track message (between 436 and 446) that is received and either processed for real time display and detection or collected into a data store for further analysis. Additional resources enable complex and historical trend analysis, step 2924, of the track data set that uses a commonly understood semantic definition that synchronizes the source (e.g., on the client) with the destination (e.g., on the server) to recreate and provide insight into conditions of the user experience.

With particular reference to FIG. 29B, process 2900 continues at step 2932, where a hierarchical organizing entity using gMg Contexts (FIG. 12) that represents a portion of the target application and contains contextual information (e.g., Context Levels 1205, 1210, 1215) is declared. The captured environmental spectrum supported by the hierarchical, organizing entity (e.g., the Object Tree 1015 and its Object Variable feature e.g. 1035, or Object Variable Set 1039) is analyzed, step 2934. At step 2936, process 2900 senses, using FIG. 14 Hooks, a target application interaction with a user or an interaction with a target application generated event that appears in a process 1406 or thread 1409, 1412, 1418, 1421. Using logical script expressions variables, step 2938, (refer to the previously described code sample entitled "Specific and Generic Binding Code Sample," and Object Variables 1005) to generate events based on execution of the script in response to the results of the sensing step (e.g., generation of gMg events with mechanisms such as WhenObjects 1151).

One or more of the generated events is passed, step 2940. to an interpreter 745. The selectively generated events are analyzed, step 2942. Selection uses the various mechanisms of the gMg System such as logical expressions in the script to describe the conditions of detection, variables, and Object Variables, WhenObjects, and within the GUI Object Tree structure. At step 2946, the analysis is correlated with parameters concerning external sources; in particular, data from servers or environment infrastructure. The script is associated, step 2948, with a single process 1315 of a window in the target application. A unique message is detected, step 2950, which is associated with the thread id. The message is intercepted, step 2952, by an active hook routine 1433 through 1442. The contents of the message are evaluated with script expressions and operations (refer to code sample "ManyInstances"), step 2954, to derive events an properties, so as to obtain information on the target application. At step 2956, process 2900 generates reports 454, alerts 450, correlations 452, and action/responses 456 containing results of the analyzing and correlating steps. At step 2958, repeated scanning of the application continually populates the gMg GUI Object Tree 660 with structures that reflect the application GUI, dynamically allocating, adapting, detecting (e.g. intermittent poll operations by the WhenObject mechanism FIG. 11, Hooks FIG. 14), and capturing steps at a predetermined interval 615 (e.g., driven by an OS clock, or else by certain conditions) invoked by detected events.

As the invention has been described in detail, various improvements, alternatives and equivalents will become apparent to those skilled in the art. Therefore, it should be understood that the detailed description has been provided by way of an example and not as a limitation. Numerous changes in the detailed construction and the combination and arrangement of components may be resorted to without departing from the spirit and scope of the invention as hereinafter claimed. Substitutions of elements from one embodiment to another are also fully intended and contemplated. The invention is defined solely with regard to the claims appended hereto, and to equivalents of the recitations therein.

We claim:

1. A method for monitoring events derived from a presentation layer and software methods of a target application while the target application is executing on at least one computer, the method comprising the steps of:
   providing, without modifying source code of the target application, a script operable to run at a level within the target application, wherein the target application has a structure;
   scanning and intercepting run-time instantiations of different types of objects including methods, dynamic GUI objects and object events of the target application occurring on the at least one computer, wherein the dynamic GUI objects and object events include at least one of operating system events, application events and web browser events generated directly or indirectly by a user;
   allocating, in a memory accessible by the at least one computer, target application hierarchy structures in real-time based on the object instantiations;
   generating categorized events derived from the target application hierarchy structures, wherein the categorized events are processed by the script;
   adapting and tracking the allocated structures to create a target application hierarchy reflection synchronized with the target application structure, wherein the reflection provides a dynamic model for each of the different types of objects of the target application, and wherein the target application hierarchy structures are configured to change based in part on properties of the generated categorized events;
   detecting one or more object instantiations that match a predetermined object structure criteria using the generated categorized events to detect categories of related objects; and
   capturing at least a portion of an environmental spectrum of the detected object, the environmental spectrum of the detected object comprising one or more conditions of the detected objects.

2. The method of claim 1, further comprising the steps of:
   processing the captured environmental spectrum of the detected object into logical events;
   reassembling the logical events to reflect multi-instantiation structures within distinct contexts, wherein the distinct contexts are prior states of the target application; and
   correlating the reassembled multi-instantiation structures to analyze the prior state of the target application.

3. The method of claim 2, wherein there are multiple instantiations of the target application, the scanning step scans each target application instantiation and the detecting step detects object instantiations concerning more than one instantiation of the target application.

4. The method of claim 3, wherein the capturing step captures contents of detected objects from any target application instantiation.

5. The method of claim 1, wherein the captured environmental spectrum includes categories of information concerning the detected object, wherein the information provides insight about the target application environment.

6. The method of claim 1, wherein the scanning step further comprises the step of selecting object instantiations based on at least one predefined monitoring criterion.

7. The method of claim 1, wherein the providing step provides the script on the at least one computer.

8. The method of claim 1, further comprising the step of:
   sharing the reflection of the target application structure among a plurality of scripts, wherein each of the plurality of scripts is associated with a respective instantiation of the target application;
   wherein the reflection of the target application structure provides a GUI context for collected tracking data.

9. The method of claim 1, further comprising the steps of:
   detecting generic instantiations of the objects using script expressions capable of detecting categories of related objects; and
   processing the contents and properties of the detected generic object instantiations to determine, the occurrence of target application events in context.

10. The method of claim 9, further comprising the step of building user contexts by using track-message level, and predefined, semantics and conventions.

11. The method of claim 1, further comprising the steps of:
    declaring a hierarchical organizing entity that represents a portion of the target application and contains contextual information from at least the captured environmental spectrum; and
    analyzing the captured environmental spectrum supported by the hierarchical organizing entity.

12. The method of claim 11, including the additional step of evaluating a context level value to distinguish among multiple object instantiations during execution of the target application.

13. The method of claim 1, further comprising the step of:
    sensing at least one of a target application interaction with a user and a target application generated-event;
    selectively generating events based on execution of the script in response to the results of the sensing step;
    passing one or more of the generated events to an interpreter;
    passing one or more of the generated events to an interpreter;
    analyzing the selectively generated events; and
    correlating the analysis by direct mapping to external sources.

14. The method of claim 13, further comprising the step of generating at least one of reports, alerts, correlations, and responses containing results of the analyzing and correlating steps.

15. The method of claim 1, wherein the scanning, allocating, adapting, detecting and capturing steps are repeated at a predetermined interval to create an updated reflection of the target application.

16. The method of claim 1, wherein the scanning, allocating, adapting, detecting and capturing steps are invoked by detected events to create an updated reflection of the target application.

17. The method of claim 1, further comprising the steps of:
    associating the script with a single process of a window in the target application;
    detecting a message associated with a thread id;
    capturing the message using a sensor;
    providing the captured message to the script for evaluation of contents of the message; and
    deriving events and properties from the message contents to obtain information on the target application.

18. The method of claim 17, wherein the sensor is an active hook routine.

19. The method of claim 1, wherein the reflection of the target application structure includes a hierarchical object tree to represent GUI objects comprising the user interface of the target application.

20. The method of claim 1, wherein the environmental spectrum includes at least one of invariant and time variant conditions present in the target application.

21. A system for monitoring events in a presentation layer of a computer target application, having a predetermined structure, and executing on a computer connected to a communication network, the system comprising:

a system memory comprising a monitoring program executing on a central processing unit of the computer that includes a script operable to run at a level within the presentation layer;

the monitoring program operable to perform the steps of:

scanning and intercepting run-time instantiations of different types of objects and object events of the target application, wherein the different types of objects and object events include at least one of operating system events, application events and web browser events generated directly or indirectly by a user;

allocating target application hierarchy structures in real-time based on the object instantiations;

generating categorized events derived from the target application hierarchy structures, wherein the categorized events are processed by the script;

adapting and tracking the allocated structures to create a target application hierarchy reflection synchronized with the target application structure, wherein the reflection provides a dynamic model for each of the different types of objects of the target application, and wherein the target application hierarchy structures are configured to change based in part on properties of the generated categorized events;

detecting one or more object instantiations that match a predetermined object structure criteria using the generated categorized events to detect categories of related objects; and capturing at least a portion of an environmental spectrum of the detected objects, the environmental spectrum of the detected objects comprising one or more conditions of the detected objects.

22. The system of claim 21, wherein the computer is a client computer selected from the group consisting of a personal computer, a workstation, a personal digital assistant, and a platform capable of executing computer operating instructions.

23. The system of claim 21, wherein the reflection of the target application structure includes a hierarchical object tree to represent GUI objects comprising the user interface of the target application.

24. The system of claim 21, wherein the monitoring program is further operable to perform the step of capturing at least a portion of an environmental spectrum of the detected object, wherein the environmental spectrum includes at least one of invariant and time variant conditions of present in the target application.

25. The system of claim 21, wherein the computer is a server.

* * * * *